(12) United States Patent
Lu et al.

(10) Patent No.: US 8,443,071 B2
(45) Date of Patent: May 14, 2013

(54) DATA SERVER SYSTEM AND METHOD

(71) Applicant: Advanergy, Inc., Winnetka, CA (US)

(72) Inventors: Jin Lu, Oak Park, CA (US); Todd Scott Kelly, Winnetka, CA (US)

(73) Assignee: Advanergy, Inc., Winnetka, CA (US)

( * ) Notice: Subject to any disclaimer, the term of this patent is extended or adjusted under 35 U.S.C. 154(b) by 0 days.

(21) Appl. No.: 13/645,080

(22) Filed: Oct. 4, 2012

(65) Prior Publication Data

US 2013/0086245 A1    Apr. 4, 2013

Related U.S. Application Data

(60) Provisional application No. 61/698,288, filed on Sep. 7, 2012, provisional application No. 61/667,477, filed on Jul. 3, 2012, provisional application No. 61/661,100, filed on Jun. 18, 2012, provisional application No. 61/655,099, filed on Jun. 4, 2012, provisional application No. 61/542,811, filed on Oct. 4, 2011.

(51) Int. Cl.
*G06F 15/16* (2006.01)
*G06F 12/00* (2006.01)

(52) U.S. Cl.
USPC .......................................... 709/223; 709/250

(58) Field of Classification Search .......... 709/223–229, 709/250, 203
See application file for complete search history.

(56) References Cited

U.S. PATENT DOCUMENTS

| | | | | |
|---|---|---|---|---|
| 2011/0022695 | A1* | 1/2011 | Dalal et al. ..................... | 709/222 |
| 2011/0047543 | A1* | 2/2011 | Mohinder ......................... | 718/1 |
| 2011/0107329 | A1* | 5/2011 | Betzler et al. .................... | 718/1 |
| 2011/0110268 | A1* | 5/2011 | Panasyuk et al. ............. | 370/254 |
| 2012/0291024 | A1* | 11/2012 | Barabash et al. ................. | 718/1 |
| 2012/0297384 | A1* | 11/2012 | Barabash et al. ................. | 718/1 |

OTHER PUBLICATIONS (Author Unknown); "Battery Life (and Death)"; Electropaedia; At least as early as Oct. 4, 2011; http://www.mpoweruk.com/life.htm; 8 pp.
(Author Unknown): "Charging Lithium-ion"; Battery University: At least as early as Nov. 10, 2010; http://batteryuniversity.com/index.php/learn/article/charging_lithium_ion_batteries; 32 pp.
(Author Unknown); "Battery Management System (BMS)"; Electropaedia; At least as early as Oct. 4, 2011; http://www.mpoweruk.com/bms.htm#smartbats (smart battery); 8 pp.

(Continued)

*Primary Examiner* — Zarni Maung
(74) *Attorney, Agent, or Firm* — David W. Carstens; Kevin M. Klughart; Carstens & Cahoon, LLP

(57) ABSTRACT

A data server system/method allowing cloud data server functionality in a coordinated/concerted fashion within network configurations that are local to and/or spanning network gateway routers is disclosed. The system may utilize a smart gateway power controller (SGPC) augmented with storage media and/or expansion slots to interact within a home automation network (HAN) to permit the local HAN to operate as a distinct network and allow access to locally stored data from remote networks such as the Internet. The system permits inter-networking of HAN devices (including SGPCs) and integration of data management within home automation networks while still providing access to HAN data via external remote networks such as the Internet. The system/method allows remote network access to HAN device data from local/remote access devices including mobile phones, tablet computers, laptops, desktop computers, and the like.

30 Claims, 32 Drawing Sheets

OTHER PUBLICATIONS (Author Unknown); "How to Prolong Lithium-based Batteries"; Battery University; At least as early as Oct. 21, 2010; http://batteryuniversity.com/learn/article/how_to_prolong_lithium_based_batteries; 34 pp.

Tarandeep Singh; "Secrets for Prolonging Lithium-based Battery Life"; Geeknizer; May 12, 2009; http://geeknizer.com/secrets-for-prolonging-lithium-based batteries/#ixzz1Zju0wY6H; 4 pp.

(Author Unknown); "How to Enable/Disable Battery Care Function on Sony Valo to Improve Battery Life"; Digital Pbk (Forum); At least as early as Aug. 12, 2011; http://digitalpbk.com/hardware/sony-vaio-enable-battery-care-function-improve-battery-life; 4 pp.

(Author Unknown); "A Wi-Fi Light Control"; Wi-Fi Planet (Forum); Jan. 31, 2009; http://forums.wi-fiplanet.com/showthread.php?t=9954; 5 pp.

(Author Unknown); "Why Hasn't Anyone Made Any WiFi Light Switches or Power Sockets?"; Wi-Fi Planet (Forum); Dec. 29, 2005; http://forums.wi-fiplanet.com/showthread.php?t=5584; 4 pp.

(Author Unknown); "Simplest Possible WiFi Remote Power Switch"; AVS (Forum); Sep. 15, 2011; http://www.avsforum.com/avs-vb/showthread.php?p=20977417; 5 pp.

(Author Unknown); "A Wi-Fi Controlled Power Outlet From iPhone?"; Yahoo Answers; Apr. 1, 2011; http://answers.yahoo.com/question/index?qid=20110401143408AAPQerm; 2 pp.

(Author Unknown); "Control Home Lights Via Internet With your Computer or Wi-Fi Handheld Devices"; Squidoo; At least as early as Apr. 5, 2012; http://www.squidoo.com/control-home-lights-via-internet; 7 pp.

Harmony Gateway—Multi-Protocol HAN Gateway/Controller—Model #5010M; SimpleHomeNet; At least as early as Oct. 3, 2012; http://www.simplehomenet.com/proddetail.asp?prod=HarmonyGateway; 1 p.

* cited by examiner

User Accesses Home Based Local Data Storage from Internet

DATA SERVER SYSTEM AND METHOD

CROSS REFERENCE TO RELATED APPLICATIONS

This application claims benefit under 35 U.S.C. §119 and incorporates by reference U.S. Provisional Patent Application for DATA SERVER SYSTEM AND METHOD by inventors Jin (nmn) Lu and Todd Scott Kelly, filed electronically with the USPTO on Sep. 7, 2012, with Ser. No. 61/698,288, EFS ID 13690005, confirmation number 5053.

This application claims benefit under 35 U.S.C. §119 and incorporates by reference U.S. Provisional Patent Application for NETWORK INTEGRATION SYSTEM AND METHOD by inventors Jin (nmn) Lu and Todd Scott Kelly, filed electronically with the USPTO on Jul. 3, 2012, with Ser. No. 61/667,477, EFS ID 13167002, confirmation number 7946. This document will be referred to herein as "Document NISM."

This application claims benefit under 35 U.S.C. §119 and incorporates by reference U.S. Provisional Patent Application for POWER CONTROL SYSTEM AND METHOD by inventors Jin (nmn) Lu, Todd Scott Kelly, and Lee (nmn) Cheung, filed electronically with the USPTO on Jun. 18, 2012, with Ser. No. 61/661,100, EFS ID 13041617, confirmation number 2491. This document will be referred to herein as "Document PCSM."

This application claims benefit under 35 U.S.C. §119 and incorporates by reference U.S. Provisional Patent Application for BATTERY MANAGEMENT SYSTEM AND METHOD by Jin (nmn) Lu, Todd Scott Kelly, and Lee (nmn) Cheung, filed electronically with the USPTO on Jun. 4, 2012, with Ser. No. 61/655,099, EFS ID 12925066, confirmation number 3071.

This application claims benefit under 35 U.S.C. §119 and incorporates by reference U.S. Provisional Patent Application for SMART BATTERY CONTROLLER by inventor Jin (nmn) Lu, filed electronically with the USPTO on Oct. 4, 2011, with Ser. No. 61/542,811, EFS ID 111041133, confirmation number 3411.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods that control and monitor a variety of electrical devices. Specifically, the present invention in many preferred embodiments has application to home/commercial automation systems in which electrical power to appliances and other electrical loads is controlled and sensors are monitored via commands received from a local or remote computer network.

In many preferred embodiments the present invention allows data storage within this home/commercial automation environment to be accessed/controlled locally or remotely via an Internet-capable device such as a smartphone, a tablet computer, laptop, etc., and provides seamless data storage capabilities that are compatible with home and commercial computer networks using a wide variety of communication protocols.

Within this context the present invention permits integration of data storage to allow functionality in a coordinated/concerted fashion in network configurations that are local to and/or spanning network gateway routers and which require integration of Home Automation communication protocols (e.g., ZIGBEE®) with those (e.g., WiFi) traditionally associated with the Internet.

The main focus of the present invention is to provide a system that mediates and relays data traffic among myriad of home automation devices that communicate in different communication protocols such that:
 two home automation (HA) devices that communicate in different communication protocols can communicate with each other; and
 any HA device may be accessed from the Internet.

PRIOR ART AND BACKGROUND OF THE INVENTION

There currently exist a wide variety of home automation centers and/or servers. Most of them contain multiple communication protocols to enable them to communicate with home automation controllers and sensors using various networking protocols.

Deficiencies in the Prior Art

The prior art as detailed above suffers from the following deficiencies:
 Prior art data server systems usually employ a single fixed communication protocol to interact with external devices. This limits the usefulness in homes that deploy devices communicating in a different communication protocol.
 To address this problem, some prior art data server systems generally incorporate many networking protocols in anticipation of all potential use case scenarios. These configurations unnecessarily add to the cost and size of the device since a home usually has only one or two types of home automation devices.
 Prior art data server systems that incorporate many networking protocols do not support the communication between devices that communicate in different communication protocols.
 Prior art data server systems consume too much power if they are continuously powered. Being always enabled is a requirement when consumers or service providers want to access the device from anywhere/anytime.
 Prior art data server systems may be intrusive when deployed in a home because the network configuration maybe in conflict with the existing home network setup. As one example, if a given device has an integrated WiFi access point, the device may not communicate well with a WiFi based home gateway.

Prior art data server systems are not easily accessed by consumers from anywhere, and are especially difficult to access from outside of the home.

Prior art data server systems do not have data storage that can be accessed from home or away.

While some of the prior art may teach some solutions to several of these problems, the core issue of integrating disparate home automation networks with network accessible data storage has not been solved by the prior art.

OBJECTIVES OF THE INVENTION

Accordingly, the objectives of the present invention are (among others) to circumvent the deficiencies in the prior art and affect the following objectives in the context of a Home Automation Data Server (HADS):

(1) Provide for data server system and method that communicates with other HA devices over various communication protocols.

(2) Provide for a data server system and method that mediates the communication between two HA devices that communicate in DIFFERENT communication protocols using a type of "translating/mapping" technique.

(3) Provide for a data server system and method that relays data traffic between the Internet cloud and the HA devices.

(4) Provide for a data server system and method that allows consumers to access it securely from anywhere via the Internet.

(5) Provide for a data server system and method that allows for data storage that can be easily expanded and accessed from anywhere in the cloud via the Internet.

(6) Provide for a data server system and method that allows for data storage that is more secure and economical than storing data in the Cloud on external servers.

(7) Provide for a data server system and method that can work with any home gateway as a "client" and act as a server on the other side to the devices and sensors it controls and monitors.

(8) Provide for a data server system and method that incorporates a power management mechanism such that when a Home Automation Data Server (HADS) is powered on but not in use (meaning no data processing/data traffic), it consumes very little power.

(9) Provide for a data server system and method that provides plug-and-play expansion slots to plug in companion boards, additional communication modules, and data storage that consumers can choose based on their home setup and needs.

(10) Provide for a data server system and method that uses USB slots for expansion leveraging the popularity of USB.

(11) Provide for a data server system and method that is different from USB hub or USB relay, in that it provides for data processing, protocol translation, Internet services, etc. (a USB hub or relay is a device that expands a USB slot into multiple USB slots, and does the signal routing at the electric level).

(12) Provide for a data server system and method that differs from PC home automation systems in that it is more cost effective and consumes less power than a PC. While consumers can plug in USB dongles to a PC and configure a PC to host a web server, a PC is too expensive and cannot be kept continuously enabled due to its high power consumption. The proposed HADS system is a low power always-on device with dedicated functionality for home automation and cloud data storage.

(13) Provide for a data server system and method that differs from home based NAS (network attached storage), such as http://www.tonido.com/ and http://pogoplug.com/, by providing data storage that can interact with home automation in addition to the standard data access from everywhere. For example, the proposed HADS system data storage may archive the historical data from home automation devices and make them available to consumers.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview (0100)

The present invention in various embodiments addresses one or more of the above objectives in the following manner. The present invention as generally depicted in FIG. 1 (0100) implements a Home Automation Data Server (HADS) (0110) that acts as a mediator between two different home automation networks and a gateway between the Internet and a home automation network. The MCU (0113) interfaces with one or more wireless network interface modules (0115, 0116) which communicate to one or more computer networks that may include the WiFi-based Internet, local computer networks, and/or other networks such as BLUETOOTH®, ZIGBEE®, Z-WAVE®, Power Line Control (PLC), etc. The software on the MCU can mediate the data traffic between two different networks such that two devices respectively connected to different networks can communicate with each other. In addition, the software allows the HADS serves as a gateway between the Internet and a non-Internet home network (e.g., ZIGBEE®). Data storage (0117) is connected to the MCU so that data can be collected from external devices and stored in the data storage (0117) for access from home (locally) and away (remotely via the Internet).

System Application Context (0200)

A typical application context for the present invention is generally illustrated in FIG. 2 (0200), wherein a user (0201) interfaces with a graphical user interface (GUI) (0210) that may be embodied on any number of devices including but not limited to a mobile phone (0211), laptop/desktop computer (0212), and/or tablet computer (0213). This GUI typically operates under control of software read from a computer readable medium (0202) that incorporates network protocols that communicate over a computer network (0203) (such as the Internet) directly to the HADS (in this case HADS serves as an access point (AP)) or indirectly to the HADS via an Internet gateway wireless router (0221), which forwards the data to the HADS (0222). As a mediator, HADS (0222) relays data to the desired destination HA devices (a controller or a sensor), where the user commands are executed. In this case the HADS operates as a data bridge between WiFi home networks (0205) and other HA networks (0206) as well as an AP from other devices (laptops, tablets, etc.) (0223) to the external network (0203). In either case of direct or indirect communications, the HADS is a client to the home gateway (0221) while also acting as an AP to other devices.

Method Overview (0300)

The present invention system may be utilized in the context of an overall data server method as generally illustrated in FIG. 3 (0300), wherein the data server system described previously is controlled by a method having the following steps:
(1) searching for HA devices connected to a HADS via a HAN (0301);
(2) providing a virtual device (VD) physical-to-virtual translation for the HA device via a Communications Coordinator (CC) (0302);
(3) reporting the VD physical-to-virtual translation to a Communication Mediator (CM) (0303);
(4) mapping data publishers to data subscribers within the Communication Mediator (CM) using the VD physical-to-virtual translation (0304);
(5) transferring data from the data publishers to the data subscribers through the HADS using the VD physical-to-virtual translation in the Communications Coordinator (CC) (0305); and
(6) proceeding to step (1).

Integration of this and other preferred exemplary embodiment methods in conjunction with a variety of preferred exemplary embodiment systems described herein is anticipated by the overall scope of the present invention.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
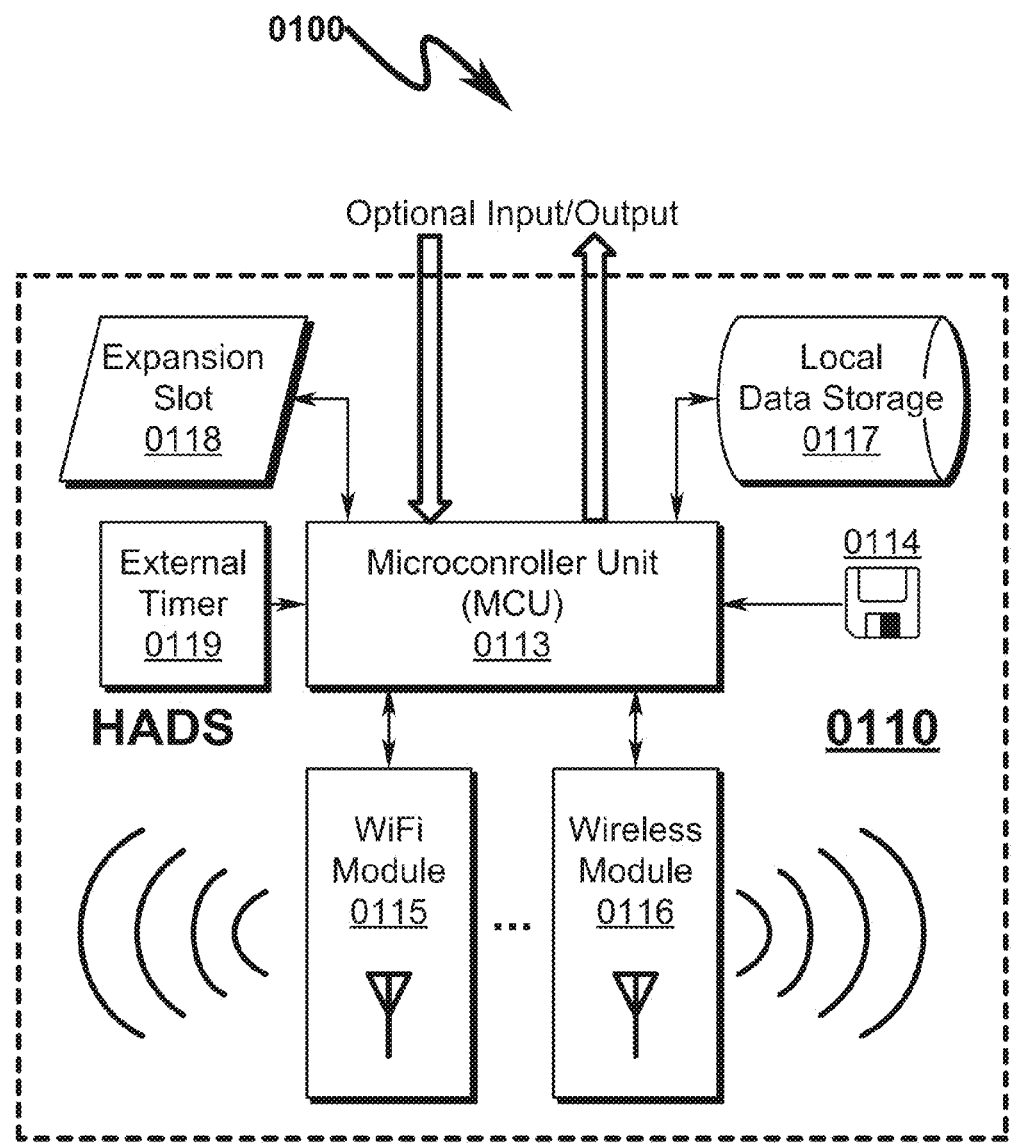
FIG. 1 illustrates a system block overview diagram describing a presently preferred embodiment of the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a DATA SERVER SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Automation not Limitive

The terms automation, energy control, energy management, sensor data reading, and home device control are used interchangeably within the context of the present invention.

Computing Device not Limitive

The present invention may make use of a wide variety of computing devices in its general theme of construction. While microcontroller unit (MCU) construction may be optimal in many circumstances, the present invention is not limited to this particular form of construction and the term "computing device" and "MCU" should be given their broadest possible definitions in this context.

Portable Computing Device not Limitive

The present invention anticipates a wide variety of applications for the data server system/method taught herein. Within the application context, the term "portable computing device" and its variants should be given its broadest possible interpretation, to include but not limited to laptop computers, cellphones, tablet computers, and other like and typical applications where computing devices are configured in a portable or semi-portable manner. While the present invention anticipates that the computational capability of the "computing device" described herein may vary widely, it is anticipated that some aspects of the present invention may be implemented using software embodied in computer readable program code means embodied on a tangible medium that is computer readable.

SGPC/HADS not Limitive

The present invention may in many preferred embodiments be described as a Home Automation Data Server (HADS) that may incorporate many of the features of a Smart Gateway Power Controller (SGPC) as previously described in documents referenced by this patent application. The HADS functionality may be generally thought of in many preferred embodiments as a superset of SGPC functionality, with the additional components being related to data services. While a SGPC focuses on power control and energy measurement, HADS focuses on mediating the inter-networking among HA devices and data storage.

Connected to not Limitive

Within the scope of the present invention the term "connected to" and "present in" may be used interchangeably to reflect the logical connection of entities within a computer network. Thus, for example, "present in" a HAN is equivalent to "connected to" a HAN for the purposes of the present invention scope.

Invention Nomenclature

The following nomenclature is generally utilized to describe the invention herein:

Home Area Network (HAN) or Home Network—A residential or commercial local area network (LAN) for communication between digital devices typically deployed in the home, usually desktop computers and accessories, such as printers and mobile computing devices.

Home Gateway—A home networking device, used as a gateway (router) to connect devices in the home to the Internet.

Subnetwork or Subnet—A logically visible subdivision of an IP network. The practice of dividing a single network into two or more networks is called subnetting and the networks created are called subnetworks or subnets.

Sub-Gateway—A gateway which itself is a device in the main HAN, but is a gateway to a subnet separate from the main HAN.

WiFi—A popular technology that allows an electronic device to exchange data wirelessly (using radio waves) over a computer network, including high-speed Internet connections.

WiFi Access Point or AP—A device that allows WiFi stations (clients) to connect to each other, the AP and a wired network. An AP usually connects to a router (via a wired network), and can relay data between the wireless devices (such as computers or printers) and wired devices on the network.

WiFi Station or STA—A device that has the capability to use the 802.11 protocol. For example, a station may be a laptop, a desktop PC, PDA, Wi-Fi phone. A STA may be fixed, mobile, or portable. The terms station, wireless client, and node are often used interchangeably, and no strict distinction exists between these terms.

ZIGBEE®—A specification for a suite of high level communication protocols using small, low-power digital radios based on an IEEE 802 standard for personal area networks.

Home Automation (HA)—Automation of the home, housework or household activity. Home automation may include centralized control of lighting, HVAC (heating, ventilation and air conditioning), appliances, and other systems, to provide improved convenience, comfort, energy efficiency, and security.

Home Automation Data Server (HADS)—A HA device directed towards providing data storage services within a HAN.

Home Energy Management System—An extension of EMS into home, where a smart thermostat, a smart meter and a few load control switches are installed and can be remotely accessed (read) and controlled.

IP Address—A numerical label (e.g., 10.10.100.254) assigned to each device (e.g., computer, printer) participating in a computer network that uses the Internet Protocol for communication.

Port—Associated with an IP address of the host, identifying an application or a server on the host.

Port Number—A 16-bit number identifying a port. A networking application is uniquely identified by the pairing of IP address and port number.

Public IP address—An IP address that can be globally pinged or routed from Internet.

Private IP Address—An IP address of a device associated with a private network (e.g., a home network).

Firewall—A technological barrier, usually residing at a home gateway, designed to prevent unauthorized or unwanted communications between computer networks or hosts.

Network Address Translation (NAT)—The process of modifying IP address information in IP packet headers while in transit across a traffic routing device. A home gateway usually employs this mechanism to route data between public Internet and private home network.

Actuator—A type of device, including motors, switches, or regulators for moving and/or controlling a mechanism or system.

Sensor—A converter that measures a physical quantity and converts it into a signal which can be read by an observer or by an (mostly electronic) instrument.

Mesh Network—A type of network where each node not only captures and disseminates its own data, but also serves as a relay/router for other nodes, that is, it must collaborate to propagate the data in the network.

Node—A connection point, either a redistribution/routing point or a communication endpoint (some terminal equipment). A physical network node is an active electronic device that is attached to a network, and is capable of sending, receiving, and/or forwarding information over a communications channel.

SGPC—Smart Gateway Power Controller, a networked device that can control electronics devices incorporating on/off power control and energy measurement capabilities. A typical SGPC is WiFi based.

Companion Devices—A SGPC can communicate and coordinate with non-WiFi based devices to perform home automation functionality. These non-WiFi devices are called companion devices with respect to a SGPC.

BIG DATA—a term used to describe data sets so large and complex that they become awkward to work with traditional database management tools. Examples include web logs, sensor networks, social networks, Internet text and documents.

Home Automation (HA) Device (HAD)—a physical device that contains a sensor and/or actuator to perform a home automation function. In this document, the term device and home automation (HA) device are interchangeable.

Home Automation (HA) Network (HAN)—a type of HAN, it is a network connecting HA devices that supports a standardized network protocols such as WiFi or ZIGBEE®.

Virtual Device (VD)—a map of home automation device such that the vendor-specific messages are converted to a set of common messages, so all HA devices appear to be the same devices to applications on a system. Note that it is different than the concept of a virtual device in an operating system.

Data Publisher—a data source that produces data for any other objects to use.

Data Subscriber—an object that subscribes and uses certain types of data.

Host—a system that contains a connection to the Internet, a CPU/MCU, a few communication modules. In this application, it refers to the home automation server.

Standard Message—the messages on the host/server that are independent of particular communication network and home automation devices.

Subnet Message—the messages specific to a subnet and the connected home automation devices. Subnet messages are sent between a home automation device over a subnet and the corresponding Communication Coordinator (CC).

Communication Mediator (CM)—A process that replays and routes standard messages to the proper destinations. The terms Mediator and Communication Mediator are used interchangeably.

Communication Coordinator (CC)—a process that converts between standard messages and subnet messages.

System Overview (0100)

The present invention in various embodiments addresses one or more of the above detailed objectives in the following manner. The present invention as generally depicted in FIG. 1 (0100) implements a Home Automation Data Server (HADS) (0110) that acts as a gateway between Internet and the HA devices and a mediator between two different HA network. The HADS (0110) incorporates multiple fixed or removable wireless modules. The MCU (0113) interfaces with the wireless network interface modules (0115, 0116) which communicate to one or more computer networks that may include the WiFi-based Internet, local computer networks, and/or other networks such as ZIGBEE®, etc. The MCU (0113) provides for the ability to access data storage (0117) while also providing capabilities for one or more expansion slots (0118) to permit access to external devices such as USB disks and other devices, etc.

System Application Context (0200)

Figure 2:
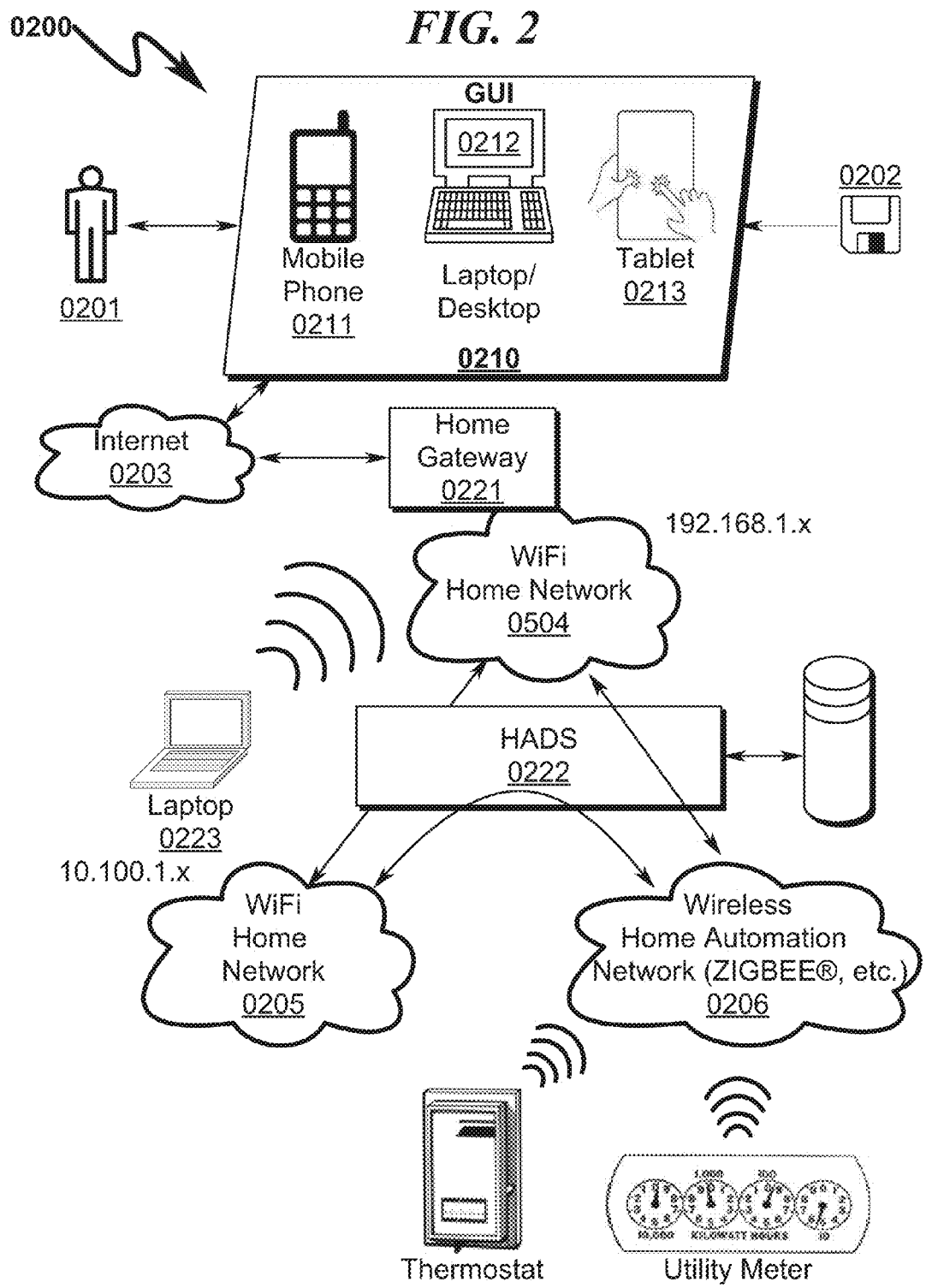
FIG. 2 illustrates a exemplary communications network diagram describing a presently preferred system embodiment of the present invention.
Figure 3:
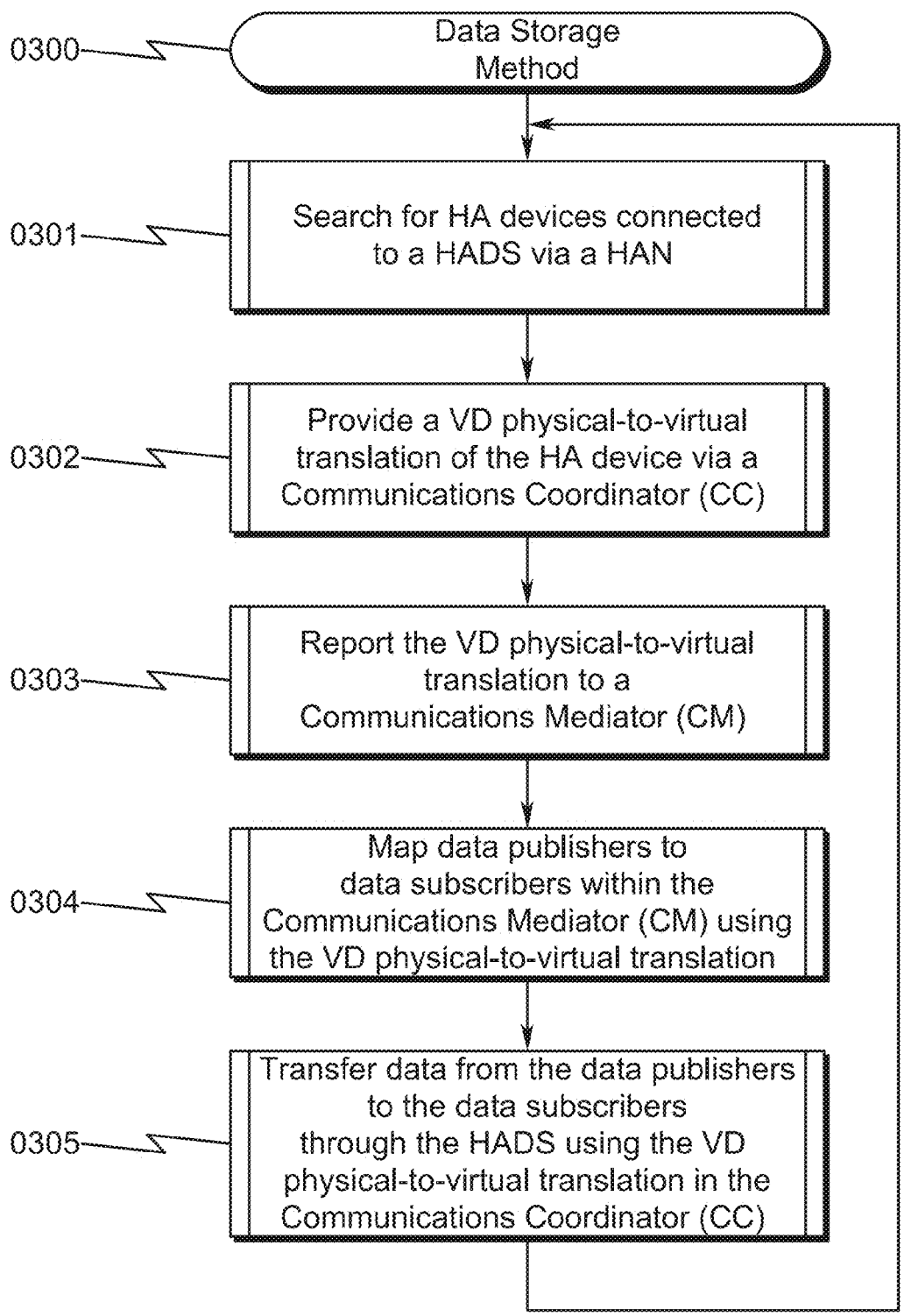
FIG. 3 illustrates an exemplary flowchart describing a presently preferred method embodiment.

A typical application context for the present invention is generally illustrated in FIG. 2 (0200), wherein a user (0201) interfaces with a graphical user interface (GUI) (0210) that may be embodied on any number of devices including but not limited to a mobile phone (0211), laptop/desktop computer (0212), and/or tablet computer (0213). This GUI typically operates under control of software read from a computer readable medium (0202) that incorporates network protocols that communicate over a computer network (0203) (such as the Internet) directly to the HADS (in this case HADSs are APs) or indirectly to the HADS via an Internet gateway router (0221). The HADS, as a mediator, forwards the data traffic to home devices over a HA network, where the user commands are executed. For example, a switch may be turned on and a sensor read to obtain its measurement data. In the direct communication with a HADS, the HADS acts as an AP to consumer devices and at the same time may act as a client to a home gateway (0221).

Extension of SGPC Architecture (0400)

Figure 4:
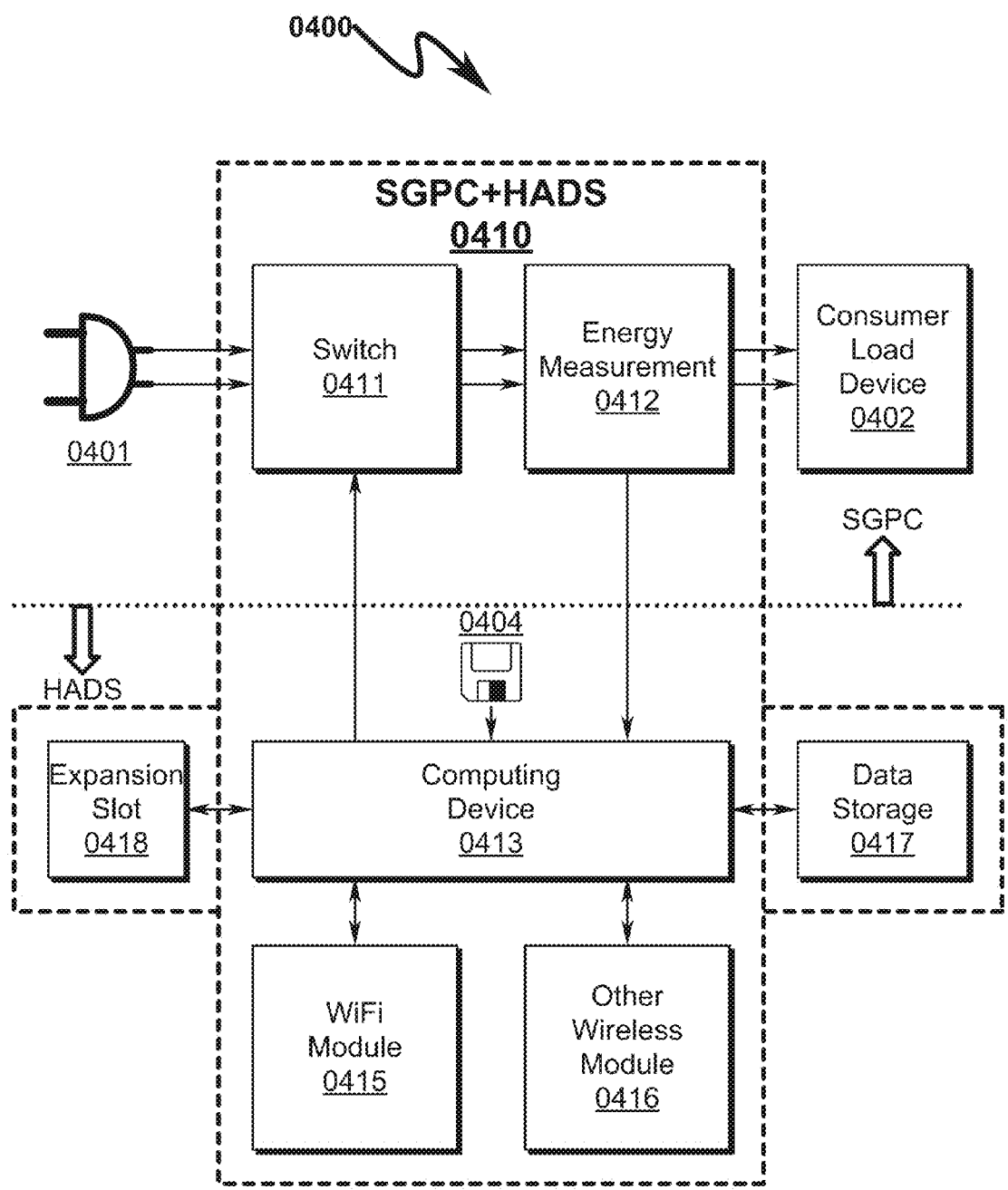
FIG. 4 illustrates an exemplary system application context for some preferred embodiments of the present invention.

The present invention may be in some embodiments described as an extension of the Smart Gateway Power Controller (SGPC) architecture described in Document PCSM and Document NISM. Within this context, an exemplary system configuration is generally illustrated in FIG. 4 (0400), wherein the SGPC controller (0410) is interjected between a power source (0401) and a consumer load device (0402). The SGPC (0410) power switch (0411) and energy measurement circuitry (0412) serve to switch/monitor power (0401) to the load device (0402) under control of a computing device (0413) that executes machine instructions read from a computer readable media (0404). Wireless communication interfaces (0415, 0416) permit the computing device (0413) to interact with computer networks through both wireless routers and home automation networks.

To this SGPC (0410) hardware complement are added data storage (0417) and/or one or more expansion slots (0418) for the incorporation of local data storage and/or additional communication interfaces that operate in a plug-and-play fashion as enabled by application interface software.

Home Automation Data Server (HADS) Exemplary Embodiment

Overview (0500)

The present invention in many preferred exemplary embodiments describes a home automation server that provides the following functionality:
- allows consumers to remotely control and monitor home automation devices including sensors and controllers/actuators (e.g., switches), and access a secure and home-based data storage;
- works with multiple communication protocols; and
- serves as a home automation data storage/filter and allows users to upload/download data for further analysis.

Figure 5:
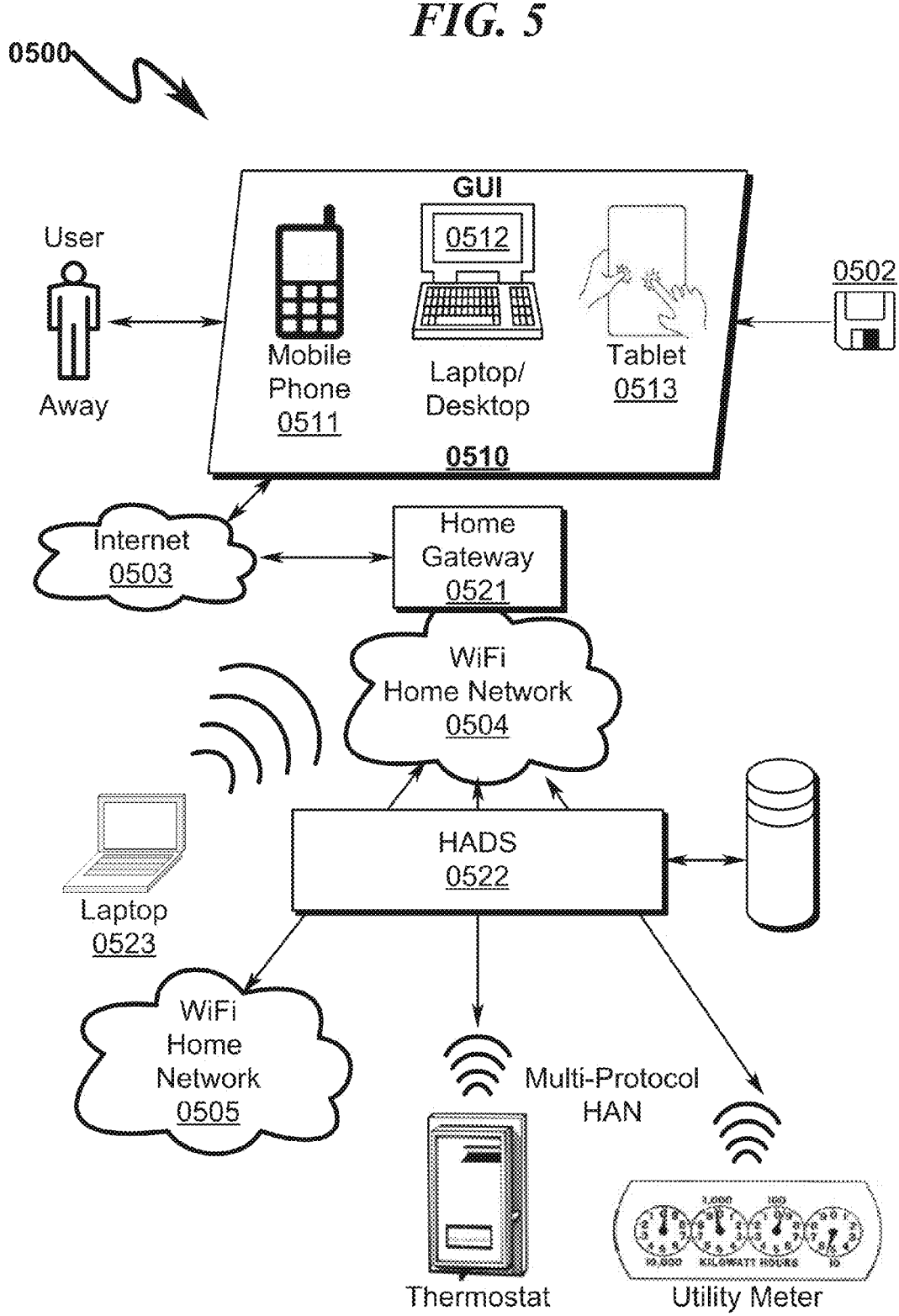
FIG. 5 illustrates an exemplary system application context for some preferred embodiments of the present invention.

FIG. 5 (0500) illustrates this functionality. In contrast to many home automation devices, this server does not necessarily contain sensors (e.g., energy measurement) and actuators (e.g., switches) itself. Rather it is primarily a mediator and coordinator of devices that contain sensors and actuators. Many preferred invention embodiments comprise a small form-factor box residing at home, with connection to the Internet, home network, and/or home automation devices. This device will be termed a "Home Automation Data Server (HADS)" within the exemplary embodiment discussion herein. A typical HADS has the following features/characteristics:
- It is always on but consumes very little energy when in idle/standby state.
- It manages home automation devices by acting as a network gateway/inter-mediator to various networking protocols used by home automation devices. These protocols include but are not limited to WiFi, BLUETOOTH®, ZIGBEE®, Z-WAVE®, Power Line Control (PLC), etc.
- It converts/translates control message and sensor data from one protocol to another in the case the receiver and sender of control message/sensor data "speak" different communication protocols.
- Consumers can control home devices through HADS from any location (home and/or away).
- Consumers can monitor home sensors (including utility meters) through the HADS from any location (home and/or away).
- It contains a private cloud data storage that can be accessed from any location (home and/or away).
- The data storage stores data collected from sensors and actuators.
- It contains expansion slots to plug-and-play "daughter" boards such as USB dongles or serial dongle/boards to provide added communication protocols, data storage, and functionality.
- The plug-and-play dongles and daughter boards support various communication protocols mentioned above.
- HADS hosts a web server that can be accessed everywhere to monitor, configure, and control home devices as well as upload and download data/files to/from home based data storage.

Home Based Cloud Data Storage for Home Automation Data (0600)

For individual consumers, cloud data storage has the following benefits:
- easy access from everywhere;
- always being available;
- free from the hassle of managing the system; and
- cost free.

These benefits are obtained at the expenses of giving up certain sense of security and privacy when the consumer's data is on some else's data storage. A recent article on LA Times "Data Privacy Protections Vary In Cloud" (Apr. 28, 2012 B2) highlighted the dilemma of cloud computing for individual consumers.

Traditionally, consumers like to put data on a USB dongle to move data around and share with their friends. The data is secure if the USB dongle is kept in owner's possession. The problem is that USB dongle has to be physically plugged into a computer and is not as convenient as cloud based data storage.

The data storage in the HADS has all the benefits of cloud storage without sacrificing security and privacy. It is a home based cloud system, and has the following features:
- Always available with storage located at home;
- Accessible from everywhere, home or away;
- Idle with very little power consumption when not in use;
- Waked up instantly when being accessed remotely;
- Synchronize with all "Internet" devices, smartphone, IPAD®, laptop, etc., owned by the consumers; and
- Capable of networking with other HADSs to form a "private cloud".

Figure 6:
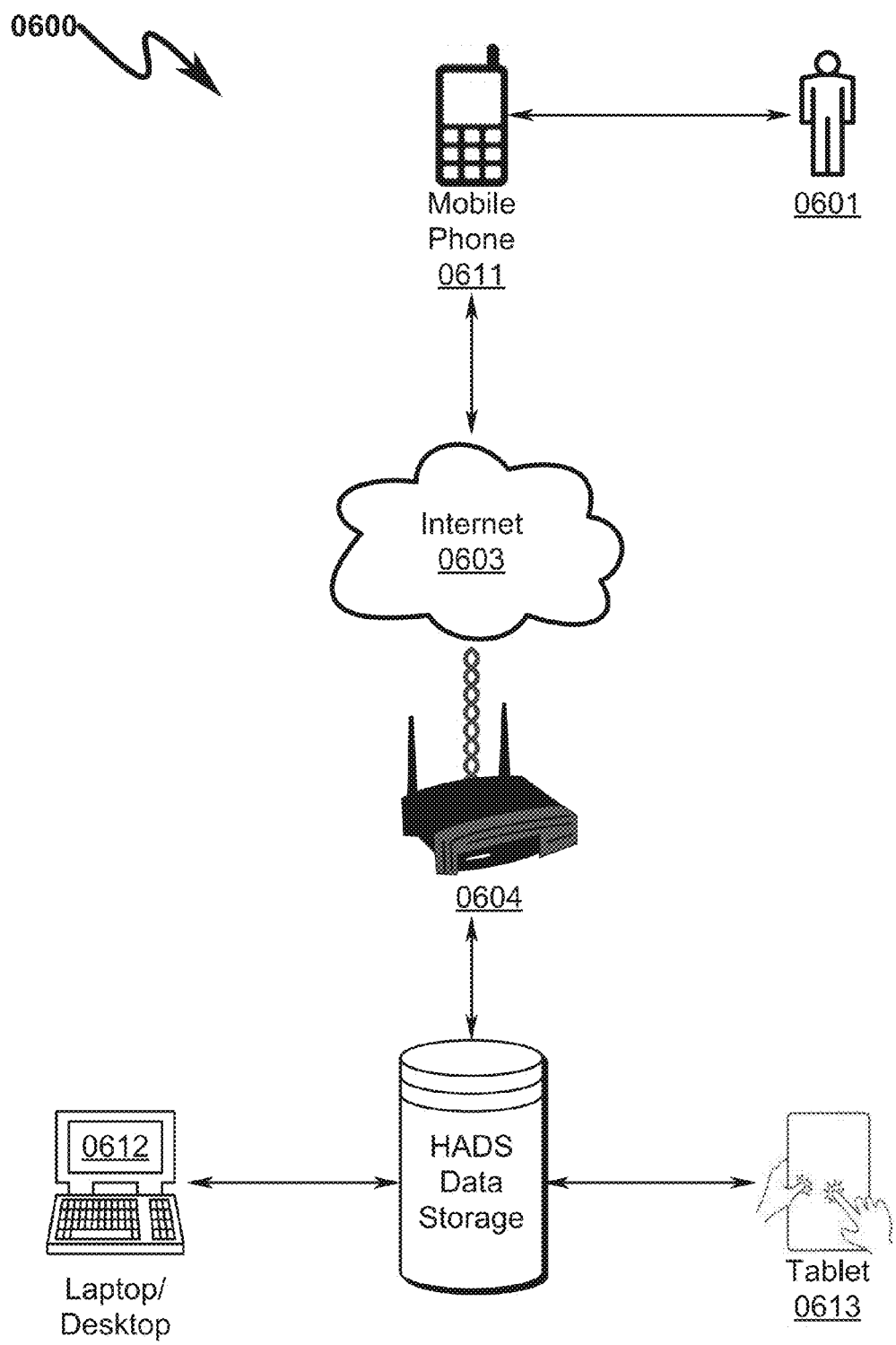
FIG. 6 illustrates an exemplary system application context for some preferred embodiments of the present invention.

When accessing the data storage on HADS, it appears to be a local directory to any computers and smart Internet devices, just like a USB storage dongle. FIG. 6 (0600) generally illustrates typical usage of the data storage capabilities within an exemplary HADS system context.

Consider the following exemplary use cases for the data storage:

Use case scenario 1: The user loads a file in the data storage directory from her laptop, turns off the computer and goes to work. In the user's office, she turns on her office computer, gets access to the HADS (see the networking discussion above). The desired file is in the data storage directory, and she continues to work on it, and saves the file. When she gets home, the updated file is on HADS.

Use case scenario 2: The user downloads a music file to her laptop, and drops it to the HADS data storage directory. The user is away from home now, and wants to listen to that music with her smartphone. She opens her smartphone and obtains access to the HADS, the music file is in the data storage directory. She downloads the music file to her smartphone and plays it.

The advantages of the data storage on HADS include the following:
- Security. The user may have peace of mind, knowing that their data is physically located in their home. Third parties have no "legal" or illegal ways to inspect the data without breaking into the user's home or obtaining a search warrant.
- The user may easily backup their data.
- The user may change their storage limit easily (e.g., from 20 GB to 40 GB).
- The user may always access it at home regardless whether the external Internet is available or operational.

Introduction

A typical HADS system has three purposes:
- It allows home automation devices of different types in terms of communication protocols and manufacturers to work together;
- It allows consumers to configure and monitor home automation devices from Internet and at home; and It stores the home automation data and filters data for Internet access.

These features and capabilities will now be discussed in further detail.

Heterogeneous Home Automation Network

A home automation system allows consumers to remotely monitor and control (e.g., turn on/off) electronics devices at home, including TVs, air conditioners, washing machines, garage door openers, window openers, electric fans, home security/surveillance cameras, thermostats, etc. A home automation system also allows consumers to read sensor data, including utility meters, thermostats, smoke detectors, temperature, and/or ambient sensors. A home automation system can control a device based on a preset schedule or certain conditions/events. For example, a device can be set to turn on and off based on a sensor measurement value.

Many communication protocols are used for home automation. For example, consumers can use BLUETOOTH®, ZIGBEE®, WiFi, PLC (Power Line Control), and any proprietary protocols to remotely communicate with the sensors and actuators. While the sensors and actuators are more or less simple, it is the integration of communication protocols and energy profiles that differentiate one product from another.

Traditionally, a home automation system is a "closed" network of devices, meaning the automation network is not connected to the Internet. A dedicated remote control device is usually necessary to interact with the automation system. For example, a ZIGBEE® based home automation system may require a remote control that sends control commands modulated in ZIGBEE® signal to ZIGBEE® devices.

In recent years, a variety of WiFi based home automation devices have been developed. They can be controlled with any WiFi enabled devices, including laptop, computer tablets, and smartphones. This makes it possible to control a WiFi home automation device from anywhere with Internet. See Document PCSM for further information.

If a "translator/router" is placed between WiFi and other communication protocols, it can extend the reach from the Internet automation domain to non-Internet automation domain. The disclosed HADS invention embodiment provides a gateway that uses WiFi as the connection to the Internet, and translates/routes messages between the Internet to the non-Internet sub-networks.

Despite the myriad of communication protocols used in home automation, it is clear most communication protocols will eventually converge to a few popular home automation communication protocols. Before that time arrives, however, home automation systems may use a wide variety of incompatible home automation network protocols.

Fortunately, within a given home, it is unlikely that there are more than two or three different types of home automation devices in terms of communication protocols. It would be useful to have a home automation server that can be configured to communicate with the given number of different types of home automation devices. HADS provides a reconfigurable architecture that contains a ubiquitous WiFi connection and expansion slots, allowing consumers to plug in a wide variety of plug-and-play communication modules. HADS typically uses USB and serial expansion slots and open source GNU/LINUX operating system to support this reconfigurable architecture.

It should be noted that USB slots are chosen for expansion because almost any home network or home automation communication modules are available in the form of USB dongles or serial boards. All of these dongles/boards are supported by GNU/LINUX software drivers.

In addition to this plug-and-play architecture, HADS may include the following functionalities:

It registers with a home gateway as a client via WiFi protocol. In this manner, installing a HADS is a matter of simply plugging in the power to the HADS, and the HADS will do the self-registering with the home gateway.

It acts as a WiFi AP simultaneously so that other WiFi devices can communicate with HADS as clients. This mode of acting both as a client to an AP and also acting as an AP to other devices is called concurrent AP-CLI mode. In this mode, the AP part of HADS has its own subnet which is separate from the home network as generally illustrated in FIG. 2 (0200).

It hosts a web server and a TCP/IP server. The Internet cloud outside the home interacts with the HADS, through the home gateway, either by visiting the HADS web server or communicating with the TCP/IP server.

Within the home network, consumers can directly visit HADS over the WiFi connection.

The interactions between the consumers and a HADS can include any of the following functions:
  Configure a home automation device;
  Monitor the status of a home automation device;
  Read the data of a sensor; and/or
  Start a control action of an actuator.

When an interactions involves a device or a sensor in a non-WiFi protocol, the HADS maps/translates the request into the proper protocol and forward it to the target device. In the reverse direction, a HA device in a non-WiFi protocol can send data to the HADS after the non-WiFi protocol is translated back to the proper format for data archiving or forwarding to consumers While the HADS is always powered on, it spends most of time in a standby mode (or idle mode), meaning that it listens to the traffic without processing any request or data. The HADS consumes very little power when in standby mode.

Data Storage For Home Automation

While the social network—interaction between human beings anywhere/anytime/anything—is in fashion today, the next bigger trend will be Internet-Of-Things (IOT), or interaction between human being and physical devices anywhere/anytime/anything.

The term BIG DATA has been coined to describe large amounts of structured or unstructured data coming from the interaction between human beings and various IOT sources in high speed data capture. Historical sensor data and actuator action data from homes comprise one aspect of BIG DATA.

As the Internet is flooded with home automation data, energy management data, and data from IOT, a network with distributed servers is needed so as to permit only processed or selected data to be sent over backbone communication networks.

The HADS as described herein has a local data storage unit that enables storage of large amounts of home automation data. It can be viewed as a distributed data server, and combined with other HADSs located in other homes, forms a network of distributed data servers.

Data is processed by the home automation server to permit authorized users and/or service providers to monitor and/or download the raw/unstructured data and/or processed data from anywhere. In addition, users may put other types of data on the storage unit and access/share with friends and colleagues their files/pictures/data anywhere/anytime.

HADS Architecture Overview (0100)

FIG. 1 (0100) illustrates an exemplary physical diagram of the device. It contains one MCU (0113), a WiFi module (0115), a ZIGBEE® module (0116), optional data storage (0117), and expansion slots (0118). Presently preferred exemplary invention embodiments may incorporate two expansion slots, which can be USB slots or serial connectors, but can equivalently be other types of expansion slots. The WiFi module is responsible for communicating with a WiFi home gateway and other WiFi devices including, laptops, PCs, and WiFi home automation devices. The ZIGBEE® module is responsible for communicating with ZIGBEE® devices and sensors. The MCU is responsible for mediating the WiFi/IP messages to/from the ZIGBEE® module, data storage, and the plugged-in modules. As discussed elsewhere herein, an external timer can wake up the whole system from a sleep mode.

The WiFi module, ZIGBEE® modules, and/or other communication modules are the "base stations" for the wireless HA devices. They serve as gateways between the Internet and the HA devices connected to them. For example, the WiFi module works as an AP, and the ZIGBEE® module works as a ZIGBEE® coordinator, as shown in FIG. 2 (0200).

The WiFi module is also responsible for communication with the home gateway, so that the HADS is connected to the Internet though the wireless home gateway. In this case, the WiFi module acts as a station (STA) to the wireless home gateway. The dual roles (AP to its subnet and station to a home gateway) of the WiFi module are discussed below.

System Components (0900)

Figure 9:
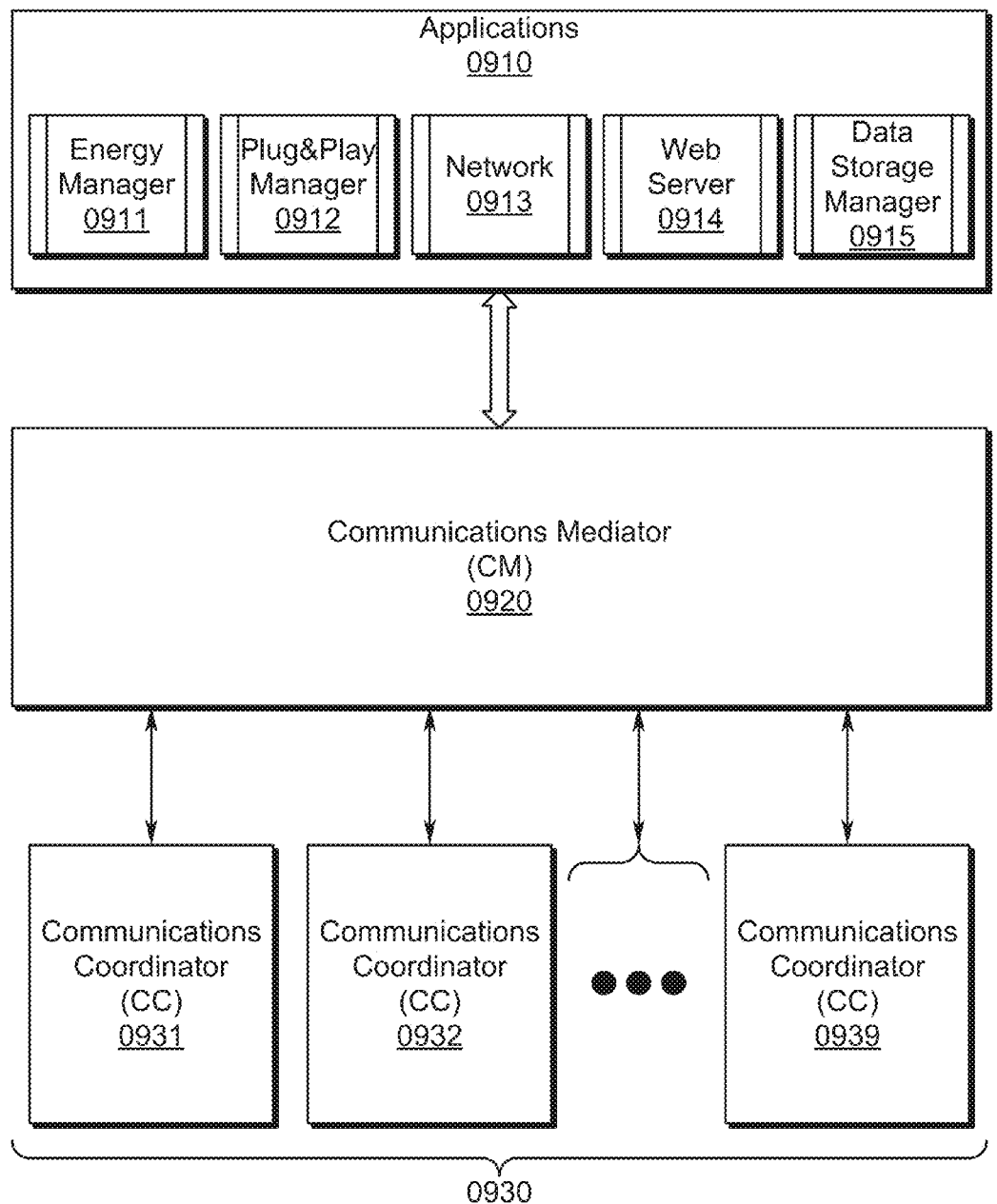
FIG. 9 illustrates an exemplary schematic block diagram of a preferred exemplary HADS embodiment.

FIG. 9 (0900) generally illustrates the system architecture of a typical HADS system. This typical HADS embodiment comprises the following functional components:

Applications Interface (AI) (0910). Applications manage energy (0911), plug-and-play (0912), Internet connections (0913), a web server (0914), and data storage (0915), among other things. The web server provides a UI that allows users to monitor and control all the home automation devices connected to Communication Coordinators. The energy management application is responsible for the server's own energy consumption management.

Communication Mediator (CM) (0920). The Communication Mediator (CM) is responsible for mediating the communication between the Internet and the Communication Coordinators and the communication between Communication Coordinators. The Communication Coordinators communicate with each other via the Communication Mediator (CM).

Communication Coordinators (CC) or Communications Adapters (CA) (0930). Each Communication Coordinator (CC) is associated with a subnet. Physically, the CC is a software process supporting a communication module. A CC is responsible for communicating with all the devices connected to the subnet, and serves as the gateway between Internet and subnet. As part of its function, it must convert the messages specific to the subnet to a common set of messages suitable for the host. The CC may also be identified as a Communication Adaptor (CA).

Communication Scope (1000, 1100, 1200, 1300, 1400)

There are a variety of types of communication in terms of data sources and destination targets. Presently preferred embodiment applications consider the communications between a subnet and Internet, and between two subnets. In other words, the present invention communication scope only considers the interactions between the devices in different subnets through the communication mediator (CM) and the Communication Coordinators (CC) as generalized in the communication flow depicted in FIG. 10 (1000). The communications between two devices connected on the same subnet are considered as "internal" communication of a Communication Coordinator, and are not discussed herein in further detail. See Document NISM for information regarding communication inside a subnet. Also, a HADS may or may not contain a sensor or an actuator to do the home automation job itself, as its main focus is to connect home automation devices to Internet and allow them interact with each other as well as the Internet. In addition, it provides data storage that can be accessed everywhere.

Figure 11:
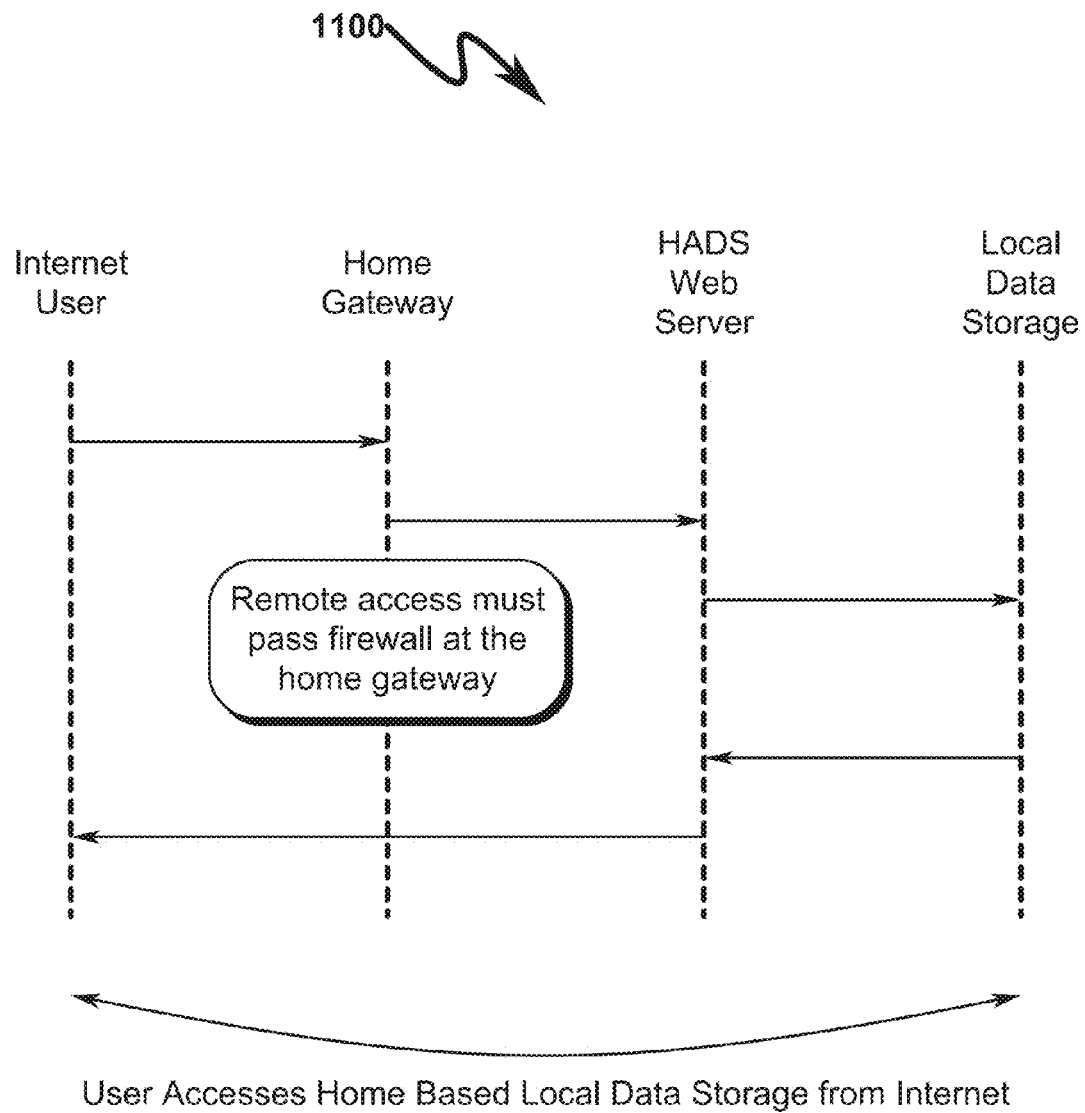
FIG. 11 illustrates an exemplary data flow depicting a user accessing a home based data storage from the Internet.

The following illustrate a few typical use case communications scenarios:

Scenario 1 (Cloud↔home gateway↔HADS web server↔ data storage). A user in the Internet cloud gets access to the web server of the HADS at home, and reads the historical data collected from sensors and actuators that are stored on HADS-attached data storage devices. In addition, the user may download or upload data from/to the HADS data storage. How the user obtains access to the HADS is discussed below. The data flow goes from Internet to the HADS web server via the gateway and WiFi connection, and to the HADS application managing the data storage. The application will send the desired data back to the user along the corresponding reverse path. This communication scenario is depicted in FIG. 11 (1100).

Figure 12:
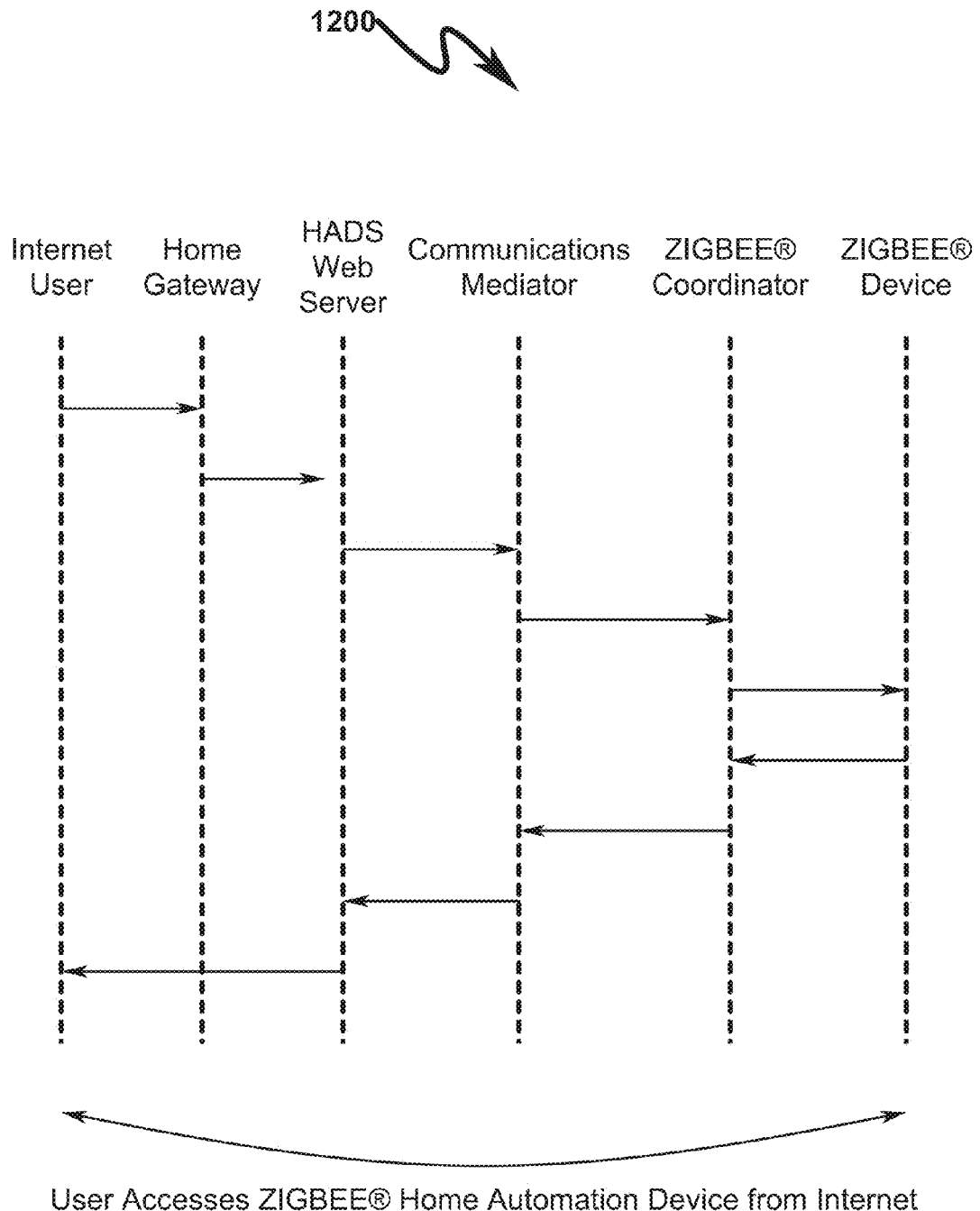
FIG. 12 illustrates an exemplary data flow depicting a user accessing a ZIGBEE® home automation device from the Internet.

Scenario 2 (Cloud↔home gateway↔HADS web server↔ mediator↔ZIGBEE®). A user in the Internet cloud gets access to the web server of the HADS at home, and monitors a ZIGBEE® device connected to the ZIGBEE® subnet and exercises a control on it. The data flow goes from Internet to the HADS via the gateway and WiFi connection, and to the HADS Communication Mediator (CM). The Communication Mediator (CM) redirects the data to ZIGBEE® coordinator, which delivers the data to the destination ZIGBEE® device. The desired data obtained from the ZIGBEE® device come back to the user along the corresponding reverse path. This communication scenario is depicted in FIG. 12 (1200).

Figure 13:
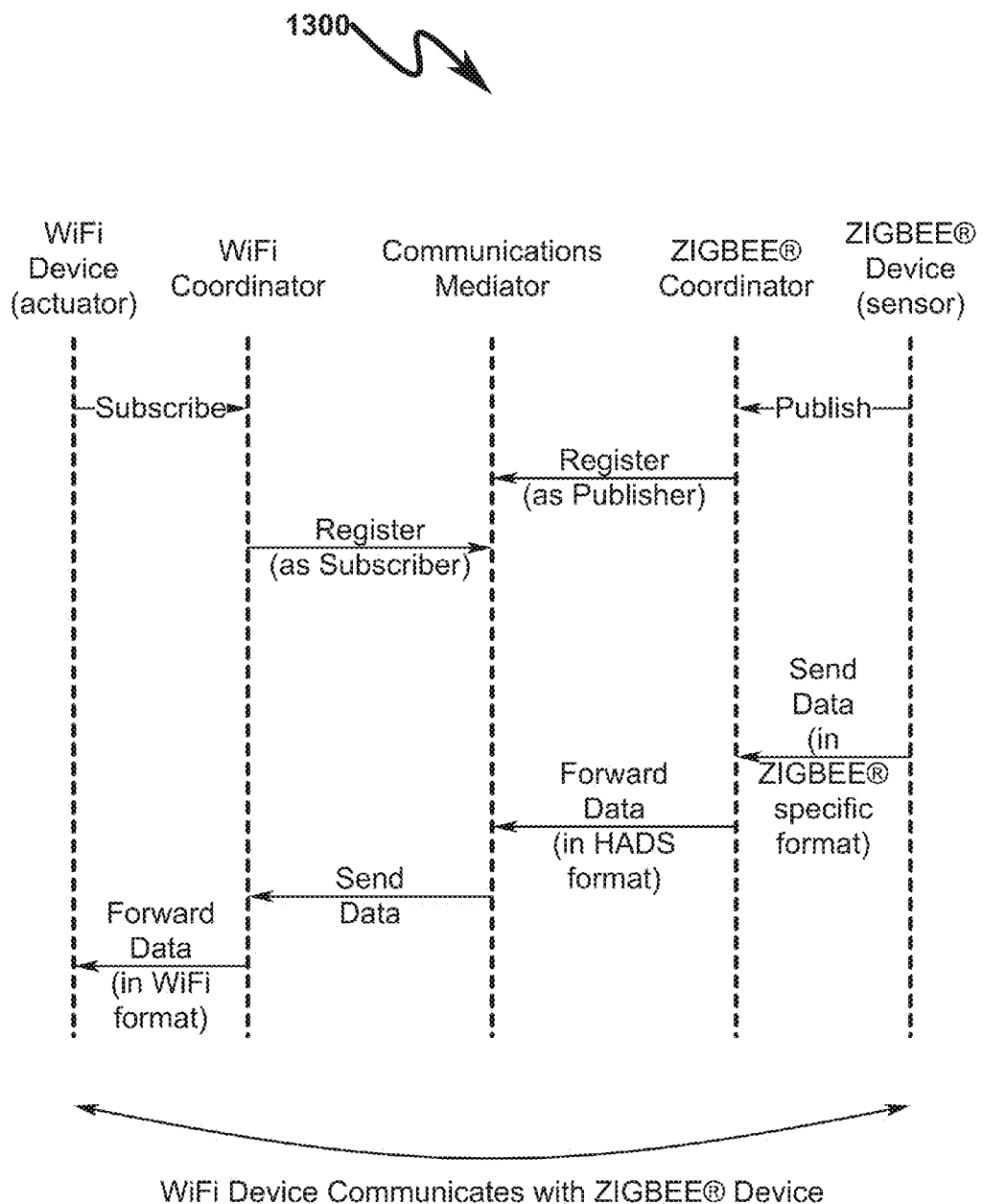
FIG. 13 illustrates an exemplary data flow depicting a WiFi device communicating with a ZIGBEE® device.

Scenario 3 (WiFi device↔WiFi AP↔Mediator↔ZIGBEE® Coordinator↔ZIGBEE® Client). A WiFi device needs to get some information provided by a ZIGBEE® device. The WiFi coordinator (WiFi AP) registers the WiFi device with the Communication Mediator (CM) as a subscriber for a certain type of information. The ZIGBEE® coordinator registers a ZIGBEE® device with the Communication Mediator (CM) as a publisher that can provide certain type of information (e.g., some sort of sensor data). The Communication Mediator (CM) does the match making and pairs the subscriber and the publisher. Assuming that in this case the WiFi device is interested in the same type of information as the ZIGBEE® device can deliver, the Communication Mediator (CM) pairs the subscriber and the publisher. When the ZIGBEE® device has the data and sends to its coordinator, the latter converts the data message to a format the Communication Mediator (CM) can understand and forward to the Communication Mediator (CM). The Communication Mediator (CM) sees the message, finds the subscriber for it, and delivers the message to the WiFi coordinator, which forwards to the destination. This communication scenario is depicted in FIG. 13 (1300).

Figure 14:
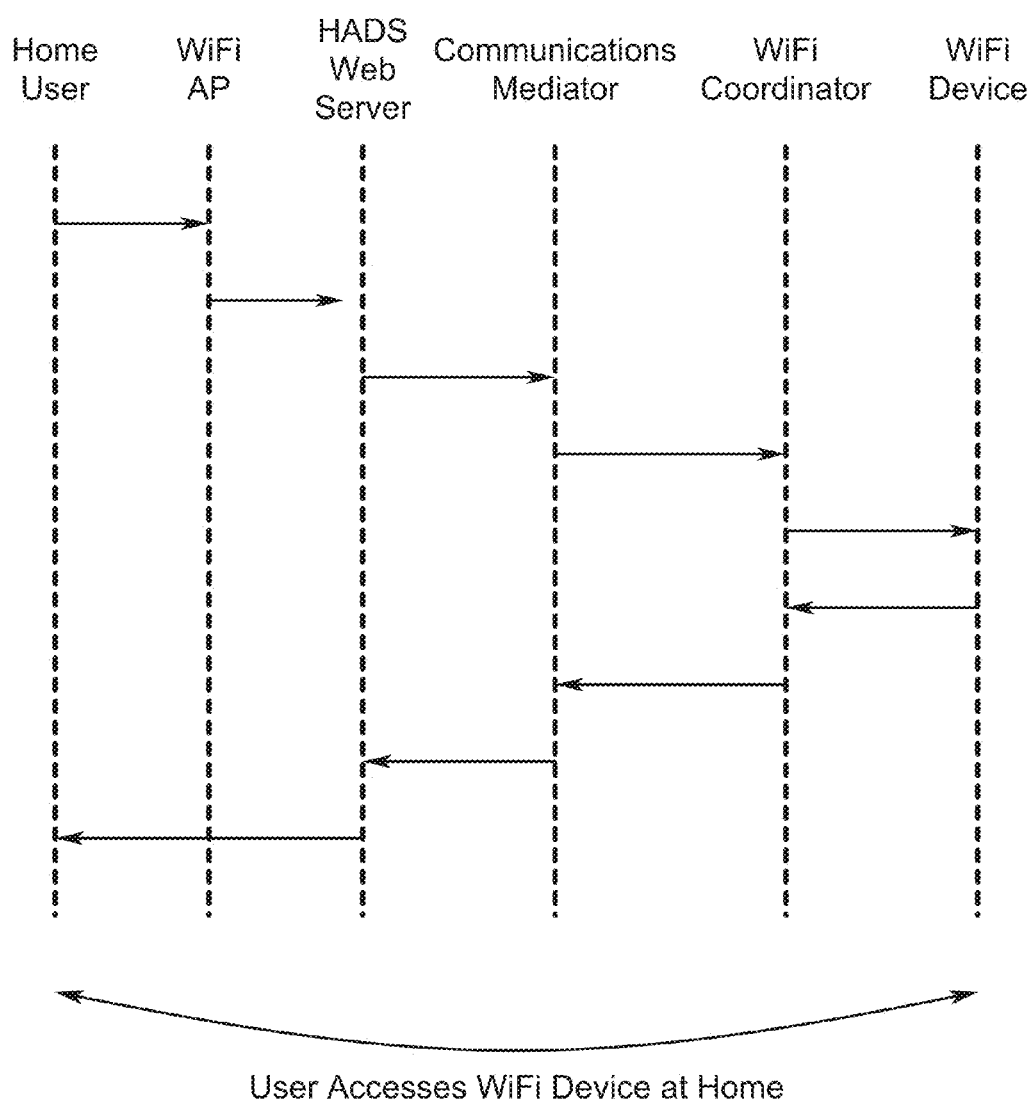
FIG. 14 illustrates an exemplary data flow depicting a user accessing a WiFi device at home.

Scenario 4 (User at home↔WiFi↔HADS Web server↔mediator↔WiFi coordinator↔WiFi device). A user at home can directly access the HADS web server via WiFi connection (without going through Internet). This communication scenario is depicted in FIG. 14 (1400).

The functional components of the HADS are discussed in the following sections.

Networking

The goals of a HADS data storage network include security, privacy protection, non-intrusiveness, and convenience. The standard WiFi mechanism, TCP/UDP/IP protocol stack, and the web server will not be further addressed in this document, as they are well known to those skilled in the art. Rather, this application disclosure will focus on the special home automation features implemented on top of standard WiFi and Internet protocols.

Concurrent AP-CLI Mode

At home, a HADS registers with a home gateway as a client via its WiFi module. While the HADS is registered as a client with an existing home gateway, it can act as gateways in the same time to one or more subnets of its own. Home automation devices may join one of its subnets. These subnets usually are associated with different protocols. For example, one subnet may have WiFi with another subnet having ZIG-BEE®. This structure is illustrated in FIG. 2 (0200). A typical HADS system routes the data traffic between its applications and the subnets and between any two subnets. This architecture of subnets has the following advantages:

Performance. All traffic between the HADS and its clients do not affect the traffic of a home network.
Privacy. An extra firewall may be added at the subnet gateways for additional privacy and security.
Stability. A subnet is not affected by the change of home gateway or other subnets.

It should be noted that the WiFi module acts as an AP (gateway to its subnet) so that other WiFi devices can join its subnet and communicate with HADS as clients. This mode of acting both as a client to an AP and also acts itself as an AP to its own clients is called concurrent AP-CLI mode. In this mode, the AP part of HADS has its own subnets which are separate from the home network, as illustrated in FIG. 2 (0200).

Access of HADS from Everywhere

When consumers are at home, they may access a HADS using a WiFi device by directly connecting to it as a station. This concept will be well understood by one of ordinary skill in the art and will not be discussed further.

When consumers are away from home, they may go to an Internet Cloud Server requesting the access of the HADS at home. The Internet server provides the connection information (i.e., IP address and port number) with which the consumer can connect to the HADS. See below on how the Internet server obtains and manages the addressing information.

In either situation, the consumers may access the web server of the HADS, where they can obtain information and schedule control operations in a secure manner.

Cloud Server

A Cloud Server or servers manage and update the addressing information of all deployed HADSs as a master lookup directory. Rather than hosting the web pages of each HADS itself, it provides the addressing information for consumers to directly access the web server of each HADS. A HADS and the Cloud Server exchange "maintenance" messages from time to time to update the HADS addressing information.

One example of the addressing information of a HADS uses an IPv4 protocol. The address information includes the IP address of the home gateway and a port number for routing traffic to the HADS. In IPV6, the addressing information will be simply the 6-field IP address of the HADS. See Document PCSM for discussion on how the server gets the addressing information of a home Internet device.

Optionally, a consumer can choose to let the Cloud Server to host a web page for its HADS. A HADS sends data to the server and receives control commands from the server.

Whether consumers use the Cloud Server or directly accessed HADS-hosted web server for monitoring and control of home automation devices, the user interface is the same. It will be assumed in the following discussion that consumers directly access the HADS web server.

HADS Web Server and TCP/IP Server

The HADS may host a web server and a TCP/IP server. A consumer accesses the HADS web server either directly at home or through the home gateway from outside the home. A consumer may perform the following transactions over the web server:

Configure a home automation device;
Monitor the status of a home automation device;
Read the data of a sensor; and/or
Access a data file on HADS data storage.

Alternatively, to do the same, the consumer may interact with the TCP/IP server by writing socket programming. One skilled in the art of network programming is generally capable of accomplishing this programming task.

Virtual Device, Communication Mediator, and Communication Coordinator

A main objective of HADS is to have all home automation devices over different communication protocols and on different subnets to communicate with each other and the Internet. One important aspect of HADS is its ability to support multiple communication modules (whether on the expansion cards or the HADS proper) which interact with each other and with the Internet, albeit that they may do so using different communication protocols.

Before this concept is discussed further, a discussion and definition of home automation devices will be presented. The table below lists a set of home automation devices with attributes. Here the device types and device subtypes are predefined. From device type and device subtype, the system knows what kind of function the device can perform. If it is an actuator, what control the device can do, and if it is a sensor, what data can be expected. In addition, the system knows the parameters of each device that can be configured by a user. This table represents a sample list of home automation devices, and is not intended to list all the possible devices.

TABLE 1

Device Definitions

| Device Type | Device Subtype | Data types or control variables (could be multiple items) available | Dependency to other devices | Parameters to configure | Description |
| --- | --- | --- | --- | --- | --- |
| actuator | Switch | On/off | Device type, Device subtype, Data1, Data2 | Temperature threshold for on and off operations | The dependency defines the device type/subtype and the data |

TABLE 1-continued

Device Definitions

| Device Type | Device Subtype | Data types or control variables (could be multiple items) available | Dependency to other devices | Parameters to configure | Description |
|---|---|---|---|---|---|
| | Regulator | On/off, Actual control value | Same as above | Desired control value, Lower and up limits | A regulator keeps a value (e.g., temperature) at a certain reference point, with lower and up point, beyond which alert events will be generated |
| | Motor | On/off, Actual speed | Same as above | Motion duration, Desired speed | Window opener, door opener |
| | Alarm/ buzzer | On/off | Same as above | Alarm duration | |
| Sensor | Temperature | Temperature | | Sample frequency | Sample frequency can be one time, multiple time and periodic |
| | Electricity meter | Watt, kilowatt-hour | | Sample frequency | |
| | Water meter | Acm/h (actual cubic meters per hour) | | Sample frequency | |
| | Gas meter | Liters per second | | Sample frequency | |
| | Camera | Video | | | |
| | Motion sensor | Movement detected | | Sample Frequency | |
| | Air quality detector | Dust percentage | | Sample frequency | |

The "Dependency to other devices" informs HADS that a device depends on other devices in terms of type/subtype of devices and the data. With that information, consumers can associate a device with another device it depends on. For example, a switch turns on or off based on the data of a sensor that may sit on another subnet. The switch may be on a WiFi network, and the sensor may be on a ZIGBEE® network. HADS would relay the sensor data to the switch as discussed below.

The following concepts support home automation devices over different communication protocols to communicate with each other and the Internet.

Virtual Device (VD)

HA devices of different types may have different attributes in addition to the different communication network to which the HA connects. This makes it difficult for HA devices of different types to communicate with each other and for them to communicate with the HADS and the Internet. To standardize the device attributes, they are converted or mapped into virtual devices (VD) on HADS, a data structure that is understood by the Communication Mediator (CM) as discussed below. A virtual device (VD) is defined in terms of the following attributes, which may include among other things:

Device type;
Device subtype;
Name;
Device ID;
Data type it can provide if it is a sensor or variables it can control if it is an actuator;
Dependencies to other devices if any;
Parameters;
Control function it can perform if it is an actuator;
Its Communication Coordinator ID (so that HADS knows which Communication Coordinator is the gateway for the real device); and/or
Historical data (e.g., sensor data or control status) over a configurable time interval.

These virtual devices are stored in a database on the HADS.

Figure 15:
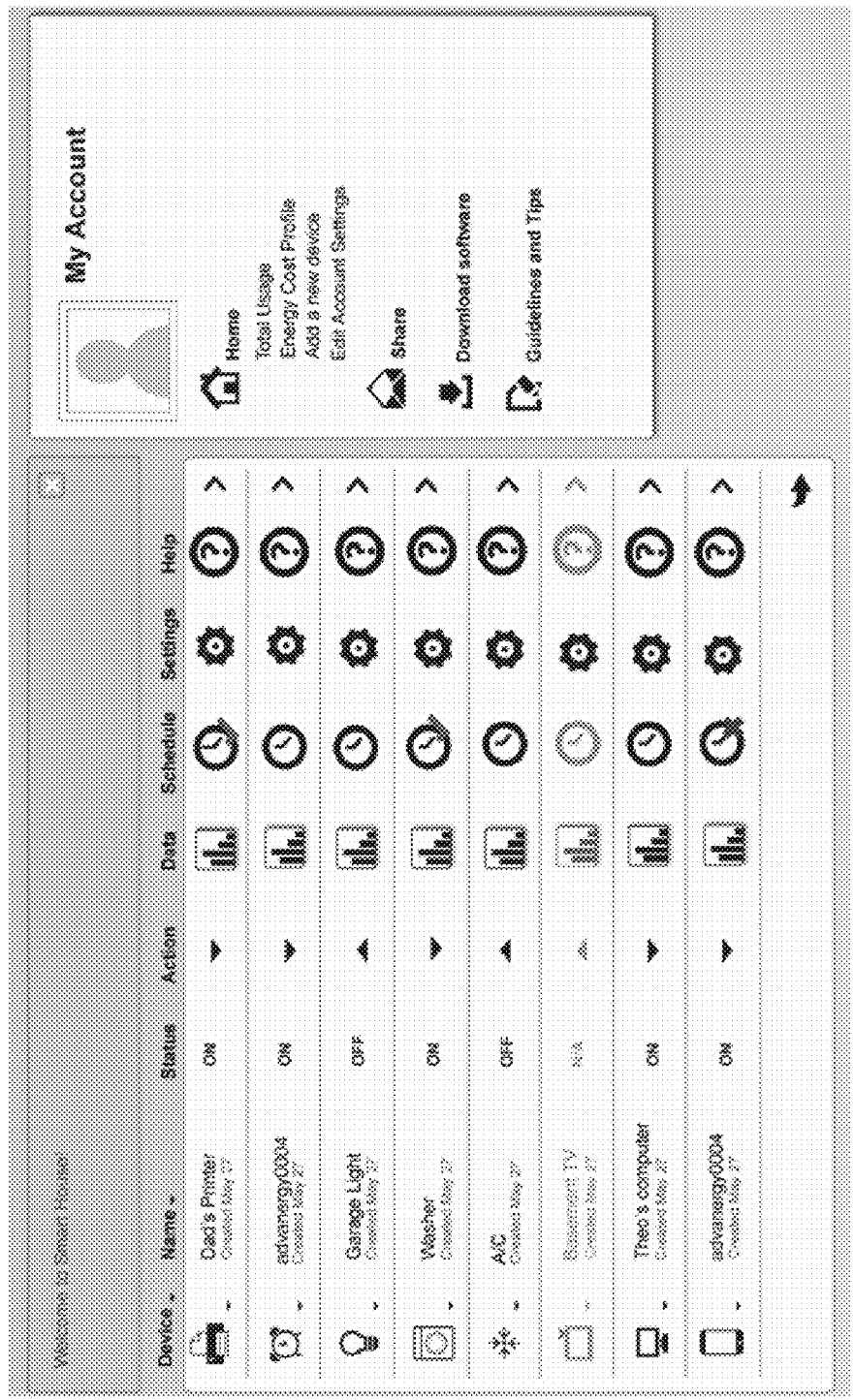
FIG. 15 illustrates an exemplary screen dialog permitting user modification of virtual devices that is useful in some preferred embodiments of the present invention.

The information of virtual devices is used for Web Server to display the home automation devices, so users can control and monitor them. FIG. 15 (1500) generally illustrates a web page for that purpose.

Push and Pull

There are two ways for interactions between different subnets and between application and a subnet.

PUSH (publisher and subscriber model). The interaction is mostly used for HA devices of different types to communicate with each other. The PUBLISHER is the source of data and the SUBSCRIBER is the destination of data. When the data source has data to send, it registers to the Communication Mediator (CM) as a publisher and when a device needs a certain type of data, it registers to the Communication Mediator (CM) as a subscriber. When the Communication Mediator (CM) receives messages from the publisher, it checks which device has subscribed to the messages and forward the messages to that device. This is a data source initiated data transaction. It is used in many event driven applications.

PULL (query and control). It is mostly used by the applications on the HADS, such as web server, to query the HA devices for data and status and send control commands to them. An application finds the virtual device from the data base, and sends query and control message to it. This is a data destination initiated data transaction. It is used in many scheduled or user-triggered applications.

Publisher and Subscriber Association

A HA device can be either a data publisher or subscriber or both. For example, a sensor is a data publisher—it produces and publishes sensor data for others to use. An actuator (e.g., a switch) is a data subscriber—it bases its actions on certain sensor data. A HA device can be both a publisher and subscriber.

A publisher will broadcast to the network what it can produce and a subscriber will broadcast to the network what it needs. When the published and subscribed data match, they are recorded in the database.

Communication Coordinator (CC) (1000,2500,2600)

Since HA devices may use different communication protocols, there is a Communication Coordinator for each communication protocol embedded in the HADS, whether as a fixed module or a plug-and-play module. To a HA device, its Communication Coordinator is the gateway to the rest of the world (i.e., the Internet). To the HADS, the Communication Coordinator provides an interface (a wrapper) that hides the specifics of the internal mechanism of the communication with a HA device.

A Communication Coordinator (CC) is responsible for the following:

Mapping a HA device "behind" it to a virtual device for HADS and keeps the mapping between the real and mapped device.

Registering the virtual device with proper information to the Communication Mediator (CM).

Converting the set of messages over a particular subnet into a common message set understood by the Communication Mediator (CM) when the messages are HADS bound, and converts the common message set back to the message set specific to its subnet in reverse direction. This scheme of converting between a common message set and messages specific to a communication module ensures that communication modules can work with each other and work with the HADS applications.

Figure 10:
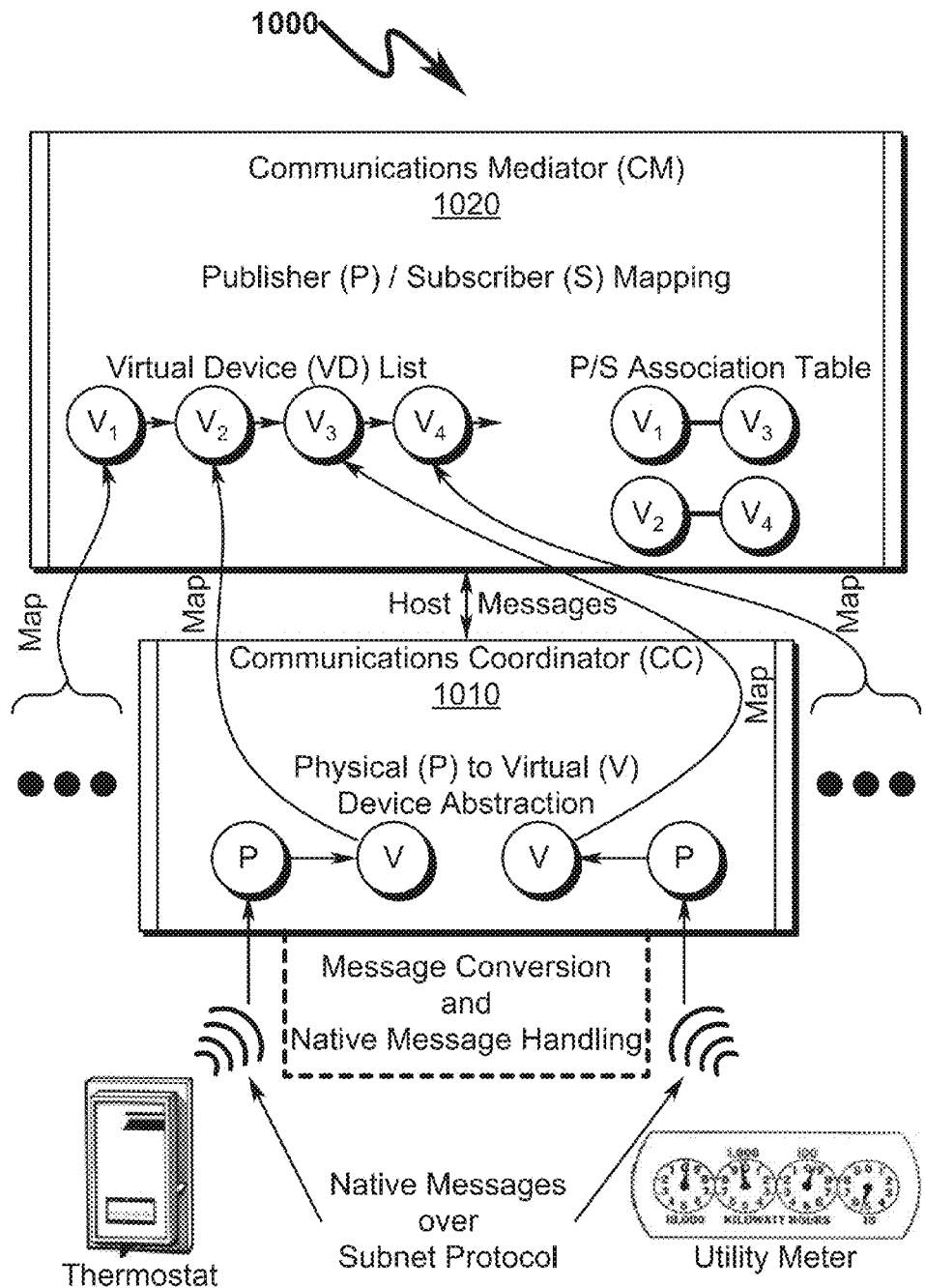
FIG. 10 illustrates the physical-to-virtual mapping and device abstraction occurring within a Communication Coordinator (CC) and the publisher/subscriber virtual mapping that occurs within a Communication Mediator (CM) and the relationship between the CC and CM.

As generally illustrated in FIG. 10 (1000), a Communication Coordinator (CC) (1010) is a software process that wraps the vendor provided interface (so called API) and does the conversion and registering. A Communication Coordinator must keep a list of mapped virtual devices, so it knows how to deliver a message outbound, and how to associate an inbound message with a virtual device. See the HADS message description below for more information.

The HA devices, sensors or actuators, usually provide a text-based command interface (e.g., AT commands) to the "host" (e.g., a MCU) so that the host can configure, control and read from the HA device. These text-based interfaces would typically be different for HA devices made by different vendors. It is the responsibility of the Communication Coordinator to convert the messages to the standard messages understood by the Communication Mediator (CM) and visa versa.

FIG. 10 (1000) illustrates the data processing of an exemplary Communication Coordinator (CC). A CC ID is a unique ID that allows a Communication Mediator (CM) to communicate with it. For example, a CC ID is the software process ID of the CC. When the CC is up, it first communicates with the Communication Mediator (CM), a known process, to register the CC ID.

Thanks to the Communication Coordinator (CC), all HA devices appear to be virtual HA devices to the Communication Mediator (CM), and they send and receive a common set of messages. As far as the Communication Mediator (CM) is concerned, there are some devices associated with each Communication Coordinator that communicate with a common set of messages.

For plugged-in communication modules, the software for a Communication Coordinator can be downloaded when the communication module is plugged into an expansion slot of the HADS. This process is discussed further in the section following describing the Plug-and-Play Manager.

Figure 25:
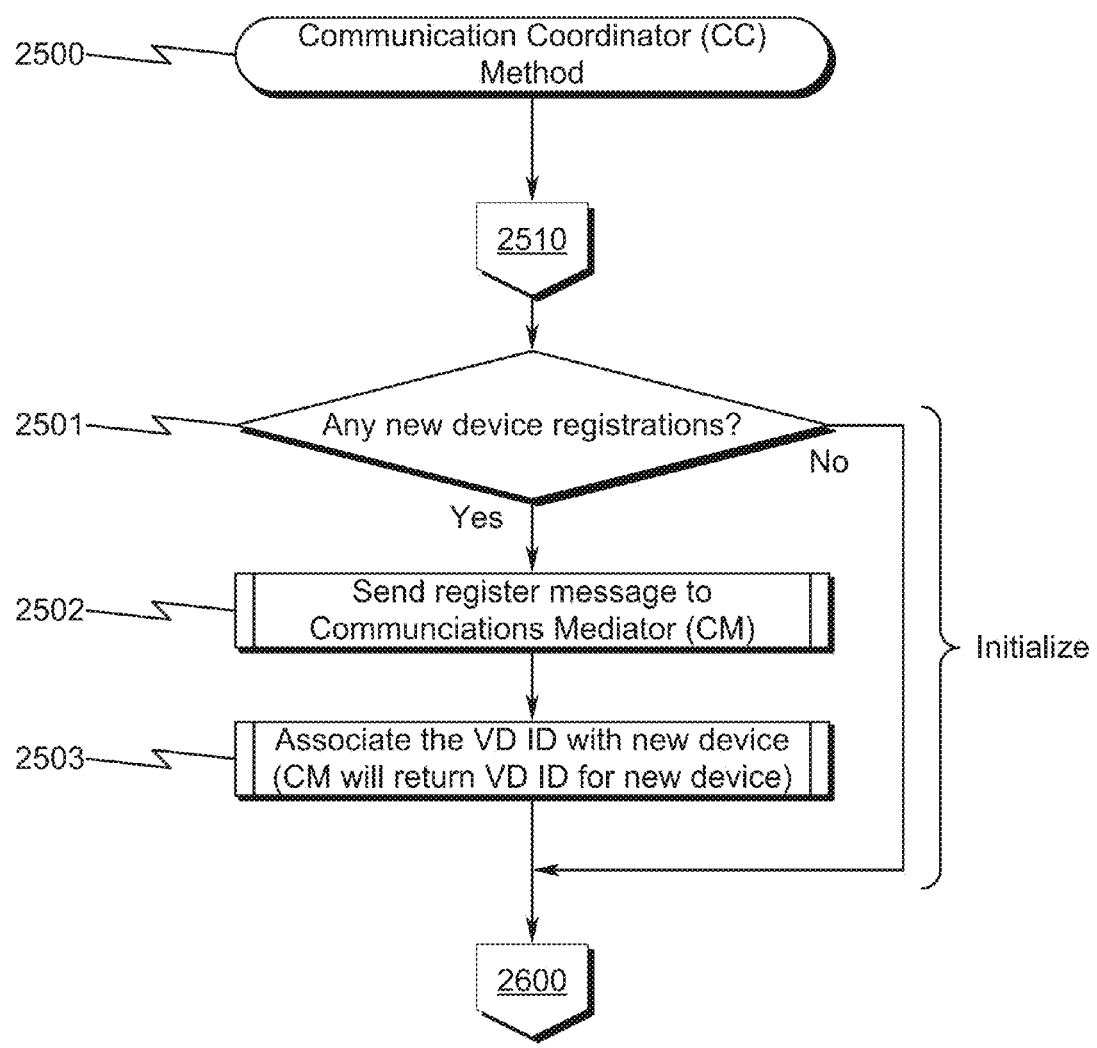
FIG. 25 illustrates a flowchart of an exemplary Communication Coordinator (CC) method useful in some preferred embodiments of the present invention.
Figure 26:
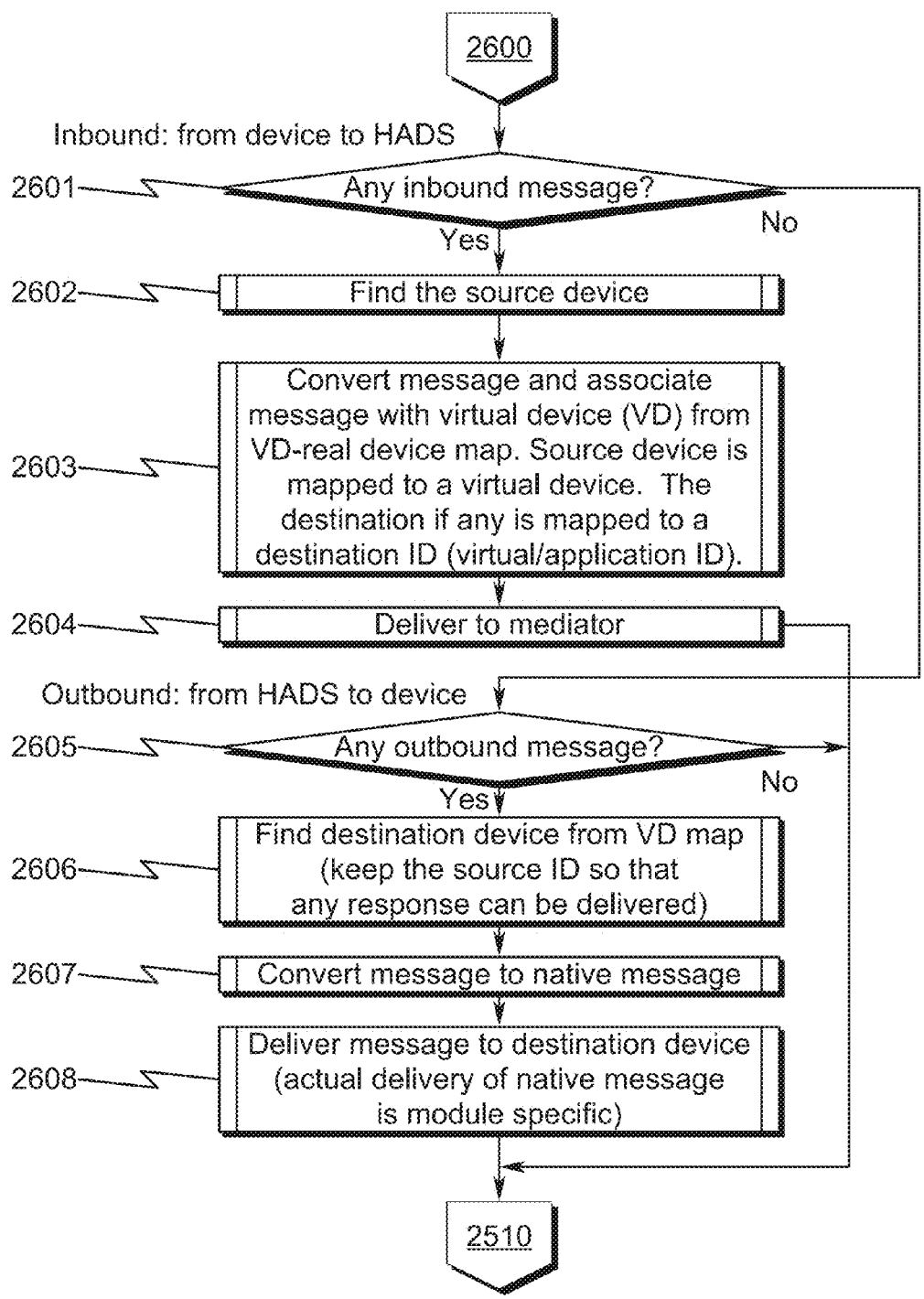
FIG. 26 illustrates a flowchart of an exemplary Communication Coordinator (CC) method useful in some preferred embodiments of the present invention.

An exemplary implementation of a Communications Coordinator method is generally illustrated in FIG. 25 (2500) and FIG. 26 (2600).

Communication Mediator (CM) (1000,2700,2800)

As generally illustrated in FIG. 10 (1000), the Communication Mediator (CM) (1020) is responsible for:

Associating publishers and subscribers in its data base.

When data/messages arrive from virtual devices associated with a Communication Coordinator, routing the data to the desired destination, either another HA device or HADS applications, based on destination information in the data/messages or the publisher/subscriber relationship.

When HADS applications initiate an interaction with a virtual device, the Communication Mediator (CM) finds the virtual device, and handles the message delivery.

Figure 27:
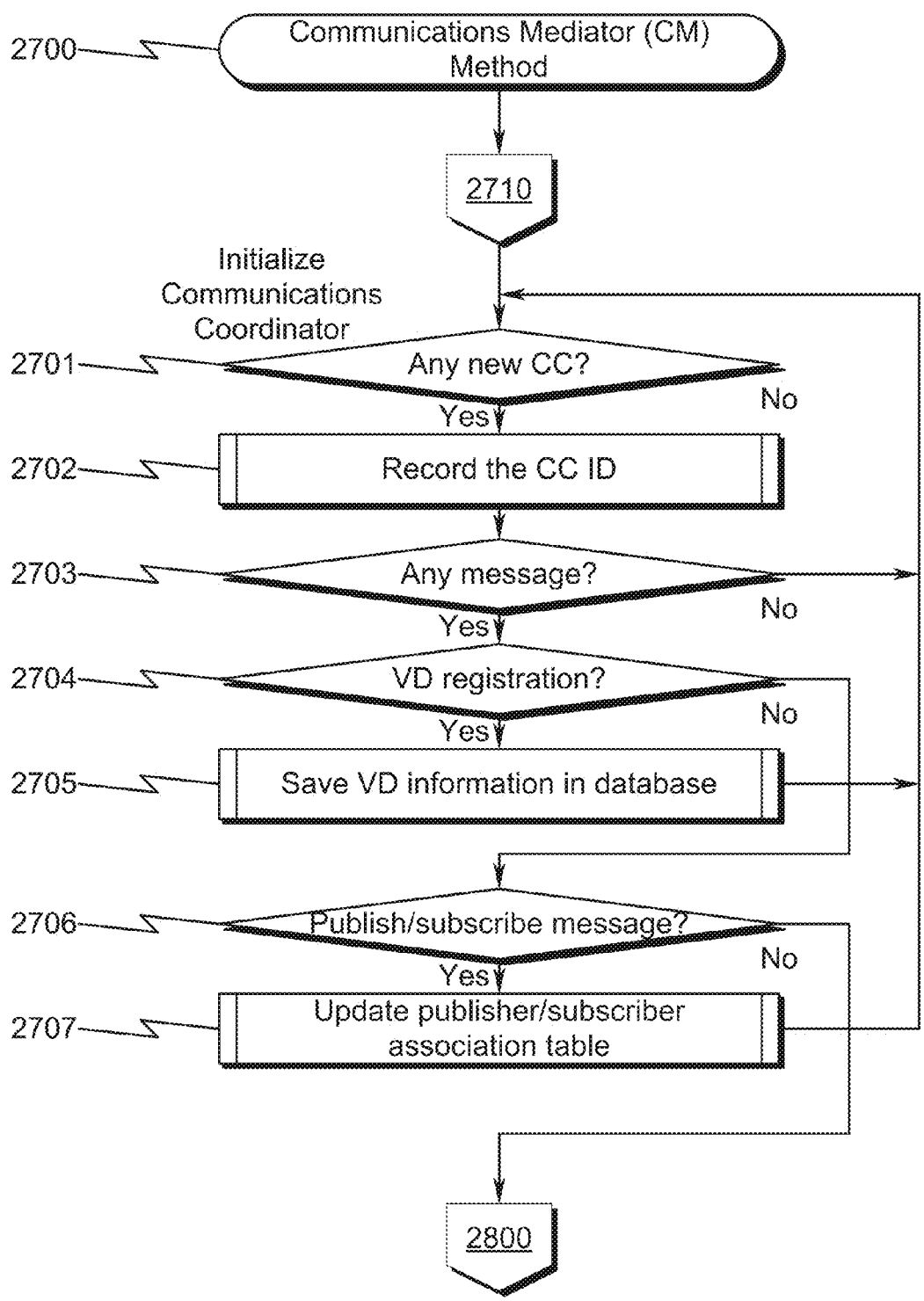
FIG. 27 illustrates a flowchart of an exemplary Communication Mediator (CM) method useful in some preferred embodiments of the present invention.
Figure 28:
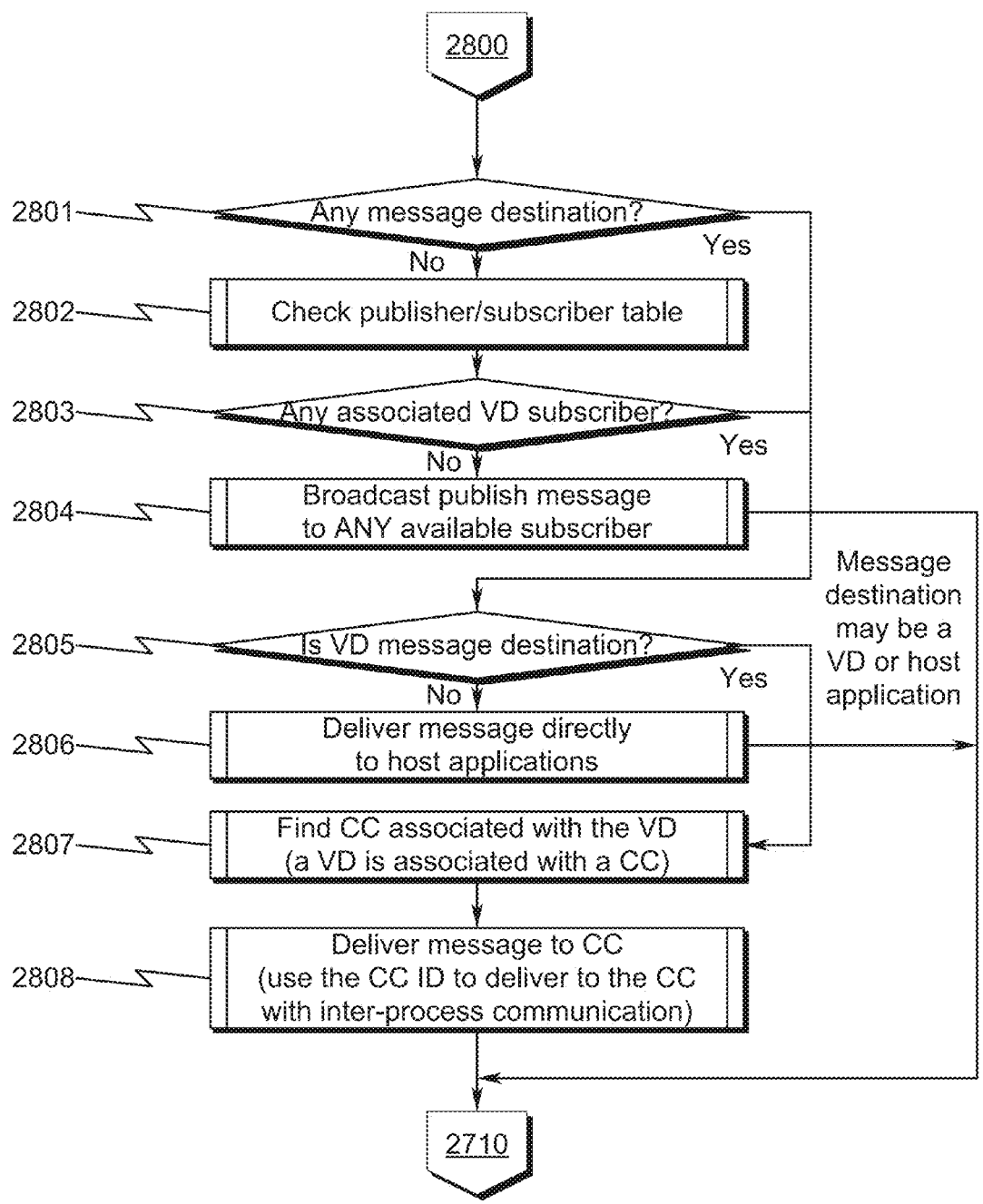
FIG. 28 illustrates a flowchart of an exemplary Communication Mediator (CM) method useful in some preferred embodiments of the present invention.

FIG. 10 (1000) illustrates the structure of the Communication Mediator (1020) as it relates to a Communications Coordinator (1010). An exemplary implementation of a Communication Mediator (CM) method is generally illustrated in FIG. 27 (2700) and FIG. 28 (2800). The Communication Mediator is another software process with a known process ID. The Mediator needs to know the CC IDs in order to communicate with them. The communication between the Mediator and applications and CCs are typically implemented using interprocess communication.

Use Cases

The interactions of the above concepts may be better understood by considering the following exemplary use cases:

Case 1: Device A connected with CC 1 wants to send message (e.g., sensor data) to device B connected to CC 2. Assume that device A and B have been mapped to virtual devices stored in a database as a publisher/subscriber pair. The CC 1 converts the message of device A to the HADS message. The Communication Mediator (CM) checks its publisher and subscriber association, and finds the virtual device B to be the receiver of the message. Based on the virtual device B's information, the CC 2 is the "gateway" message delivery target. The Communication Mediator (CM) delivers the message to CC 2 which forwards to device B after converting it from the HADS message to the message understood by device B.

Case 2: An application on HADS wants to send a message to virtual device A connected to CC 1. The message may contain a control or a query command (see the message description below). The Communication Mediator (CM) checks the virtual device A's attributes and delivers the message to CC 1 which forwards to device A after converting it from HADS message to the message understood by the device A.

Case 3: A user requests an action (read some data or exercise a control) on virtual device A connected to CC 1 via the HADS web server. The HADS web server forms a proper message targeting virtual device A and sends to the Communication Mediator (CM). The Communication Mediator (CM) checks the virtual device attributes and sends the message to CC 1. CC 1 forward the message to device A, which responds with a return message that contains the information desired by the user. The return message is delivered back to the Communication Mediator (CM) after converting back to the HADS message. The Communication Mediator (CM) forwards the message to the HADS web server, which displays the information.

Exemplary Standardized Interaction Message Set

While many messaging formats are anticipated for a wide variety of HADS implementation, the following standardized message formats are currently anticipated as optimal and incorporate the following format:

{source ID,
destination ID,
message type,
message length,
message body}

It should be noted that the presentation of the messages may be in many forms (e.g., XML format (as exemplified in Document NISM), structured texts, and/or binary). These standardized messages will be referred to as "standard messages" within this document.

The source ID and destination ID may be application ID or virtual device ID. The application ID refers to the ID of applications on the host (i.e., HADS) while the virtual device ID refers to the ID of virtual device.

If the destination ID is an application ID, the Communication Mediator (CM) knows the target delivery application. For an example of implementation, host applications are implemented as processes and there is an inter process communication mechanism on the host. The application ID can be the ID of the process or a map of that ID, which allows the inter-process mechanism to deliver the message to that process.

If the destination ID is a virtual device ID, the associated virtual device (VD) record is obtained from the database. From that record, the ID of the Communication Coordinator (CC) responsible for the virtual device is retrieved. The Communication Coordinator ID allows the delivery of the message to the corresponding Communication Coordinator (CC), which looks at its real device vs. virtual device ID map, and delivers the message accordingly (see FIG. 10 (1000)). A Communication Coordinator may be implemented as a host application. As a result, sending a message to it is similar to sending a message to an application (see above discussion on application ID).

The Destination ID may be N/A as in the case of publisher (see below), or the destination ID can be ANY, meaning it is a broadcast message.

The source ID is for the destination object (virtual device or application) to respond to the sending object. The Communication Coordinator (CC) keeps the source ID in its memory, in case a return message results from an out-bound message. In that case the kept source ID becomes the destination ID of the mapped return message.

It should be noted that it is the responsibility of Communication Coordinators (CC) to map or convert the standard messages to the corresponding messages specific to a subnet, and vice versa. The messages specific to a subnet are termed subnet messages. In some cases, a Communication Coordinator (CC) may need to find a subnet message that is the closet to a standard message, but requires the work to "enhance" it in order to provide the expected behavior of the standard message. See the discussion on QUERY messages below.

The following are an exemplary list of messages types. It should be noted that this description of host messages (also called standard messages) is an instantiation of many possible implementations of a common set of messages for home automation interactions. The use of these messages is demonstrated below wherein the message body for each message is defined.

Register (1700)

Figure 17:
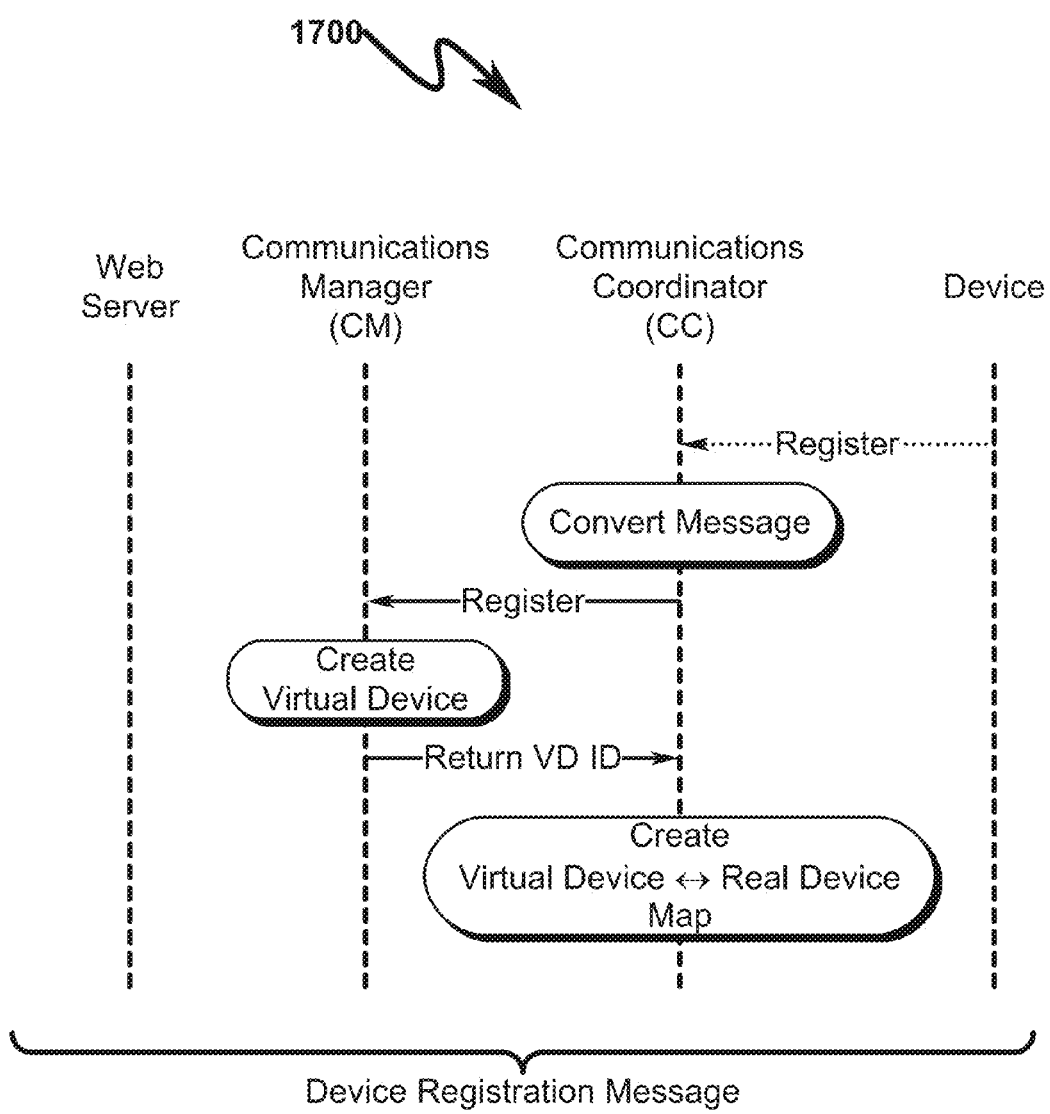
FIG. 17 illustrates an exemplary device registration message data flow useful in some preferred embodiments of the present invention.

As generally illustrated in FIG. 17 (1700), this message registers a virtual device or an application to the Communication Mediator (CM). If a device is registered, the Communication Mediator (CM) creates a virtual device. Its message body includes the following information items:

{object type (app), Name, ID}
or
{object type (virtual device),
Name, ID,
device type,
device subtype,
Communication Coordinator ID,
default value of parameter1,
default value of parameter2,
....}

Note that for applications, this message body is simpler. For devices, a Register message contains the default values of parameters if they are available.

Here the device types and device subtypes are predefined as in TABLE 1 discussed earlier. The parameters are defined in column 5 of TABLE 1.

Configure (1800)

Figure 18:
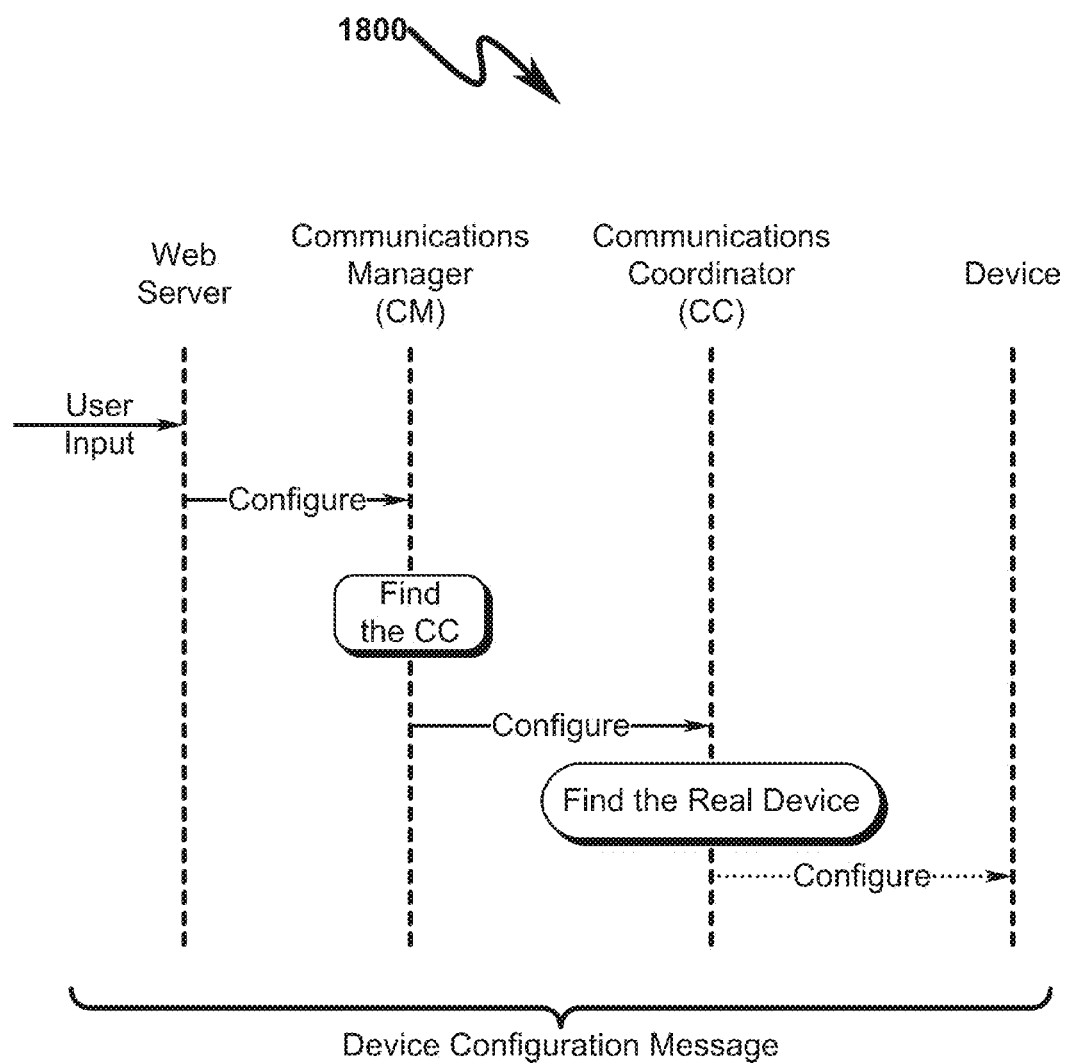
FIG. 18 illustrates an exemplary device configuration message data flow useful in some preferred embodiments of the present invention.

Some devices have dependency to other devices and parameters to configure (see TABLE 1). As generally illustrated in FIG. 18 (1800), this message configures a device's dependency and its parameters.

{virtual device ID to depend on,
data1 to depend on, data2 to depend on, . . .
value of parameter 1,
value of parameter 2, . . . }

The information of CONFIGURE message comes from user inputs from a web server or other applications. For sensors the sample frequency may be changed using CONFIGURE message.

The sample frequency can be overridden with the QUERY message discussed below.

Subscribe/Unsubscribe (1900)

Figure 19:
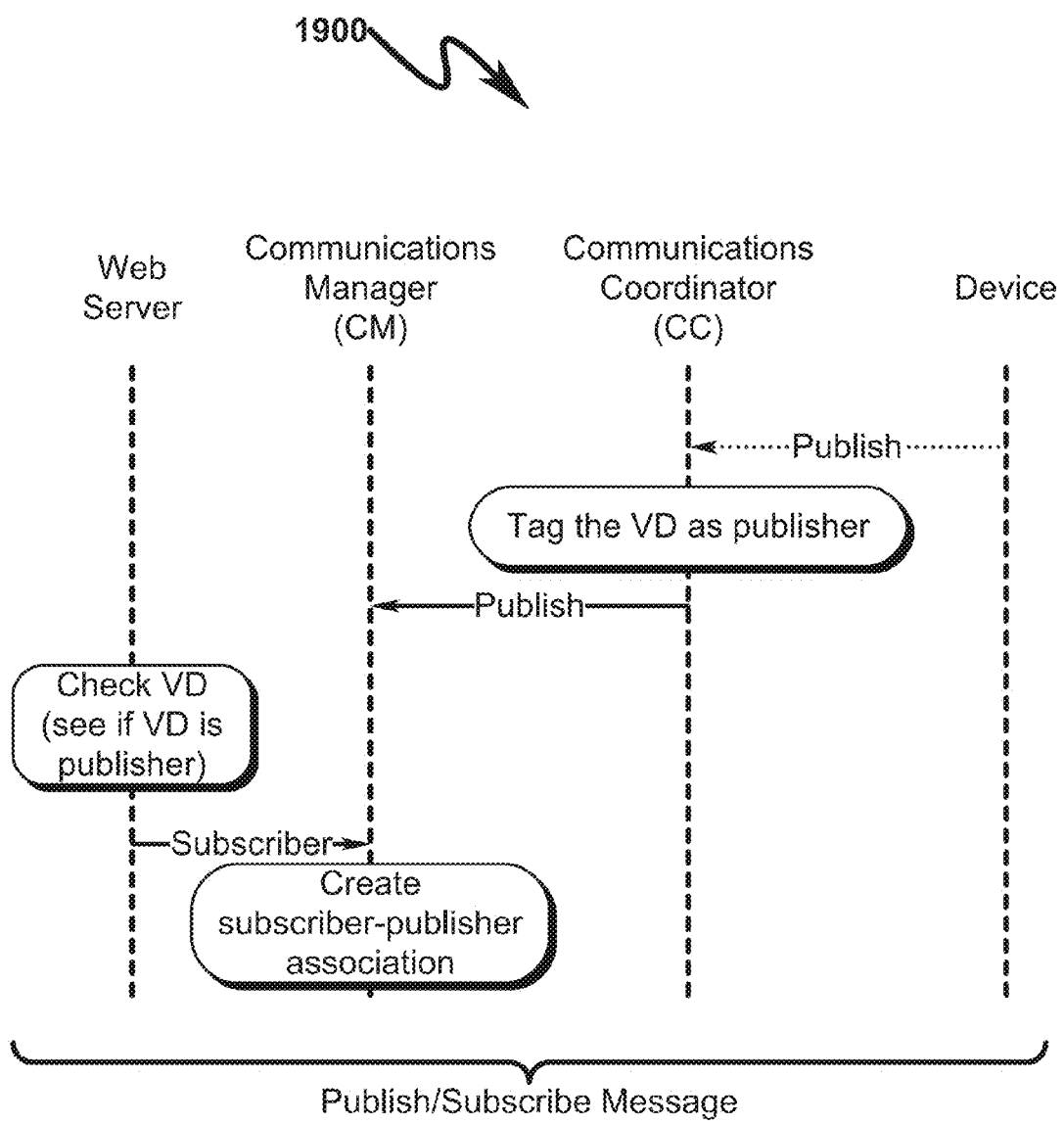
FIG. 19 illustrates an exemplary publish/subscribe message data flow useful in some preferred embodiments of the present invention.

As generally illustrated in FIG. 19 (1900), this message format informs the Communication Mediator (CM) the type of information to which a virtual device is interested. It includes the following information items:

{subscribe status (true or false),
device type interested,
device subtype interested,
virtual device ID,
data type 1 interested,
data type 2 interested,
. . . }

Here subscribe status being true means to subscribe and false means to unsubscribe. The data to subscribe is defined in the third column of TABLE 1 above. For different device type/subtype combinations, the system knows what data are available for subscribing. This can be used for sanity checking when a subscribe message is received. The virtual device ID is an optional field if the subscriber knows what virtual device can provide the data needed. If this field is not defined, then it is up to the Mediator to find a publisher to fulfill the subscription based on the device type/subtype interested. More than one data types can be subscribed in the message.

Publish/Unpublish (1900)

As generally illustrated in FIG. 19 (1900), the message informs the Communication Mediator (CM) what type of information a virtual device will be provided. The following information items are anticipated:

{publish status (true or false),
device type,
device subtype,
data type 1 offered,
data type 2 offered,
. . . }

Here publish status being true means to publish and false means to stop publishing. The data type offered is the type of data the device will push to the host, and to another device or an application that subscribes to it.

Query (2000)

Figure 20:
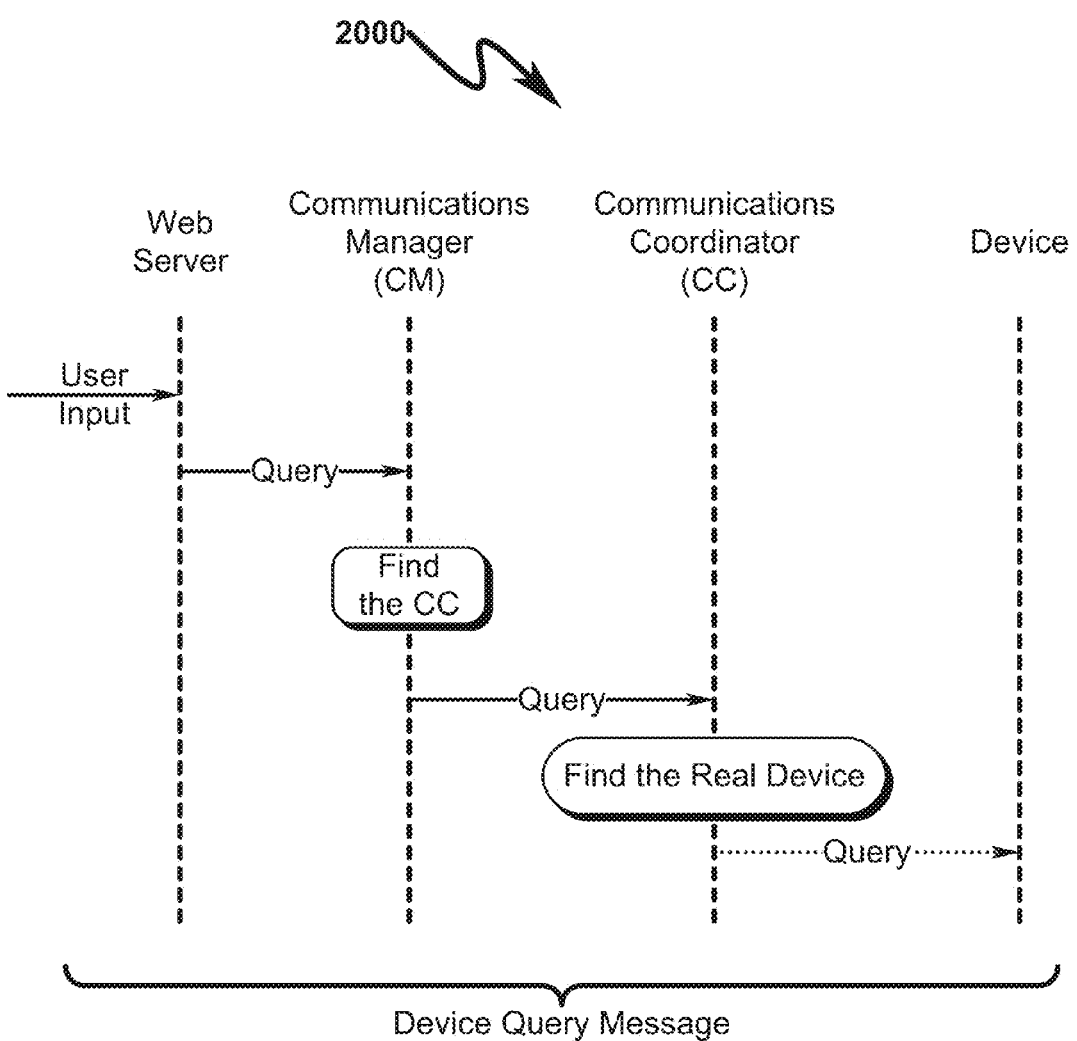
FIG. 20 illustrates an exemplary device query message data flow useful in some preferred embodiments of the present invention.

As generally illustrated in FIG. 20 (2000), this message is sent to a device to get data. TABLE 1 lists the data available for a given device type/subtype. The message contains the following information items:

{schedule to get,
data type 1 to get, data type 2 to get,
. . . ,}

The query message may ask for more than one piece of data, and may get them at certain schedule. The schedule may be:
one time: immediately, at a later time (number of seconds from now);
multiple times: first time (immediately, at a later time), number of times, and interval between (number of seconds); and/or
on a periodic bases: first time (immediately, at a later time), and interval (number of seconds).

Some home automation devices can provide data at multiple times or on a periodic basis. In this case, it is straightforward to convert this message to the subnet message, and just wait for the data to come. In other cases, a device may only provide one-time data. In this case, if a multiple-time or periodic query is received, the Communication Coordinator (CC) must either reject it gracefully, or "silently" start a task to send multiple or periodic one-time queries at a proper interval, and forward the received data to the requester.

Control (2100)

Figure 21:
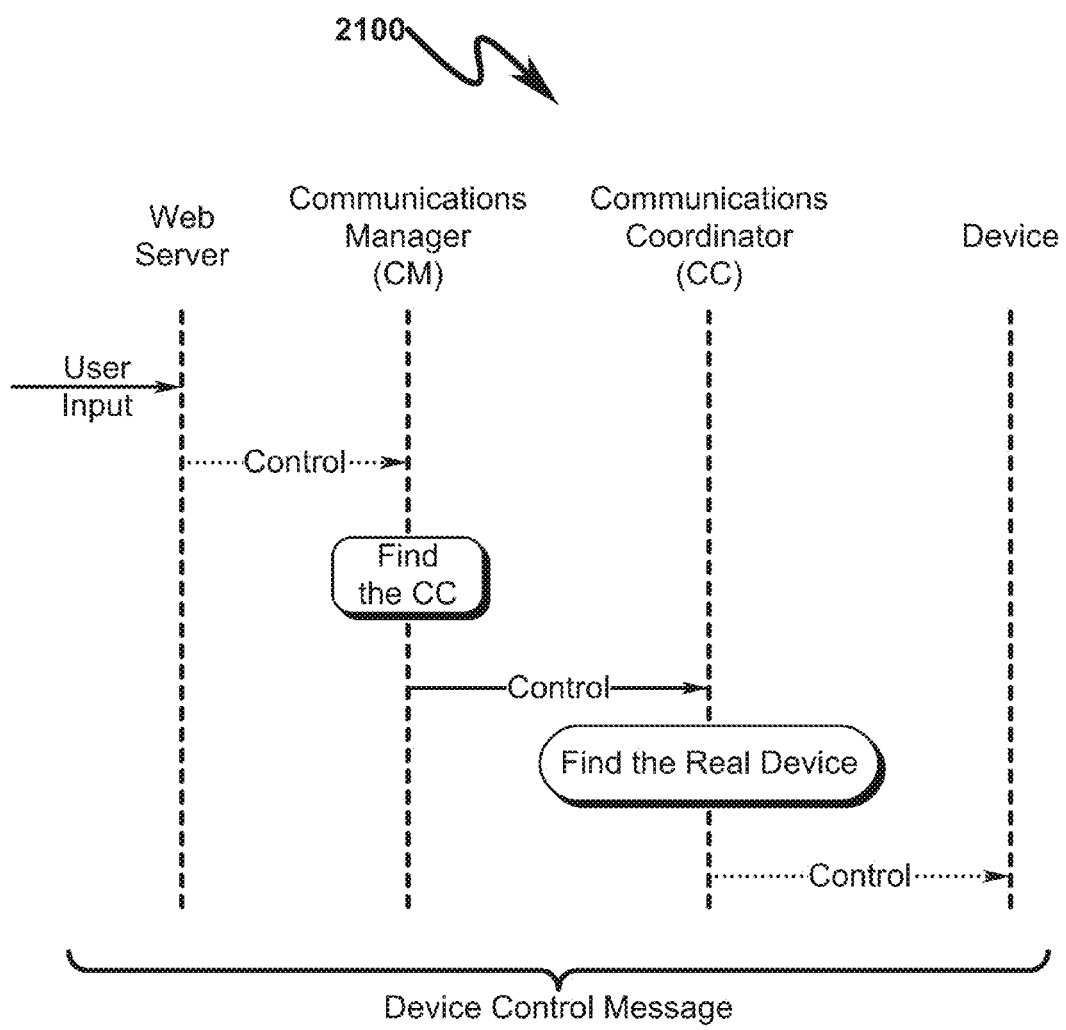
FIG. 21 illustrates an exemplary device control message data flow useful in some preferred embodiments of the present invention.

As generally illustrated in FIG. 21 (2100), this message is sent to a device to control a variable (e.g., a switch). The message contains the following information items:
{schedule to control,
variable 1 to control,
variable 2 to control,
. . . }

The schedule to control is the same as "the schedule to get" in the query message. The variable to control is the status (e.g., on or off) or the number to assign to a variable (e.g., regulator value for a regulator). Control variables are standardized in the above device description table.

When a device can only respond to on-time control request, and a multiple-time or periodic control message is received, the Communication Coordinator can deal with it in the same way as for a QUERY message.

Send (2200)/Response (2300)

Figure 22:
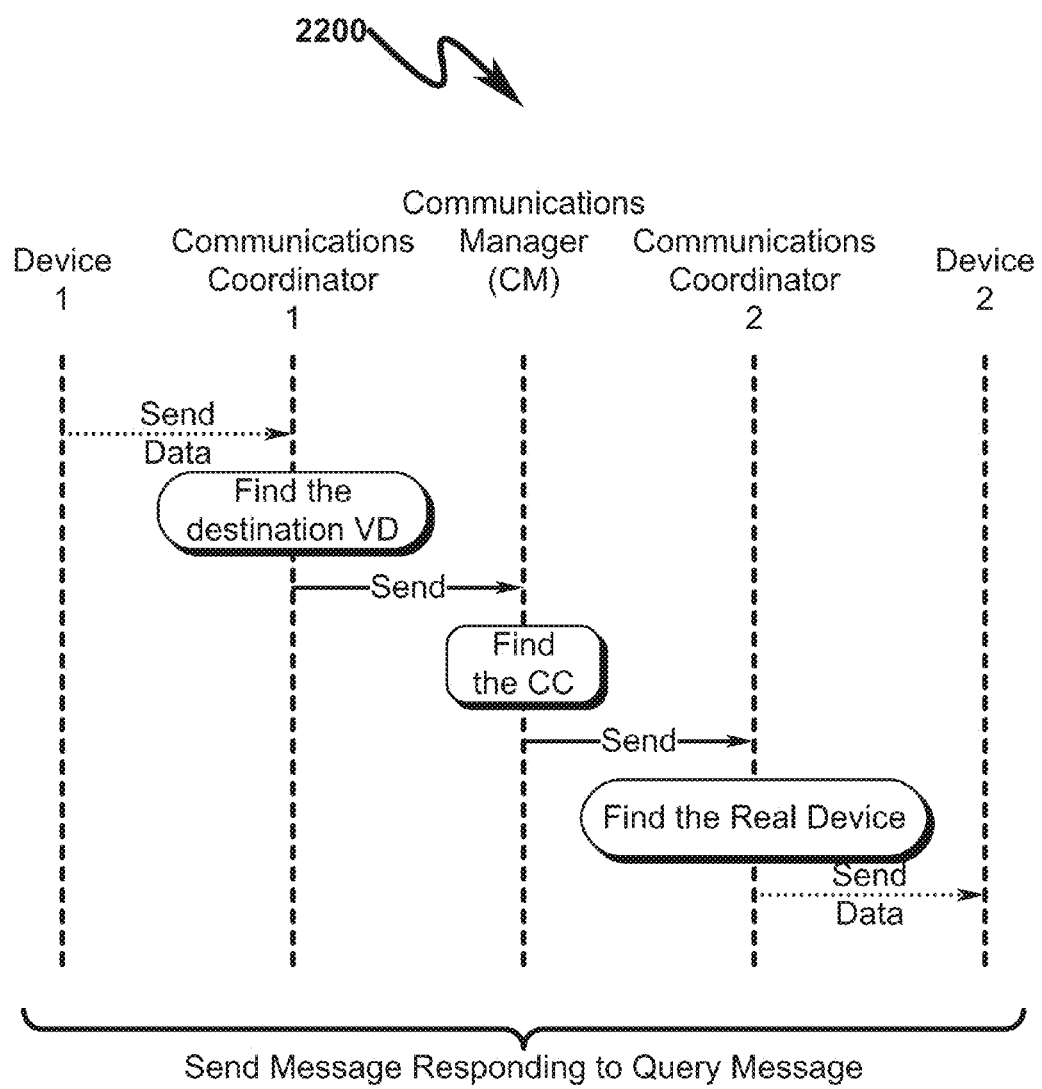
FIG. 22 illustrates an exemplary query response message data flow useful in some preferred embodiments of the present invention.
Figure 23:
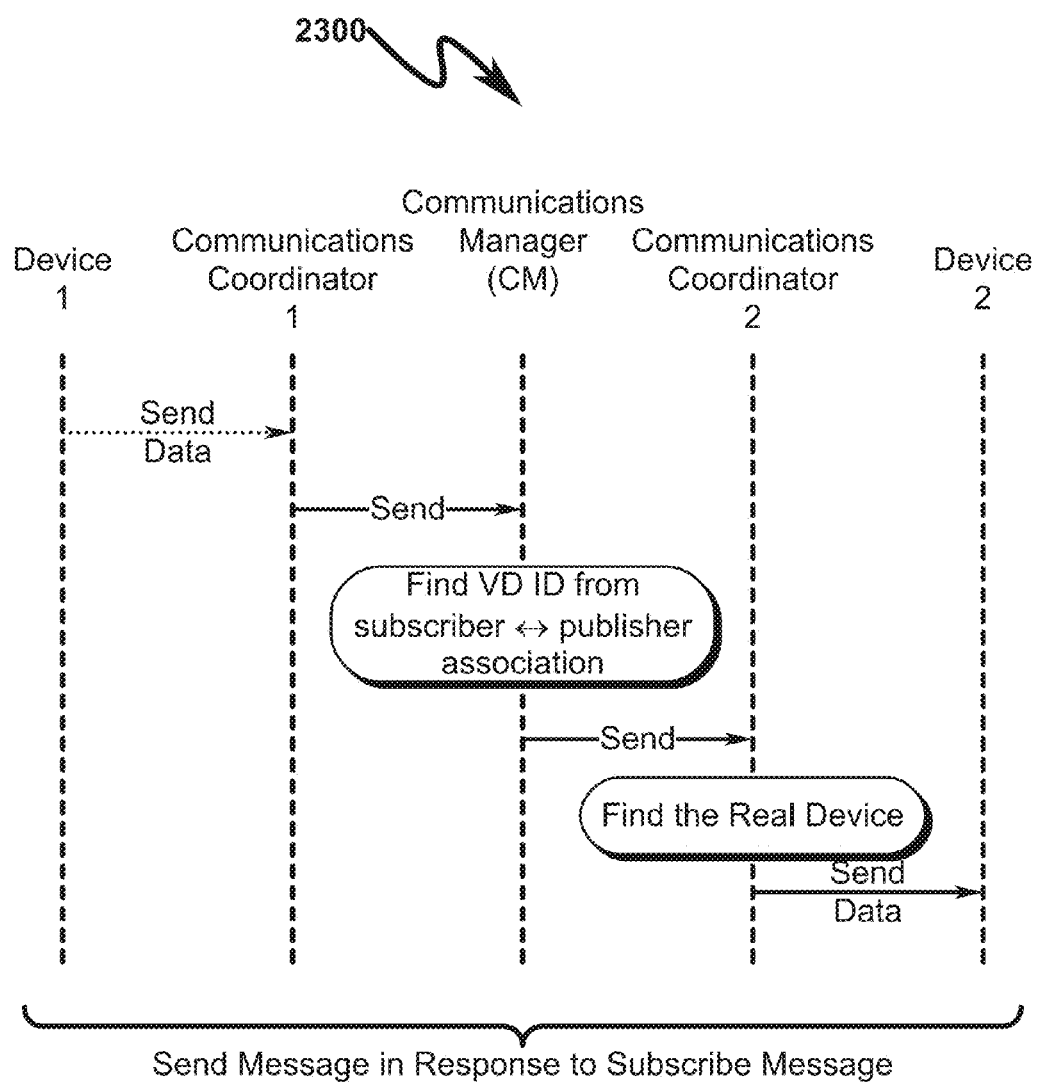
FIG. 23 illustrates an exemplary subscribe response message data flow useful in some preferred embodiments of the present invention.

As generally illustrated in FIG. 22 (2200) and FIG. 23 (2300), this message sends data (for sensors) or status (for actuator) and retrieves a response. It can be sent by a publisher to fulfill its "obligation", or as a response to query and control messages. In the case of query, it contains data requested:
{value of data type 1,
value of data type 2,
. . . .}

In the case of control, it contains the result or status of the control action:
{value of variable 1 to control,
value of variable 2 to control,
. . . }

Exemplary Communication and Control Scenario

System components such as a virtual device, Communication Mediator (CM), Communication Coordinator (CC), and a standard set of messages have been discussed above. An example of this embodiment will now be discussed. Assume a scenario in which a switch device turns on and off an air conditioner. The switch device is a client on a WiFi network. This may include a temperature sensor connected to a ZIG-BEE® network. The switch may be configured to turn on and off based on the sensor temperature data.

Get Registered

When the actuator device is powered on, it is configured to search for and get connected with the WiFi module of the HADS. Similarly, when the sensor device is powered, it is configured to search for and get connected with the ZIG-BEE® module of the HADS.

Once they are connected, they send messages to their corresponding HADS modules with the information on their capabilities, including device types, names, etc.

These messages are interpreted by the Communication Coordinators associated with the WiFi module and ZIG-BEE® modules. The WiFi CC sends a Register message described earlier with the capability information to the CM. The CM creates a new virtual device record in its database, and returns the newly created virtual device ID to the WiFi CC. The WiFi CC creates a local record that associates the virtual device ID with the real WiFi device:
{real WiFi device<--->virtual device ID}
Where the real device contains WiFi specific information, which allows the WiFi module to communicate with this client. See FIG. 10 (1000) for the illustration of association between real and virtual devices.

Similarly, the ZIGBEE® CC sends a Register message to the CM. The CM creates a new virtual device and returns the virtual device ID to the ZIGBEE® CC. The ZIGBEE® CC creates a local record that associates the virtual device ID with the real ZIGBEE® device.

FIG. 17 (1700) depicts an exemplary data flow that summarizes the interactions involved in handling the REGISTER message.

CONFIGURE Home Automation Device (1800,1500,1600)

The web server now lists all devices based on the virtual device data base (see FIG. 15 (1500)). A user accessing the web server, sees a switch that can control an air conditioner, and a sensor that measures the temperature in a room.

Figure 16:
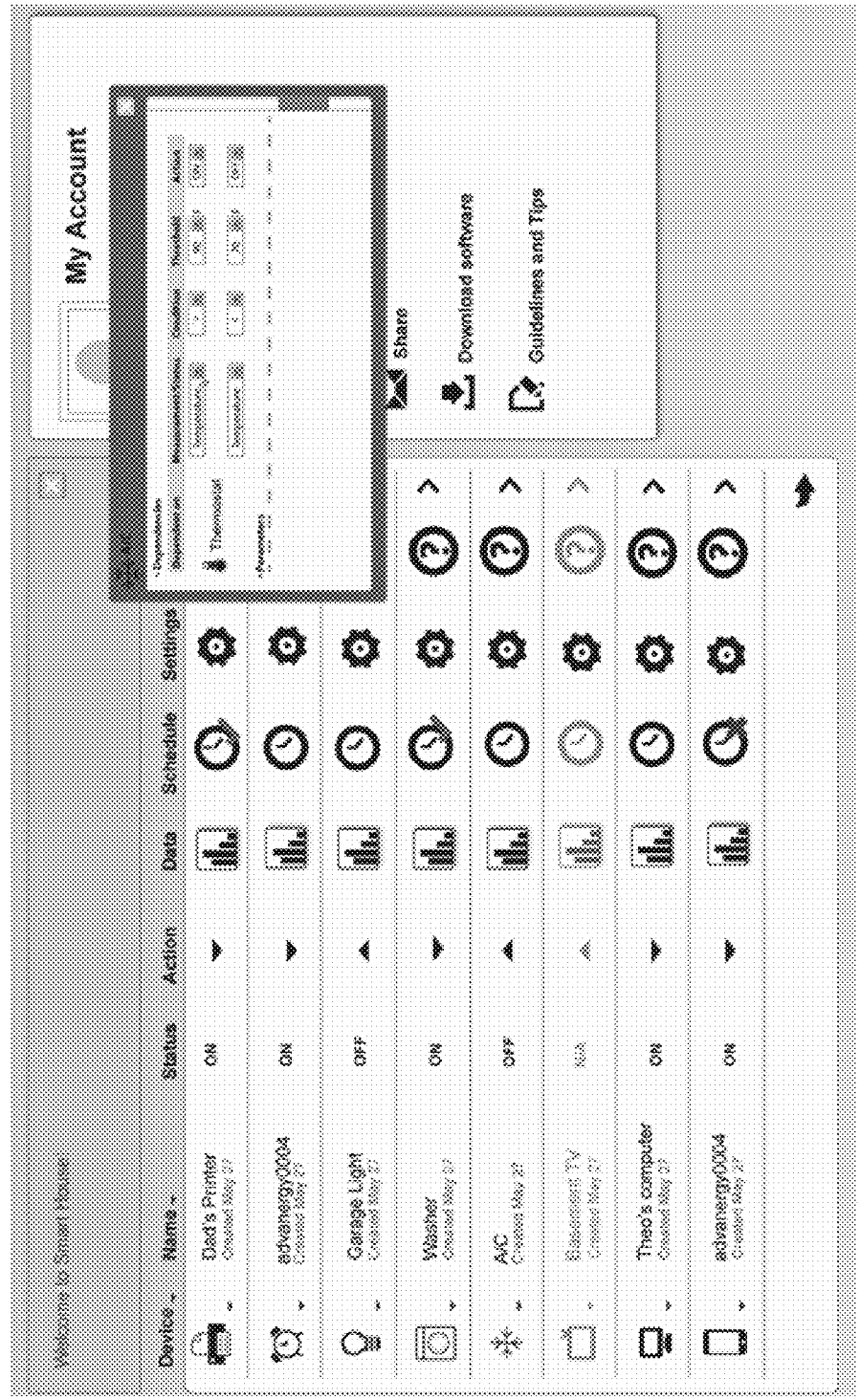
FIG. 16 illustrates an exemplary screen dialog permitting user definition of actuator conditions that is useful in some preferred embodiments of the present invention.

The virtual device of the switch shows that it is dependent on a temperature device, and the data it depends on is "temperature" (it is possible a sensor has multiple data outputs), and there are two parameters to configure: high temperature threshold (for switch on) and low temperature threshold (for switch off). See FIG. 16 (1600) for an exemplary UI used to configure this dependency.

This information allows the user to choose a sensor (possibly from multiple sensors of the same type/subtypes), select temperature as the data dependent variable, and configure the switch such that when the temperature measurement is above certain number, the switch turns on the air condition. When the temperature is below another number, the switch turns off the air conditioner. This information is processed by the web server, and as a result, a CONFIGURE message is created that goes to the virtual device of the switch:
{Web server ID, % source ID
Switch virtual device ID, % destination ID
Configure, % message type
xxx, % message length
temperature sensor virtual device ID, % device to depend on
temperature, % data depend on
84, % high threshold (i.e., switch on if temperature >=84)
65} % low threshold (i.e., switch off if temperature <=65)
Where "temperature" is the data the switch depends on, and numbers 85 and 65 are high and low temperatures respectively. The fields in the message are derived based on the CONFIG message definition and the information in column 4 (dependency) and column 5 (parameters) of the device table provided above (TABLE 1).

This Register message is sent from the web server to the CM. The CM retrieves the destination virtual device information, gets the WiFi CC, and delivers the message to the latter.

The WiFi CC receives the message, converts it to the corresponding subnet message. The CC looks at its map
{real WiFi device<--->virtual device ID}
which is created during registering process, and forwards the subnet message to the real WiFi device.

Reference FIG. 18 (1800) for exemplary data interactions involved in handling the CONFIGURE message.

Requesting Data from Sensor (1900)

The relaying of sensor data to the switch will now be detailed. Two cases will be considered:

Case 1: QUERY. After the Web server sends the switch device a CONFIGURE message, it sends a QUERY message for the switch directed at the sensor device to the Mediator
{Switch virtual device ID, % source ID
Sensor virtual device ID, % destination ID
Query, % message type
xxx, % message length
periodic:interval=30 sec, % user selected sample schedule
temperature} % data to get When the Mediator receives the message, it checks the destination VD (sensor virtual device), retrieves the ZIGBEE® CC associated with it, and forwards the message to the CC. The ZIGBEE® CC receives it, creates a corresponding query subnet message, and records the source ID in some way, so that any responses to the query goes to the right destination. FIG. 19 (1900) shows exemplary data interactions involved in QUERY message processing.

Case 2: PUBLISH/Subscriber. Assuming that the sensor can publish its data periodically. The ZIGBEE® CC sends a PUBLISH message to the CM:
{Sensor virtual device ID, % source ID
N/A, % destination ID
Publish, % message type
xxx, % message length
true, % publish status
Publish schedule: periodic interval=30 sec, % publishing schedule
temperature} % published data When the CM receives it, it "tags" the sensor virtual device ID, and makes it a publisher.

The Web server, instead of sending the QUERY message, verifies that the sensor virtual device is a publisher and thus sends a SUBSCRIBE message for the switch:
{Web server ID, % source ID
N/A, % destination ID
Subscribe, % message type
xxx, % message length
Sensor, % device type
Temperature, % device subtype
Sensor virtual device ID, % actual publisher sensor VD ID
Temperature} % data interested When the CM receives it, it sees that a virtual device ID (the sensor VD ID) is defined for the publisher. It verifies that the sensor virtual device is indeed a publisher, and then creates a subscriber-publisher record in its database.

FIG. 21 (2100) illustrates the interactions in processing publish/subscribe message.

Note that the sensor device has its own publishing schedule—this is a parameter of the sensor as indicated in TABLE 1 above. The users may configure the sensor to send data at a different schedule on the Web server. If so, the Web Server sends this CONFIGURE message:
{Web server ID, % source ID
Sensor virtual device ID, % desitinatin ID
Configure, % message type
xxx, % message length
periodic:ineterva=60 sec} % data sample schedule, overriding the sensor's default schedule Sending Data to Switch The following two cases below are considered again that corresponding to the two cases above.

Case 1: responding to QUERY. The sensor sends data at the interval requested by the QUERY message. The ZIGBEE® CC knows the requester (the source ID of the QUERY message) and creates the following SEND message:
{Sensor virtual device ID, % source ID
Switch virtual device ID, % destination ID
Send, % message type
xxx, % message length
Data} % data The CM receives this message, finds the WiFi CC associated with the Switch VD ID, and forward the message to it. The WiFi CC converts the message to a subnet message, and checks the VD ID<--->real device association, delivers the subnet message to the switch device. FIG. 22 (2200) generally illustrates the data interactions in processing SEND message responding to QUERY message.

Case 2: Responding to subscriber. The sensor sends data at the interval requested by the CONFIGURE message. The ZIGBEE® creates the following SEND message:
{Sensor virtual device ID, % source ID
N/A, % destination ID
Send, % message type
xxx, % message length
Data} % data When the CM receives it, its sees the destination is N/A. It checks the subscriber/publisher records, and finds the switch VD ID as the destination. The rest of the deliver is the same as that for Case 1. FIG. 23 (2300) generally illustrates the data interactions in processing SEND message responding to SUBSCRIBE message. Note that the difference between the QUERY and SUBSCRIBE is that the SEND responding to SUBSCRIBE message can go to multiple subscribers simultaneously, while the SEND responding to QUERY message goes to an individual destination. The analog is the difference between multicast and unicast.

event Notifications (0700, 0800)

Users can configure the HADS to notify them when certain events happen. Web server is responsible for presenting a UI for the users to define events to notify, and carrying it out.

Figure 7:
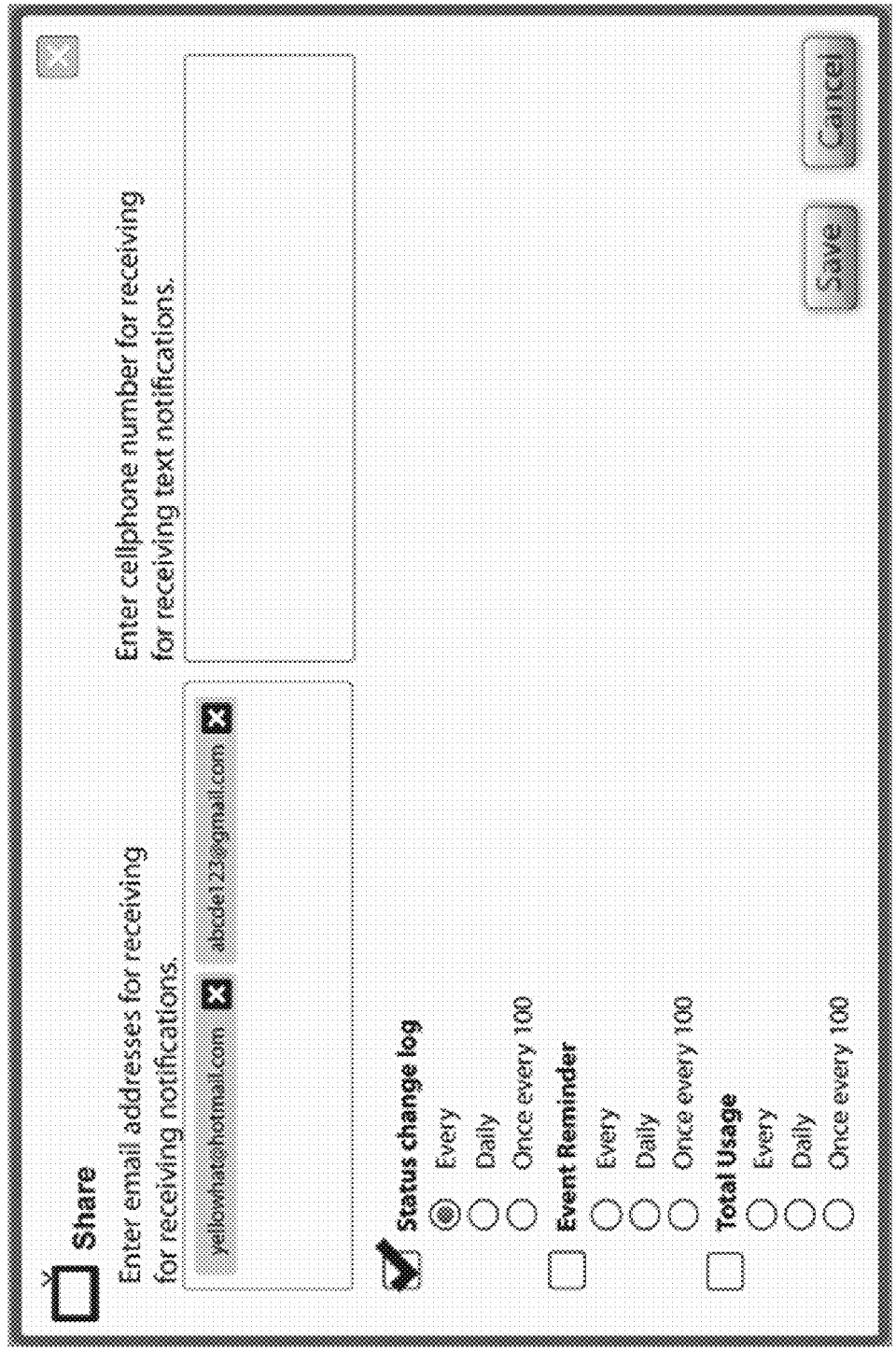
FIG. 7 illustrates an exemplary device monitoring/notification email/telephone notification dialog for an event configuration.
Figure 8:
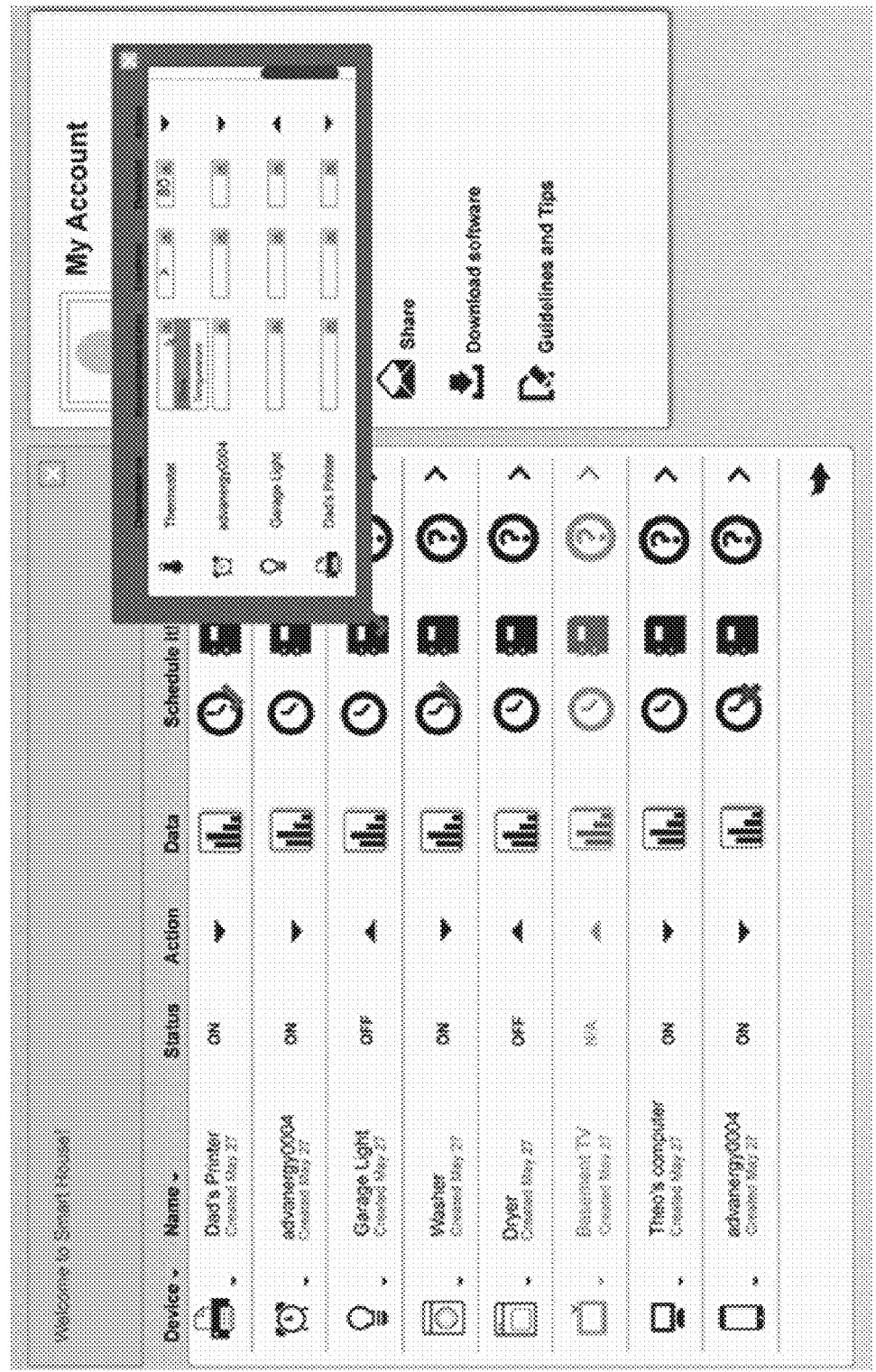
FIG. 8 illustrates an exemplary device monitoring/notification dialog for an event configuration.

FIG. 7 (0700) illustrates a UI for users to set up where to send the notification to, namely, email address for emails or phone numbers for text messages. FIG. 8 (0800) illustrates a UI that allows users to define events in terms of source, data and threshold.

Consider an implementation for the case illustrated in FIG. 8 (0800): when the temperature of the thermostat is higher than 80 degree, send an email to the user.

(1) The web server forms a QUERY message to the thermostats VD ID with the schedule of data collection, say every 30 seconds. This is similar to the QUERY message sent to the sensor discussed in the previous section.

(2) The thermostat sends the data every 30 seconds to the web server. This is similar to the SEND message from the sensor discussed in the previous section.

(3) Every time the web server receives the data from the thermostats, it compared the data with the threshold (80 degrees). If the data is higher than 80, an email or an text message is sent to the user based on how user configures the UI (see FIG. 7 (0700))

Figure 24:
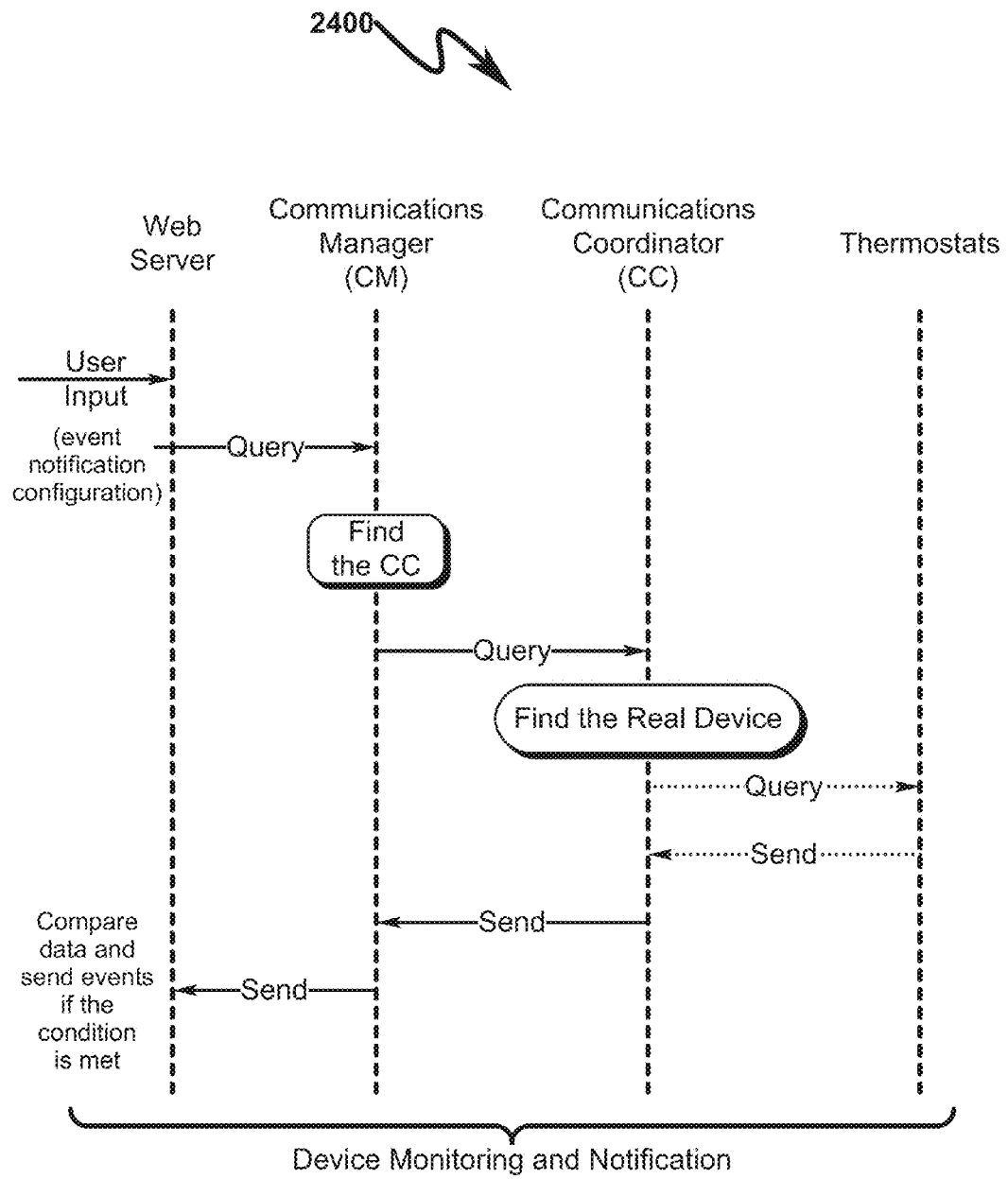
FIG. 24 illustrates an exemplary device monitoring and notification data flow useful in some preferred embodiments of the present invention.

FIG. 24 (2400) generally illustrates the process message flow of device event monitoring/notification.

Plug-and-Play Expansion Slots
Overview

HADS anticipates expansion USB slots for users to plug in communication modules or data storage modules. For example, users can plug in a USB BLUETOOTH® module for communicating with BLUETOOTH® devices. Users can also plug in USB data storage to allow more data storage capacity. The plug-and-play manager can detect the plug and unplug of an expansion module and configure the system accordingly.

In particular, if a communication module is plugged in, the corresponding Communication Coordinator (CC) is loaded into the system and started as a process. The Communication Coordinator will then register itself with the Communication Mediator (CM) (see the discussion on Communication Coordinator).

If a data storage module is plugged in, the data storage manager is configured to communicate with the data storage.

Assuming that an exemplary embodiment uses a LINUX operating system, the plug and play manager can either be implemented as a user space process or as a driver in the kernel space. This assumes that the USB cards plugged in have been tested on LINUX, and drivers are available for these USB cards. When a card is plugged in, an interrupt signal will be intercepted by the plug and play manager. The proper USB driver is loaded as a result from Network or from local storage (if it is available there). Once the USB driver communicates with the module, the corresponding CC is loaded from the Internet or local memory and started.

Exemplary Plug-and-Play Method (2900, 3000)

Figure 29:
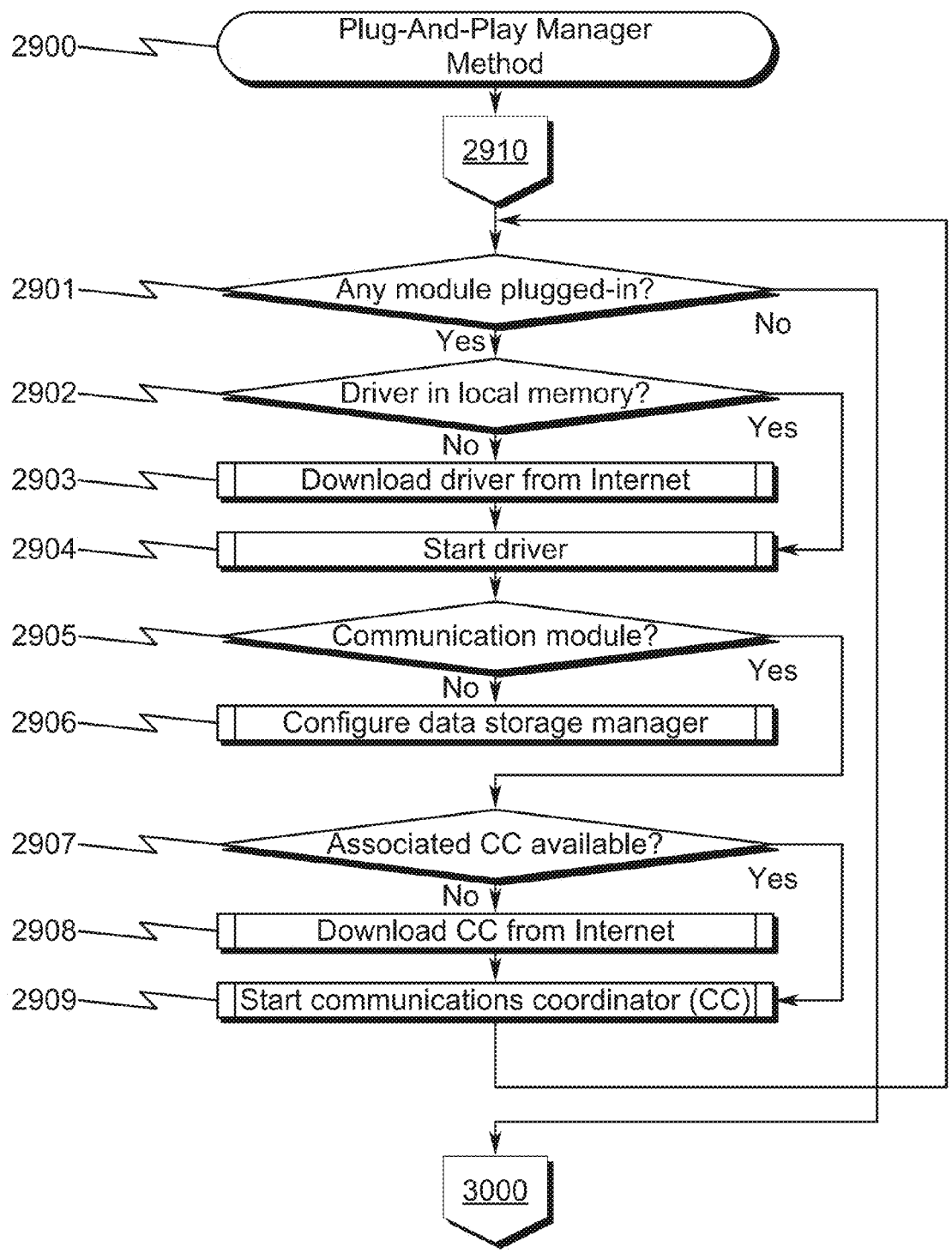
FIG. 29 illustrates a flowchart of an exemplary plug-and-play manager method useful in some preferred embodiments of the present invention.
Figure 30:
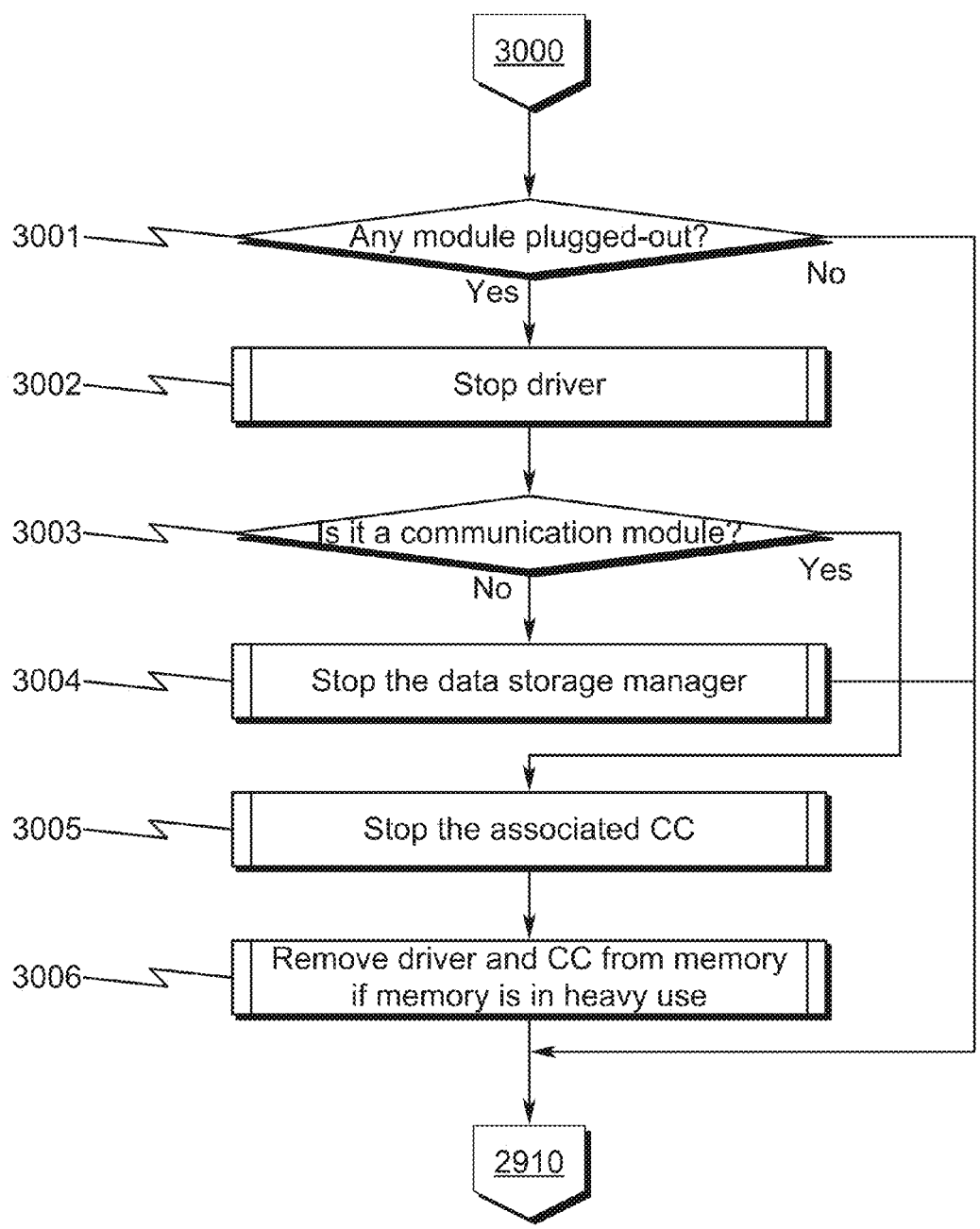
FIG. 30 illustrates a flowchart of an exemplary plug-and-play manager method useful in some preferred embodiments of the present invention.

An exemplary plug-and-play manager method is generally illustrated in FIG. 29 (2900) and FIG. 30 (3000).

Home Automation Data Storage and Processing

It is useful for service providers to collect and perform analysis on home automation data. See the discussion on BIG DATA above.

The UI on the HADS web server allows consumers to download and upload files to the data storage (See Document PCSM for further information on an exemplary UI). In addition, users can define what data to collect in the data storage. The data storage manager is responsible for handling the UI configuration, and work with Communication Mediator (CM) to get the desired data.

It was mentioned earlier that consumers can see a list of devices on the web page of HADS. They can check the devices and the data types they want to collect and archive on the data storage. In addition, consumers can specify the frequency of the data collection (e.g., once an hour, once a day, once an hour, etc.).

The data storage manager takes this configuration and forms query messages for the corresponding virtual devices. These messages are sent to the Communication Mediator. When data are returned to the data storage manager (an application) from the CM, the data is written into a file corresponding to the virtual device.

Data Collection Configuration

As a reference implementation for an exemplary embodiment, the data storage manager stores in its database the data collection configuration in the following table:

TABLE 2

Data Collection Configuration

| Name | Device Type | Device Sub Type | Unit | Schedule | Source |
|---|---|---|---|---|---|
| Living room temp | Sensor | Temperature | Degree | Period: 60 sec | Virtual Device ID 1 |
| House Energy | Sensor | Energy | kWh | Period: 3600 sec | Virtual Device ID 2 |
| House power | Sensor | Power | Watt | | Virtual Device ID 2 |
| Light Switch_1 | Actuator | Switch Status, | Boolean: On/Off | Event Driven: When Status changes | Virtual Device ID 3 |
| TV Energy | Sensor | Energy Meter | kWh | Event Driver: kWh > Threshold && Period: 60 sec | Virtual Device ID 4 |

This table defines what data to collect for a device and the schedule to collect data. The data collected from one device can be more than one piece. For example, the data storage device collects two pieces of data (energy and power) from the same sensor (power meter). The two pieces of data share the same source virtual device ID. In this case, two items are created in the data collection configuration table. See column items 2 and 3 in TABLE 2.

The data collection schedule can be periodic or event driven. For sensors, the data collection schedule is usually periodic while the data collection of an actuator is usually event driven. For example, in the case of a switch, the schedule to collect data is when the on/off status of the switch changes. But, a more flexible schedule can be defined as shown in the 5$^{th}$ item of TABLE 2. In this case, the data is collected only when the kWh is above certain threshold (event driven) and at a period of 600 sec.

Skilled UI designer can design a user interface to present the information in TABLE 2 to users so that they can edit and modify the information.

Data Stored

The actual collected data stored in the database contains the actual data and the time stamps associated with the data. For example:

TABLE 3

Periodically Collected Data (Sensor)

| Time Stamp | Data |
|---|---|
| Jan. 21, 2012:12:01:21 | 35 |
| Jan. 21, 2012:12:02:21 | 35.5 |
| Jan. 21, 2012:12:03:21 | 35.4 |
| Jan. 21, 2012:12:03:21 | 35.4 |

TABLE 4

Event Driven Collected Data (Switch)

| Time Stamp | Data |
|---|---|
| Jan. 21, 2012:12:01:05 | On |
| Jan. 21, 2012:12:07:44 | Off |
| Jan. 21, 2012:12:13:32 | On |
| Jan. 21, 2012:12:15:21 | Off |

The data storage can be implemented with a relational database such as MySQL or an object oriented database such as eXtremeDB. Typically, a database file is maintained for a data segment for each virtual device. The data segment has a reasonable size, for example, 1 MB. When data collected exceeds the size of the file, a new file is created for the data. When the combined size of files exceed a predefined threshold, older files are removed or warning signal is sent to users through popup windows, email or text message. Users can configure the file size in the UI.

Use Case Scenarios

The following two exemplary use case scenarios will now be presented:

Scenario 1: Collect data periodically from a sensor. It was discussed above in length how a switch device obtains data from a sensor. For collecting periodic data from a sensor and storing it in the data storage, the process is similar: Just replace the switch VD ID with the Data Storage Manager App ID in the discussion herein. A QUERY or SUBSCRIBE message can be used to retrieve the data. The only difference from that case is that the switch will just analyze the data it obtains to decide if it needs to switch on or off, then discard the data. Here the data needs to be stored in the database.

Scenario 2: Collect data based on events. Some devices are capable of sending event driven data. For example, some switches can be configured to only send notifications to interested parties when the switch status changes. In that case, it is straightforward to QUERY and subscribe the data. However, if a device cannot provide event driven data, the data storage is responsible for the event detection: it first collects the data at a periodic fashion, and then does logic analysis to detect any event changes. Only the data associated with the event changes are stored in the database. For example, in case of switches, the data storage manager QUERY the switch status at an interval, say every 30 seconds. Then it decides if the new switch status has changed. If so, the data is stored. This is a poor-man's event-driven data collection, and may miss some status changes.

In summary, the data storage is responsible for collecting and archiving data. In addition is does some data analysis if necessary.

Event Based System

HADS is an event driven system. The events include:
any "sporadic" events (e.g., Web inputs, Internet messages, and event messages from devices); and
periodic events (e.g., timeouts from a timer and periodic data from sensors).

The applications, Communication Mediator (CM), and Communication Coordinators are just programs that handle events. In a typical configuration, the following events and handling programs will be defined.

Sporadic Events

These are unpredictable events in terms of its time of happening:
Home based web server inputs: web server handles the web inputs.
Messages from Internet: networking application processes these messages. These messages have the same purposes as the web server inputs. They may be sent from an Internet based web server.
Message from home automation devices: Communication Coordinators and Communication Mediator handle these messages as discussed in the section describing the Virtual Device, Communication Mediator, and Communication Coordinator.

Periodic Events
Periodic handshaking messages with an Internet server: the networking application handles them.
Periodic data collection events: the home automation data storage handles them.

The periodic events are scheduled by a process using a timer that generates periodic timeout events. For example, a periodic data collection is scheduled by the data storage manager or a periodic Internet handshake job is scheduled by the networking application.

Real-Time and Non-Real-Time Events

Some events require fast responses. For example, when users control a devices (e.g., to turn it on or off) the event needs a fast response. These events are termed real-time events. Real-time events include:
web inputs handled by the web server;
an incoming message handled by CM; and
incoming data handled by the data storage manager.

Other events just need a decent response time. For example, to send a message to an Internet server from time to time to notify the latter the current status for the HADS (see the Cloud Server discussion), it is OK to delay a couple of seconds. These events are termed non-real-time events. Non-real-time events include most system maintenance/book keeping events, most of which are periodic.

Note that some operating system can assign priorities to the processes that handle events: high priorities to processes that handle real-time events and low priorities to processes that handle non-real-time events.

Event Handlers

All event handling processes (called event handlers) are just the software processes (see FIG. 9 (0900) for all processes) on the CPU, which wait for events to arrive and process them, and go back to waiting when the event processing is completed. In many cases, a handler will delegate part of the event processing to other processes, which are described herein as delegated processes. For example, when Web server handles a web input that configures a device, it delegates it to the Communication Mediator (CM), which knows how to deliver the message to the destination.

An event processor can be implemented as a polling process or an interrupt based process. One skilled in the art will be well versed in the implementation of event handling implementation.

The following table summarizes the types of events and their handlers:

| Events | Purpose | Handler | Delegated Processes | Note |
|---|---|---|---|---|
| Web inputs | QUERY device information CONFIGURE devices Take actions on devices | Web server | Scheduler Mediator Data Storage Manager Networking | These are TCP/IP messages that are targeted to a web server |
| Messages from Internet | All the above Messages from an Internet server for handshake | Networking | Scheduler Mediator Data Storage Manager Web server | All other IP messages. |

-continued

| Events | Purpose | Handler | Delegated Processes | Note |
|---|---|---|---|---|
| Messages from devices | Interactions between devices, between the host and devices | Mediator Coordinator | Data Storage Manager Networking Web server | Messages discussed herein |
| Event from expansion slot hardware | A module plugged in or out | Plug and play manager | | This is a hardware signal caught by an interrupt routine. |
| Timeouts from timer | Scheduled periodic tasks: Data collection, Push messages to web server Other periodic maintenance such as handshake with an Internet server | Data storage manager Mediator Coordinator | Web server Networking | Applications configure timers based on user inputs. When a timer expires, it fires a timeout event and is reprogramed with the same timeout. This process generates repeated timeout events. |

Energy Manager (3100, 3200)

A typical HADS system consumes at most 3-4 watts of power at peak operation. In contrast, a laptop consumes 15-25 watts of power. The low power consumption of HADS is due to the fact that HADS is a dedicated device to communication, message "routing/converting", and data storage.

As an exemplary reference design, one preferred embodiment utilizes a Ralink model RT5350 SOC that contains a WiFi module and a MIP CPU, with USB, serial ports, and many other IO connections. This SOC consumes about 2 Watts, and by adding expansion modules, the power consumption can reach up to 4 Watts.

Exemplary Energy Management Flowchart (3100)

Figure 31:
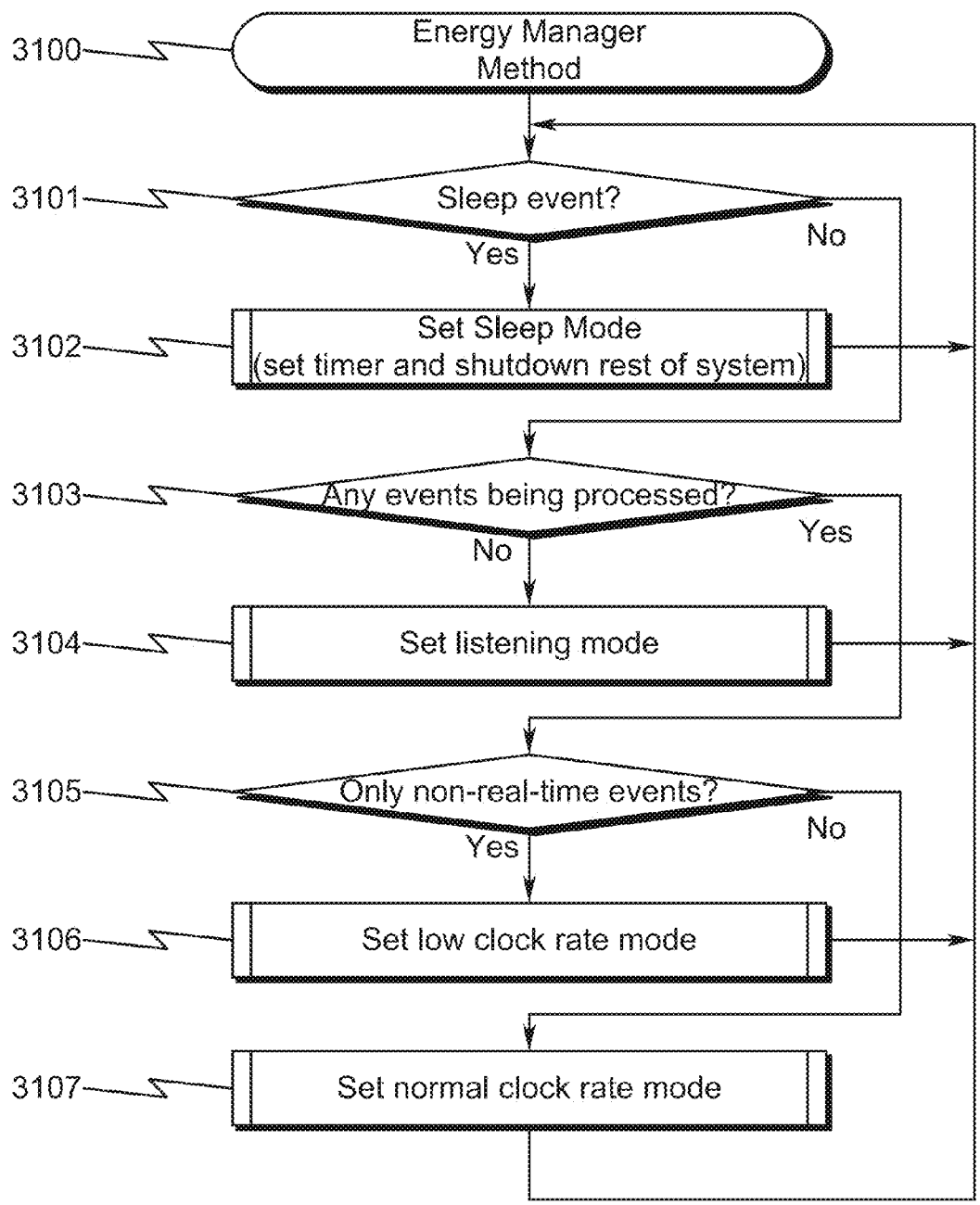
FIG. 31 illustrates a flowchart of an exemplary energy manager method useful in some preferred embodiments of the present invention.

FIG. 31 (3100) illustrates a general process flowchart of a typical Energy Manager method. The Energy Manager will be notified with all the events (start and end of them) that happen in the system. All the event handles mentioned above send notification to Energy Manager, before they start to process and after they complete processing an event. One skilled in the software arts will be ably capable of implementing this functionality given these teachings of the present invention.

Energy Modes

The above power consumption number of HADS is for the normal operation. Fortunately, the power consumption can be reduced significantly by taking the advantage of the fact that not all energy consuming operations of HADS are run all the time. Below describes an event-driven energy management scheme. Various different types of energy modes will first be discussed.

Sleep mode—when all operations are put on hold, only a wakeup clock/timer is running.

Listening mode—only communication modules are running that contains a network protocol stack handling software. This occurs when there is currently no event being processed. At this mode, the CPU is in a very low clock rate (a quarter or lower than the normal clock rate), because there is no activity going on and all the computing power needed is to detect any communication input. It is assumed that the CPU and communication modules use independent system clocks. Communication modules have their own internal clocks for their PHY/MAC processing, independent of the CPU clock.

Low clock rate mode—the CPU's clock is set at a low rate to save power (for example, half of the normal clock rate). This occurs when the CPU operation is limited to events that require non-real-time responses.

Normal clock rate mode—the CPU's clock is set at the normal rate. This occurs when the CPU needs to provide "real-time" response to an event.

The power consumption is roughly proportional to the clock rate. The sleep mode has the lowest energy consumption, at micro Watt level. Listening mode consumes less than 1 Watt. Low clock rate mode consumes less than 2 Watts. Normal clock frequency mode consumes about 3-4 Watts. The event-based energy management scheme can be extended to more clock rates to have finer granularity in power saving.

Figure 32:
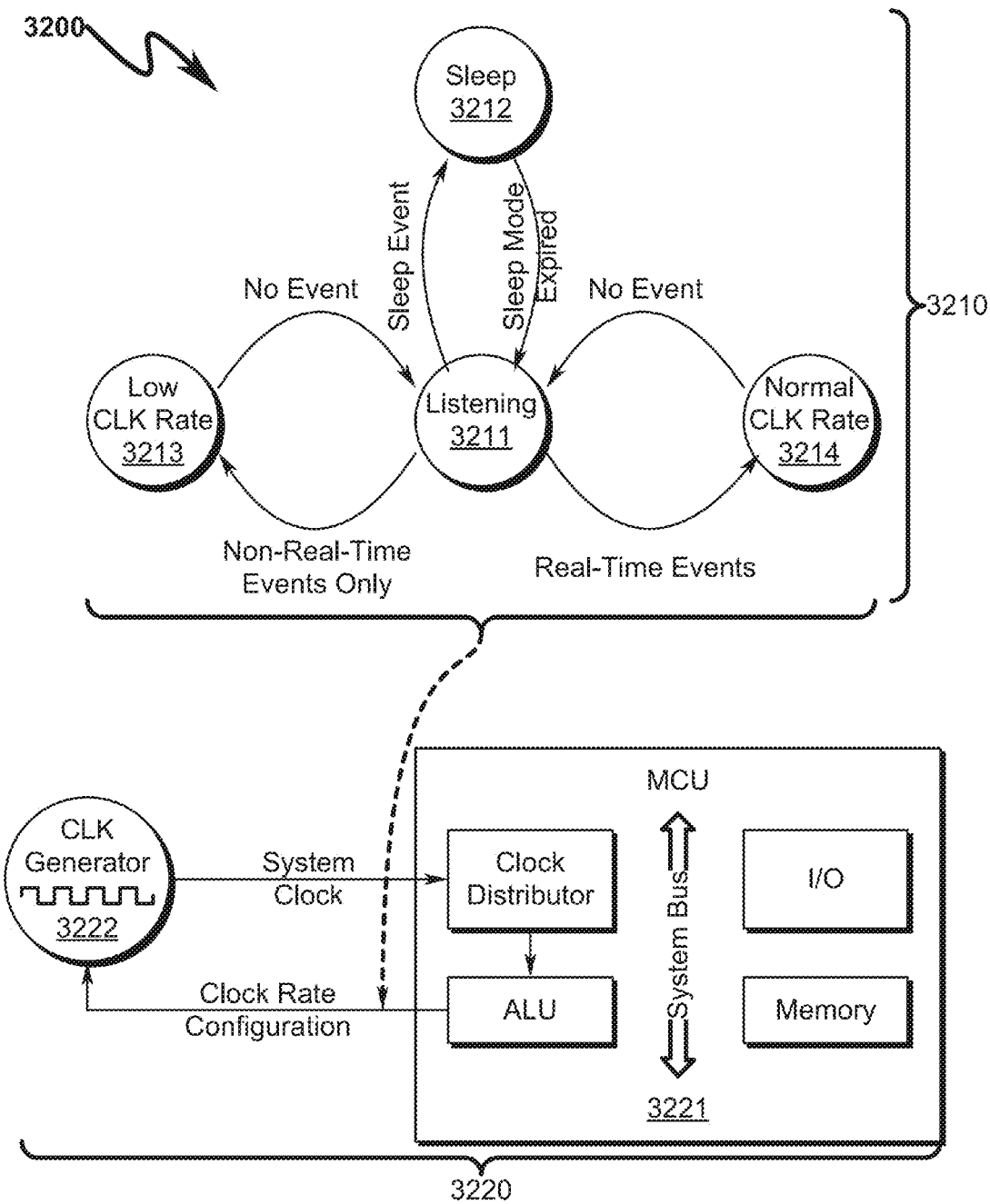
FIG. 32 illustrates a state diagram and schematic block diagram of an exemplary energy manager methodology useful in some preferred embodiments of the present invention.

Most CPUs/MCUs support the run-time configuration of system clock rate at different granularity. For examples, reference http://en.wikipedia.org/wiki/CPU throttling. This concept is generally illustrated in FIG. 32 (3220).

All event handlers run at different clock rates but will have different response times. They are idle (busy waiting) when there are no events to process. The operating system will take care of assigning high priority to the event handlers that are processing events and low priorities to event handlers that are idle. This priority assignment is a technique known to those skilled in the art.

Energy manager is a piece of software that runs at any CPU clock rate. It is responsible for switching between the above modes, so that the HADS can optimize its energy consumption. The decision to switch between the energy modes is based on the events the system has received and is handling. Four types of energy mode trigger events are typically defined as shown in the following table:

| To Energy Mode | Energy Mode Trigger Event | Note |
|---|---|---|
| Sleep | Sleep Event | User can schedule the system to go to sleep mode from Web server, for example, from 1AM to 5AM every day. |
| Listening | Completion of all events — no events are currently being processed | |
| Low Clock Rate | Only non-real-time events are being processed: | Examples: Internet handshake events Scheduled push information to the web server |
| Normal Clock Rate | A real-time event is being processed. | Examples: Web input to take some action on a device |

Note that when in sleep mode, only an external timer (see FIG. 1 (0100, 0119)) is running that will trigger the system back to the listening mode when the time expires. The timer (0119) can run by itself without the rest of the system running. When the set time expires, it wakes up the rest of the system. When switching into the sleep mode, the energy manager set the timer and then shutdown the rest of the system (including itself). When the timer fires, it wakes up the system, and the Energy Manager comes to life and puts the system in the listening mode. Many vendors provide the feature for the CPU/MCU to detect a wake up trigger and put the CPU/MCU in an operating mode. The combination of an external timer and the wake up detection consumes very little power, about a few microWatts. FIG. 32 (3200) generally illustrates the energy mode state changes (3210) triggered by events and the corresponding exemplary hardware block diagram (3220).

User Interface

Document PCSM described a reference user interface that can be hosted on a web page or as an application on user devices. That user interface allows users to monitor and control a home automation device. It applies to the user interaction with HADS as well.

Document NISM describes an additional user interface for managing the network aspect of home automation devices, (i.e., the link status, type of communication protocols, etc.). That UI also may apply to the user interaction with HADS.

It will be evident to one of ordinary skill in the art that the "backend" code for the user interface that interacts with applications may be easily configured given the teachings of the present invention, and permit implementation of the Communication Mediator (CM) and Communication Coordinators in a way described above.

Preferred Embodiment System Summary

The present invention preferred exemplary system embodiment anticipates a wide variety of variations in the basic theme of construction, but can be generalized as a data server system comprising:
 (a) home automation data server (HADS);
 (b) network gateway router (NGR); and
 (c) home automation network (HAN);
 wherein
  the HADS further comprises an Applications Interface (AI), Communication Mediator (CM), and Communications Coordinator (CC);
  the CC performs a physical-to-virtual device translation between physical devices (PD) present in the HAN to virtual devices (VD) presented to the CM;
  the CM maintains a publisher/subscriber association table (PSAT) logically connecting a VD data producer and VD data consumer in the CC;
  the CM maintains a virtual device list of the VD in the PSAT that reference the CC;
  the HADS further comprises local data storage (LDS) accessible via the AI;
  the HADS interfaces the NGR with the HAN;
  the NGR connects to an external computer network (ECN); and
  the HADS is configured to transfer data from/to devices present in the HAN to/from the ECN through the NGR using the network protocols of the ECN and the physical-to-virtual mapping provided by the CC under control of the CM.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a data server method, the method operating in conjunction with a data server system comprising:
 (a) home automation data server (HADS);
 (b) network gateway router (NGR); and
 (c) home automation network (HAN);
 wherein
  the HADS further comprises an Applications Interface (AI), Communication Mediator (CM), and Communications Coordinator (CC);
  the CC performs a physical-to-virtual device translation between physical devices (PD) present in the HAN to virtual devices (VD) presented to the CM;
  the CM maintains a publisher/subscriber association table (PSAT) logically connecting a VD data producer and VD data consumer in the CC;
  the CM maintains a virtual device list of the VD in the PSAT that reference the CC;
  the HADS further comprises local data storage (LDS) accessible via the AI;
  the HADS interfaces the NGR with the HAN;
  the NGR connects to an external computer network (ECN); and
  the HADS is configured to transfer data from/to devices present in the HAN to/from the ECN through the NGR using the network protocols of the ECN and the physical-to-virtual mapping provided by the CC under control of the CM;
 wherein the method comprises the steps of:
  (1) searching for HA devices connected to the HADS via the HAN;
  (2) providing a VD physical-to-virtual translation for the HA device via the CC;
  (3) reporting the VD physical-to-virtual translation to the CM;
  (4) mapping data publishers to data subscribers within the CM using the VD physical-to-virtual translation;
  (5) transferring data from the data publishers to the data subscribers through the HADS using the VD physical-to-virtual translation in the CC; and
  (6) proceeding to step (1).

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the ECN comprises the Internet.

An embodiment wherein the CC implements a network communication protocol selected from a group consisting of: WiFi; BLUETOOTH®; ZIGBEE®; Z-WAVE®; and Power Line Control (PLC).

An embodiment wherein the SGPC further comprises an expansion slot.

An embodiment wherein the SGPC further comprises an expansion slot configured to accept removable data storage.

An embodiment wherein the data publisher associated with the VD data producer and the data subscriber associated with the VD data consumer communicate using different communication protocols.

An embodiment wherein the SGPC resides within a subnet of the HAN.

An embodiment wherein the HADS simultaneously functions as a client to an AP and an AP to devices connected to the HAN.

An embodiment wherein the AI comprises a software application module selected from a group consisting of: energy management; plug-and-play; network interface; web server; TCP/IP; and data storage.

An embodiment wherein the AI is configured to allow a user to access the HADS and initiate a supervisory function selected from a group consisting of:
  configuring a home automation device connected to the HAN;
  monitoring the status of a home automation device connected to the HAN;
  reading data from a sensor connected to the HAN;
  reading data from the LDS;
  storing data on the LDS;
  transferring data retrieved from a sensor connected to the HAN to the LDS;
  sharing data between the LDS and local data storage connected to another HADS;
  reading data from a device present in an expansion slot connected to the SGPC;
  storing data to a device present in an expansion slot connected to the SGPC;
  sharing data between the LDS and a device present in an expansion slot connected to the SGPC;
  initiating a control action for an actuator controlled by the SGPC;
  initiating a control action for an actuator controlled by the SGPC based on the status of a sensor connected to the HAN; and
  initiating a control action for an actuator controlled by the SGPC based on data retrieved from the LDS.

An embodiment wherein the system clock rate of the HADS is defined by a clock rate generator, the clock rate generator adjusting the system clock rate according to the following states:

(1) a SLEEP state in which the system clock rate is minimized or stopped during periods of system inactivity and only a wakeup clock/timer is active;

(1) a LISTENING state in which the system clock rate is reduced by approximately 75% during periods in which no events have occurred or in which the SLEEP state has expired;

(2) a LOW CLOCK RATE state in which the system clock rate is lowered during non-real-time events; and (3) a NORMAL CLOCK RATE state in which the system clock rate is nominal during real-time events.

One skilled in the art will recognize that other embodiments are possible based on combinations of elements taught within the above invention description.

Generalized Computer Usable Medium

As generally illustrated herein, the system embodiments of the present invention can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to *In re Beauregard*, 35 USPQ2d 1383 (U.S. Pat. No. 5,710,578), the present invention anticipates and includes this type of computer readable media within the scope of the invention. Pursuant to *In re Nuijten*, 500 F.3d 1346 (Fed. Cir. 2007) (U.S. patent application Ser. No. 09/211,928), the present invention scope is limited to computer readable media wherein the media is both tangible and non-transitory.

CONCLUSION

A data server system/method allowing cloud data server functionality in a coordinated/concerted fashion within network configurations that are local to and/or spanning network gateway routers has been disclosed. The system utilizes a smart gateway power controller (SGPC) augmented with storage media and/or expansion slots to interact within a home automation network (HAN) to permit the local HAN to operate as a distinct network and allow access to locally stored data from remote networks such as the Internet. The system permits inter-networking of HAN devices (including SGPCs) and integration of data management within home automation networks while still providing access to HAN data via external remote networks such as the Internet. The system/method allows remote network access to HAN device data from local/remote access devices including mobile phones, tablet computers, laptops, desktop computers, and the like.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A data server system comprising:
(a) home automation data server (HADS);
(b) network gateway router (NGR); and
(c) home automation network (HAN);
wherein
  said HADS further comprises an Applications Interface (AI), Communication Mediator (CM), and Communications Coordinator (CC);
  said CC performs a physical-to-virtual device translation between physical devices (PD) present in said HAN to virtual devices (VD) presented to said CM;
  said CM maintains a publisher/subscriber association table (PSAT) logically connecting a VD data producer and VD data consumer in said CC;
  said CM maintains a virtual device list of the VD in said PSAT that reference said CC;

said HADS further comprises local data storage (LDS) accessible via said AI;

said HADS interfaces said NGR with said HAN;

said NGR connects to an external computer network (ECN);

said HADS is configured to transfer data from/to devices present in said HAN to/from said ECN through said NGR using the network protocols of said ECN and the physical-to-virtual mapping provided by said CC under control of said CM;

said HADS is configured to search for HA devices connected to said HADS via said HAN;

said HADS is configured to provide a VD physical-to-virtual translation for said HA device via said CC;

said HADS is configured to report said VD physical-to-virtual translation to said CM;

said HADS is configured to map data publishers to data subscribers within said CM using said VD physical-to-virtual translation; and said HADS is configured to transfer data from said data publishers to said data subscribers through said HADS using said VD physical-to-virtual translation in said CC.

2. The data server system of claim 1 wherein said CC implements a network communication protocol selected from a group consisting of: WiFi; BLUETOOTH®; ZIGBEE®; Z-WAVE®; and Power Line Control (PLC).

3. The data server system of claim 1 wherein said HADS further comprises a smart gateway power controller (SGPC).

4. The data server system of claim 1 wherein said HADS further comprises an expansion slot.

5. The data server system of claim 1 wherein the data publisher associated with said VD data producer and the data subscriber associated with said VD data consumer communicate using different communication protocols.

6. The data server system of claim 1 wherein said HADS resides within a subnet of said HAN.

7. The data server system of claim 1 wherein said HADS simultaneously functions as a client to an AP and an AP to devices connected to said HAN.

8. The data server system of claim 1 wherein said AI comprises a software application module selected from a group consisting of: energy management; plug-and-play; network interface; web server; TCP/IP; and data storage.

9. The data server system of claim 1 wherein said AI is configured to allow a user to access said HADS and initiate a supervisory function selected from a group consisting of:
  (1) configuring a home automation device connected to said HAN;
  (2) monitoring the status of a home automation device connected to said HAN;
  (3) reading data from a sensor connected to said HAN;
  (4) reading data from said LDS;
  (5) storing data on said LDS;
  (6) transferring data retrieved from a sensor connected to said HAN to said LDS;
  (7) sharing data between said LDS and local data storage connected to another HADS;
  (8) reading data from a device present in an expansion slot connected to said HADS;
  (9) storing data to a device present in an expansion slot connected to said HADS;
  (10) sharing data between said LDS and a device present in an expansion slot connected to said HADS;
  (11) initiating a control action for an actuator controlled by said HADS;
  (12) initiating a control action for an actuator controlled by said HADS based on the status of a sensor connected to said HAN; and
  (13) initiating a control action for an actuator controlled by said HADS based on data retrieved from said LDS.

10. The data server system of claim 1 wherein the system clock rate of said HADS is defined by a clock rate generator, said clock rate generator adjusting said system clock rate according to the following states:
  (1) a SLEEP state in which said system clock rate is minimized or stopped during periods of system inactivity and only a wakeup clock/timer is active;
  (2) a LISTENING state in which said system clock rate is reduced by approximately 75% during periods in which no events have occurred or in which said SLEEP state has expired;
  (3) a LOW CLOCK RATE state in which said system clock rate is lowered during non-real-time events; and
  (4) a NORMAL CLOCK RATE state in which said system clock rate is nominal during real-time events.

11. A data server method, said method operating in conjunction with a data server system, said system comprising:
  (a) home automation data server (HADS);
  (b) network gateway router (NGR); and
  (c) home automation network (HAN);
  wherein
  said HADS further comprises an Applications Interface (AI), Communication Mediator (CM), and Communications Coordinator (CC);
  said CC performs a physical-to-virtual device translation between physical devices (PD) present in said HAN to virtual devices (VD) presented to said CM;
  said CM maintains a publisher/subscriber association table (PSAT) logically connecting a VD data producer and VD data consumer in said CC;
  said CM maintains a virtual device list of the VD in said PSAT that reference said CC;
  said HADS further comprises local data storage (LDS) accessible via said AI;
  said HADS interfaces said NGR with said HAN;
  said NGR connects to an external computer network (ECN); and
  said HADS is configured to transfer data from/to devices present in said HAN to/from said ECN through said NGR using the network protocols of said ECN and the physical-to-virtual mapping provided by said CC under control of said CM;
  wherein said method comprises the steps of:
  (1) searching for HA devices connected to said HADS via said HAN;
  (2) providing a VD physical-to-virtual translation for said HA device via said CC;
  (3) reporting said VD physical-to-virtual translation to said CM;
  (4) mapping data publishers to data subscribers within said CM using said VD physical-to-virtual translation;
  (5) transferring data from said data publishers to said data subscribers through said HADS using said VD physical-to-virtual translation in said CC; and
  (6) proceeding to said step (1).

12. The data server method of claim 11 wherein said CC implements a network communication protocol selected from a group consisting of: WiFi; BLUETOOTH®; ZIGBEE®; Z-WAVE®; and Power Line Control (PLC).

13. The data server method of claim 11 wherein said HADS further comprises a smart gateway power controller (SGPC).

14. The data server method of claim 11 wherein said HADS further comprises an expansion slot.

15. The data server method of claim 11 wherein the data publisher associated with said VD data producer and the data subscriber associated with said VD data consumer communicate using different communication protocols.

16. The data server method of claim 11 wherein said HADS resides within a subnet of said HAN.

17. The data server method of claim 11 wherein said HADS simultaneously functions as a client to an AP and an AP to devices connected to said HAN.

18. The data server method of claim 11 wherein said AI comprises a software application module selected from a group consisting of: energy management; plug-and-play; network interface; web server; TCP/IP; and data storage.

19. The data server method of claim 11 wherein said AI is configured to allow a user to access said HADS and initiate a supervisory function selected from a group consisting of:
(1) configuring a home automation device connected to said HAN;
(2) monitoring the status of a home automation device connected to said HAN;
(3) reading data from a sensor connected to said HAN;
(4) reading data from said LDS;
(5) storing data on said LDS;
(6) transferring data retrieved from a sensor connected to said HAN to said LDS;
(7) sharing data between said LDS and local data storage connected to another HADS;
(8) reading data from a device present in an expansion slot connected to said HADS;
(9) storing data to a device present in an expansion slot connected to said HADS;
(10) sharing data between said LDS and a device present in an expansion slot connected to said HADS;
(11) initiating a control action for an actuator controlled by said HADS;
(12) initiating a control action for an actuator controlled by said HADS based on the status of a sensor connected to said HAN; and
(13) initiating a control action for an actuator controlled by said HADS based on data retrieved from said LDS.

20. The data server method of claim 11 wherein the system clock rate of said HADS is defined by a clock rate generator, said clock rate generator adjusting said system clock rate according to the following states:
(1) a SLEEP state in which said system clock rate is minimized or stopped during periods of system inactivity and only a wakeup clock/timer is active;
(2) a LISTENING state in which said system clock rate is reduced by approximately 75% during periods in which no events have occurred or in which said SLEEP state has expired;
(3) a LOW CLOCK RATE state in which said system clock rate is lowered during non-real-time events; and
(4) a NORMAL CLOCK RATE state in which said system clock rate is nominal during real-time events.

21. A tangible non-transitory computer usable medium having computer-readable program code means comprising a data server method wherein said method controls a data server system comprising:
(a) home automation data server (HADS);
(b) network gateway router (NGR); and
(c) home automation network (HAN);

wherein
said HADS further comprises an Applications Interface (AI), Communication Mediator (CM), and Communications Coordinator (CC);
said CC performs a physical-to-virtual device translation between physical devices (PD) present in said HAN to virtual devices (VD) presented to said CM;
said CM maintains a publisher/subscriber association table (PSAT) logically connecting a VD data producer and VD data consumer in said CC;
said CM maintains a virtual device list of the VD in said PSAT that reference said CC;
said HADS further comprises local data storage (LDS) accessible via said AI;
said HADS interfaces said NGR with said HAN;
said NGR connects to an external computer network (ECN); and
said HADS is configured to transfer data from/to devices present in said HAN to/from said ECN through said NGR using the network protocols of said ECN and the physical-to-virtual mapping provided by said CC under control of said CM;
wherein said method comprises the steps of:
(1) searching for HA devices connected to said HADS via said HAN;
(2) providing a VD physical-to-virtual translation for said HA device via said CC;
(3) reporting said VD physical-to-virtual translation to said CM;
(4) mapping data publishers to data subscribers within said CM using said VD physical-to-virtual translation;
(5) transferring data from said data publishers to said data subscribers through said HADS using said VD physical-to-virtual translation in said CC; and
(6) proceeding to said step (1).

22. The computer usable medium of claim 21 wherein said CC implements a network communication protocol selected from a group consisting of: WiFi; BLUETOOTH®; ZIGBEE®; Z-WAVE®; and Power Line Control (PLC).

23. The computer usable medium of claim 21 wherein said HADS further comprises a smart gateway power controller (SGPC).

24. The computer usable medium of claim 21 wherein said HADS further comprises an expansion slot.

25. The computer usable medium of claim 21 wherein the data publisher associated with said VD data producer and the data subscriber associated with said VD data consumer communicate using different communication protocols.

26. The computer usable medium of claim 21 wherein said HADS resides within a subnet of said HAN.

27. The computer usable medium of claim 21 wherein said HADS simultaneously functions as a client to an AP and an AP to devices connected to said HAN.

28. The computer usable medium of claim 21 wherein said AI comprises a software application module selected from a group consisting of: energy management; plug-and-play; network interface; web server; TCP/IP; and data storage.

29. The computer usable medium of claim 21 wherein said AI is configured to allow a user to access said HADS and initiate a supervisory function selected from a group consisting of:
(1) configuring a home automation device connected to said HAN;
(2) monitoring the status of a home automation device connected to said HAN;
(3) reading data from a sensor connected to said HAN;
(4) reading data from said LDS;

(5) storing data on said LDS;
(6) transferring data retrieved from a sensor connected to said HAN to said LDS;
(7) sharing data between said LDS and local data storage connected to another HADS;
(8) reading data from a device present in an expansion slot connected to said HADS;
(9) storing data to a device present in an expansion slot connected to said HADS;
(10) sharing data between said LDS and a device present in an expansion slot connected to said HADS;
(11) initiating a control action for an actuator controlled by said HADS;
(12) initiating a control action for an actuator controlled by said HADS based on the status of a sensor connected to said HAN; and
(13) initiating a control action for an actuator controlled by said HADS based on data retrieved from said LDS.

30. The computer usable medium of claim 21 wherein the system clock rate of said HADS is defined by a clock rate generator, said clock rate generator adjusting said system clock rate according to the following states:

(1) a SLEEP state in which said system clock rate is minimized or stopped during periods of system inactivity and only a wakeup clock/timer is active;
(2) a LISTENING state in which said system clock rate is reduced by approximately 75% during periods in which no events have occurred or in which said SLEEP state has expired;
(3) a LOW CLOCK RATE state in which said system clock rate is lowered during non-real-time events; and
(4) a NORMAL CLOCK RATE state in which said system clock rate is nominal during real-time events.

* * * * *

UNITED STATES PATENT AND TRADEMARK OFFICE
CERTIFICATE OF CORRECTION

PATENT NO.       : 8,443,071 B2
APPLICATION NO.  : 13/645080
DATED            : May 14, 2013
INVENTOR(S)      : Jin Lu et al.

It is certified that error appears in the above-identified patent and that said Letters Patent is hereby corrected as shown below:

In the Figures:

Figure 1, refence number 0113, please delete "Microconroller" and insert "Microcontroller"

In the Specification:

Column 2, Line 66, please delete "maybe" and insert --may be--.

Column 4, Line 40, please delete "serves" and insert --to serve--.

Column 7, Line 20, please insert a space above and below the title "Computing Device not Limitive".

Column 8, Line 65, please insert the word --the-- before "Internet".

Column 9, Line 48, please delete --a-- before "standardized".
Column 9, Line 50, please insert --a-- before "home".

Column 10, Line 17, please insert --the-- after "between".
Column 10, Line 18, please insert --s-- after "network".

Column 11, Line 42, please delete --the-- before "case".

Column 12, Line 5, please delete the --s-- at the end of the word "expenses".
Column 12, Line 5, please add --a-- after the word "up".
Column 12, Line 7, please add the word "one" at the end of --some--.
Column 12, Line 13, please add the word --the-- after "in".
Column 12, Line 24, please add the letter --d-- to the end of the word "Synchronize".
Column 12, Line 53, please delete the --s-- from the end of "ways".

Column 14, Line 28, please delete the --s-- at the end of "interactions".
Column 14, Line 30, please add an --s-- at the end of "forward".

Signed and Sealed this
Seventeenth Day of September, 2013

Teresa Stanek Rea
*Deputy Director of the United States Patent and Trademark Office*

CERTIFICATE OF CORRECTION (continued)
U.S. Pat. No. 8,443,071 B2

In the Specification:

Column 14, Line 34, please add a --.-- at the end of "consumers".
Column 14, Line 35, please add the word --the-- after the word "of".
Column 14, Line 44, please add an --s-- at the end of the word "being".
Column 14, Line 59, please add the word --to-- before the word "forms".
Column 14, Line 59, please delete the letter --s-- at the end of the word "forms".

Column 16, Line 10, please insert the word --the-- before "Internet".
Column 16, Line 10, please insert the word --to-- before "interact".
Column 16, Line 24, please insert the word --the-- before "Internet".
Column 16, Line 35, please insert the word --the-- before "Internet".
Column 16, Line 38, please insert the word --the-- before "ZIGBEE".
Column 16, Line 41, please add an --s-- to the word "come".
Column 16, Line 62, please add an --s-- to the word "forward".

Column 17, Line 5, please add the word --the-- before "Internet".

Column 18, Line 9, please delete the word --to-- before "host".
Column 18, Line 12, please add the word --the-- before "HADS-hosted".
Column 18, Line 46, please insert --it knows-- prior to "what control".
Column 18, Line 47, please insert --it knows-- prior to "what data".

Column 20, Line 18, please insert --the-- before "Web".
Column 20, Line 24, please insert --the-- before "application".
Column 20, Line 35, please add an --s-- to the word "forward".
Column 20, Line 40, please insert the word --the-- before "web".

Column 21, Line 34, please change --visa-- to "vice".

Column 22, Line 40, please add --a-- before the word "HADS".
Column 22, Line 48, please add an --s-- at the end of the word "forward".
Column 22, Line 52, please insert the word --it-- before the word "back".
Column 22, Line 58, please add an --s-- at the end of the word "implementation".

Column 23, Line 4, please insert --an-- after the word "be".
Column 23, Line 5, please insert an --a-- before "virtual".
Column 23, Line 7, please insert an --a-- before "virtual".
Column 23, Line 29, please insert --a-- before "publisher".

Column 24, Line 45, please delete the --s-- at the end of the word "types".

Column 25, Line 4, please insert an --a-- before the word "certain".
Column 25, Line 11, please replace --bases-- with "basis".
Column 25, Line 37, please delete --on-time-- and insert "one-time".
Column 25, Line 60, please delete --on and off--.
Column 25, Line 61, please add --on and off-- after the word "conditioner".

Column 26, Line 44, please insert --a-- after "above".
Column 26, Line 45, please add --er-- to the end of the word "condition".

Column 28, Line 20, please add an --s-- to the end of the word "forward".
Column 28, Line 25, please insert an --a-- before "SEND" and before "QUERY".
Column 28, Line 39, please insert an --a-- before "SEND".
Column 28, Line 40, please insert an --a-- before "SUBSCRIBE".
Column 28, Line 42, please insert an --a-- before "SUBSCRIBE".
Column 28, Line 44, please insert an --a-- before "QUERY".

CERTIFICATE OF CORRECTION (continued)
U.S. Pat. No. 8,443,071 B2

In the Specification:

Column 28, Line 58, please insert an --s-- at the end of the word "degree".
Column 28, Line 67, please replace the --d-- at the end of the word "compared" with an --s--.

Column 29, Line 1, please delete the --n-- in the word "an".
Column 29, Line 2, please insert the word --the-- after the word "how".
Column 29, Line 32, please insert --the-- before "Network".

Column 30, Line 40, please insert the word --a-- before "certain".
Column 30, Line 42, please add an --s-- to the end of the word "designer".

Column 31, Line 8, please insert --a-- before "warning".
Column 31, Line 62, please insert --the-- before "Internet".
Column 31, Line 67, please insert --a-- before "Communication Mediator".

Column 32, Line 17, please delete the --s-- at the end of "devices".
Column 32, Line 25, please insert --of-- after "latter".
Column 32, Line 30, please add an --s-- to the end of the word "system".
Column 32, Line 41, please add the word --a-- after "when".

Column 33, Line 51, please insert the word --the-- before "Energy Manager".
Column 33, Line 59, please delete the word --the-- before "advantage".

Column 34, Line 20, please insert the word --a-- before "micro".

Column 35, Line 6, please add an --s-- to the end of the word "set".
Column 35, Line 7, please delete the word --shutdown-- and insert "shuts down" in its place.

Column 35, Line 53, please insert the word --a-- after "and".
Column 35, Line 56, please add an --s-- at the end of the word "reference".

Column 36, Line 28, please add an --s-- at the end of the word "reference".

Column 37, Line 62, please change --(1)-- to "(2)".
Column 37, Line 66, please change --(2)-- to "(3)".

Column 38, Line 1, please change --(3)-- to "(4)".